US010856254B2

(12) United States Patent
Baek et al.

(10) Patent No.: US 10,856,254 B2
(45) Date of Patent: Dec. 1, 2020

(54) METHOD FOR COMMUNICATION IN SYSTEM IN WHICH 4G AND 5G COEXIST, AND DEVICE THEREFOR

(71) Applicant: Samsung Electronics Co., Ltd, Suwon-si (KR)

(72) Inventors: Sangkyu Baek, Yongin-si (KR); Hyunjeong Kang, Seoul (KR); Sangwook Kwon, Suwon-si (KR); Daegyun Kim, Bundang-gu (KR); Youngjoong Mok, Suwon-si (KR); Anil Agiwal, Suwon-si (KR); Youngbin Chang, Anyang-si (KR); June Hwang, Incheon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/338,391

(22) PCT Filed: Sep. 29, 2017

(86) PCT No.: PCT/KR2017/011088
§ 371 (c)(1),
(2) Date: Mar. 29, 2019

(87) PCT Pub. No.: WO2018/062977
PCT Pub. Date: Apr. 5, 2018

(65) Prior Publication Data
US 2020/0029297 A1    Jan. 23, 2020

(30) Foreign Application Priority Data

Sep. 29, 2016  (KR) .................. 10-2016-0125919

(51) Int. Cl.
*H04W 68/00*  (2009.01)
*H04W 76/11*  (2018.01)
(Continued)

(52) U.S. Cl.
CPC .......... *H04W 68/005* (2013.01); *H04W 4/06* (2013.01); *H04W 76/11* (2018.02); *H04W 76/16* (2018.02)

(58) Field of Classification Search
CPC ... H04W 68/005; H04W 76/11; H04W 76/16; H04W 4/06; H04W 68/12
See application file for complete search history.

(56) References Cited

U.S. PATENT DOCUMENTS 8,509,821 B1 * 8/2013 Zang .................. H04W 68/025
                                                        370/214
2010/0008324 A1 * 1/2010 Lee .................... H04W 36/0066
                                                        370/331
(Continued)

FOREIGN PATENT DOCUMENTS

KR   10-2015-0086171 A   7/2015
WO   2015/034195 A1      3/2015
(Continued)

OTHER PUBLICATIONS

International Search Report dated Jan. 3, 2018 in connection with International Patent Application No. PCT/KR2017/011088, 3 pages.
(Continued)

*Primary Examiner* — Mohammad S Anwar

(57) ABSTRACT

The present disclosure relates to a communication scheme for merging IoT technology with a 5G communication system supporting a data transmission rate higher than that of a 4G system, and to a system for the scheme. The present disclosure can be applied to intelligent services (for instance, smart home, smart building, smart city, smart car or connected car, heath care, digital education, retail business, security- and safety-related service and so forth) on the basis of 5G communication technology and IoT-related technology. The present invention provides a device and method for
(Continued)

supporting paging signal processing using multi-connection in a wireless communication system.

15 Claims, 50 Drawing Sheets

(51) Int. Cl.
*H04W 76/16* (2018.01)
*H04W 4/06* (2009.01)

(56) References Cited

U.S. PATENT DOCUMENTS

| | | |
|---|---|---|
| 2012/0082037 A1 | 4/2012 | Wang et al. |
| 2013/0136072 A1 | 5/2013 | Bachmann et al. |
| 2015/0078329 A1* | 3/2015 | Zhu .................. H04L 5/005 370/330 |
| 2016/0198400 A1 | 7/2016 | Cho et al. |
| 2017/0142560 A1 | 5/2017 | Ryu et al. |
| 2017/0238296 A1 | 8/2017 | Lee et al. |

FOREIGN PATENT DOCUMENTS

| | | |
|---|---|---|
| WO | 2016/003174 A1 | 1/2016 |
| WO | 2016/036103 A1 | 3/2016 |

OTHER PUBLICATIONS

Written Opinion of the International Searching Authority dated Jan. 3, 2018 in connection with International Patent Application No. PCT/KR2017/011088, 5 pages.

\* cited by examiner

- TAI Format

METHOD FOR COMMUNICATION IN SYSTEM IN WHICH 4G AND 5G COEXIST, AND DEVICE THEREFOR

CROSS-REFERENCE TO RELATED APPLICATIONS

This application is a 371 of International Application No. PCT/KR2017/011088 filed on Sep. 29, 2017, which claims priority to Korean Patent Application No. 10-2016-0125919 filed on Sep. 29, 2016, the disclosures of which are herein incorporated by reference in their entirety.

BACKGROUND

1. Field

An embodiment of the disclosure relates to a device and method for supporting paging signal processing using multiple connections in a wireless communication system. Another embodiment of the disclosure relates to a device and method for supporting multiple connections of a terminal in a wireless communication system. Still another embodiment of the disclosure relates to a beamforming method and device when a base station function is dispersedly implemented in a wireless communication system.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (e.g., 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mmWave band and increase a propagation transmission distance.

Further, the 5G communication system has developed technologies, such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes, such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components, such as objects, exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to generate a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, technologies, such as a sensor network, machine to machine (M2M), and machine type communication (MTC), are implemented by techniques, such as beamforming, MIMO, and an array antenna. The application of a cloud RAN as the big data processing technology may be an example of convergence of the 5G technology and the IoT technology.

SUMMARY

An aspect of the disclosure is to provide a device and method for supporting paging signal processing of a terminal in a system where 4G and 5G coexist.

An aspect of the disclosure is to provide a device and method for supporting multiple connections of a terminal in a system where 4G and 5G coexist.

An aspect of the disclosure is to provide a device and method for supporting a connection between a terminal and a base station in a system where 4G and 5G coexist. An aspect of the disclosure is to provide a device and method for supporting an RRC connection of a terminal in a system where 4G and 5G coexist.

An aspect of the disclosure is to provide a beamforming method and device when base station functions are dispersedly implemented in a wireless communication system. Further, an aspect of the disclosure is to provide a method and device for ensuring mobility of a terminal. An aspect of the disclosure is to provide a device and method for reducing a total delay time caused by a delay of a network due to a change of a serving node when base station functions are dispersedly implemented.

The technical subjects pursued in the disclosure may not be limited to the above-mentioned technical subjects, and other technical subjects which are not mentioned may be clearly understood, through the following descriptions, by those skilled in the art of the disclosure.

In order to solve the above problem, a communication method of a terminal according to an embodiment of the disclosure may include: receiving a first broadcast signal including transmission information of a second broadcast signal from a base station; receiving the second broadcast signal including transmission information of a paging signal from the base station based on the transmission information of the second broadcast signal; and receiving the paging signal from the base station based on the transmission information of the paging signal.

Receiving of the paging signal may include: transmitting a message including at least one of identification information of the terminal or paging identification information to the base station; and receiving, from the base station, the paging signal transmitted according to at least one of the identification information of the terminal or the paging identification information.

The second broadcast signal may include information on whether a paging signal for a paging area, to which the terminal belongs, is transmitted, and the paging signal may be received from the base station, in case that the paging signal is transmitted from the paging area, to which the terminal belongs.

The communication method of the terminal may further include: identifying a radio access technology (RAT), according to which the terminal desires to receive the paging signal; and receiving the paging signal from a base station included in the RAT, according to which the terminal desires to receive the paging signal.

In order to solve the above problem, a communication method of a base station according to an embodiment of the disclosure may include: transmitting a first broadcast signal including transmission information of a second broadcast signal to a terminal; transmitting the second broadcast signal including transmission information of a paging signal based on the transmission information of the second broadcast signal; and transmitting the paging signal to the terminal based on the transmission information of the paging signal.

Transmitting of the paging signal may include: receiving a message including at least one of identification information of the terminal or paging identification information from the terminal; and determining whether to transmit the paging signal to the terminal, according to at least one of the identification information of the terminal or the paging identification information, and transmitting the paging signal to the terminal.

Transmitting of the paging signal may include: receiving information for determination of a radio access technology (RAT), according to which the terminal desires to receive the paging signal, from at least one among the terminal and an entity that controls the paging signal of the terminal; and transmitting the paging signal to the terminal, in case that the base station is included in the RAT to which the terminal desires to receive the paging signal.

In order to solve the above problem, a terminal according to an embodiment of the disclosure may include: a transmission/reception unit configured to transmit or receive a signal; and a control unit configured to receive a first broadcast signal including transmission information of a second broadcast signal from a base station, receive the second broadcast signal including transmission information of a paging signal from the base station based on the transmission information of the second broadcast signal, and receive the paging signal from the base station based on the transmission information of the paging signal.

In order to solve the above problem, a base station according to an embodiment of the disclosure may include: a transmission/reception unit configured to transmit or receive a signal; and a control unit configured to transmit a first broadcast signal including transmission information of a second broadcast signal to a terminal, transmit the second broadcast signal including transmission information of a paging signal to the terminal based on the transmission information of the second broadcast signal, and transmit the paging signal to the terminal based on the transmission information of the paging signal.

According to an embodiment of the disclosure, reduction of power consumption of a terminal is provided by supporting paging transmission or reception through 4G or 5G. Reduction of a base station load or a network load is provided by supporting paging transmission or reception through 4G or 5G. Reduction of connection latency/collision of a terminal may be provided by separating connection and reconnection to radio access technology (RAT) through 4G or 5G.

According to an embodiment of the disclosure, reliability may be provided by supporting an RRC connection through 4G and 5G. Reduction of latency may be provided by supporting the RRC connection through 4G and 5G. High speed data transmission may be provided by supporting multiple connections through 4G and 5G.

According to an embodiment of the disclosure, when a serving node of a terminal is changed, reduction of a total latency time due to a latency time of a network is possible, and a data unit (DU) can also process a quick DU change by using beam feedback information.

Effects obtainable from the disclosure may not be limited to the above-mentioned effects, and other effects which are not mentioned may be clearly understood, through the following descriptions, by those skilled in the art of the disclosure.

DETAILED DESCRIPTION

Figure 1:
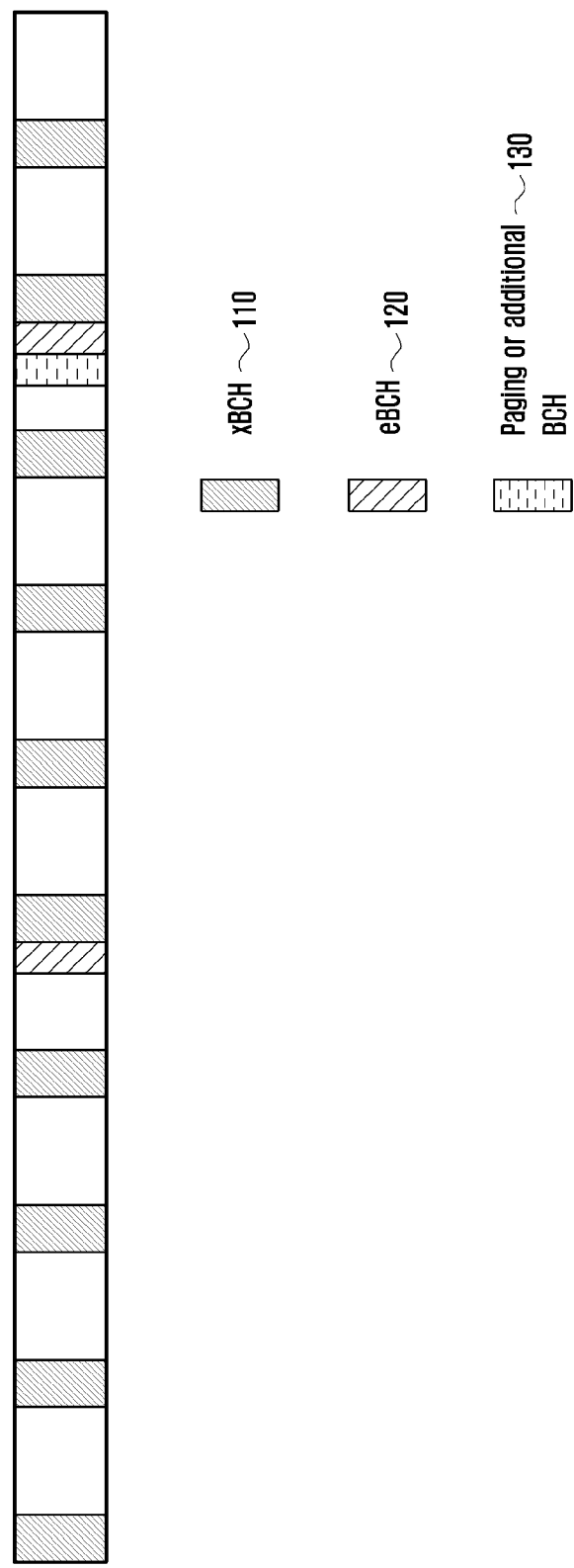
FIG. 1 is an example of a paging channel operating in a 5G system according to an embodiment of the disclosure.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

When an element is referred to as being "connected to" or "accessing" another element, the element may be connected to or access the another element directly, or there may be a third element in the middle and electrically connected. The description of "including" a specific element in the specification does not exclude an element other than the specific element and represents that an additional element may be included in the implementation or the technical scope of the disclosure.

The element units shown in the embodiments of the disclosure are illustrated independently to represent different characteristic functions, but it doesn't mean that each of the element units is a separate piece of hardware or one software element unit. That is, each of the element units is listed for convenience of explanation, and at least two of the element units may configure one element unit, or one element unit may be divided into a plurality of element units to perform functions. The separate embodiments as well as the integrated embodiments of respective element units are included in the scope of the disclosure unless they depart from the essence.

Some elements are not necessary for performing essential functions in the disclosure, and may be optional elements merely to improve performance. The disclosure may be implemented including only elements essential for realizing the essence of the disclosure, except for elements used for performance improvement, and a structure including only essential elements excluding optional elements used merely for performance improvement is also included in the scope of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which is executed via the processor of the computer or other programmable data processing apparatus, generate means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

As used herein, the term "-unit" refers to a software element or a hardware element, such as an FPGA or an ASIC, which performs a predetermined function. However, the "-unit" does not always have a meaning limited to software or hardware. The "-unit" may be configured either to be stored in an addressable storage medium or to execute one or more processors. Therefore, the "-unit" includes, for example, software elements, object-oriented software elements, class elements and task elements, processes, functions, properties, procedures, sub-routines, segments of a program code, drivers, firmware, micro-codes, circuits, data, database, data structures, tables, arrays, and parameters. Elements and functions provided by the "-unit" may be either combined into a smaller number of elements and the "-units" or divided into a larger number of elements and the "-units". Moreover, elements and "-units" may be implemented to reproduce one or more CPUs within a device or a security multimedia card.

Embodiment 1

(1-1) A Paging Channel, a Paging Transmission Method, and Paging Information

FIG. 1 is an example of a paging channel operating in a 5G system according to an embodiment of the disclosure.

Referring to FIG. 1, a scenario, in which a first broadcast channel (BCH) 110, a second BCH 120, and a paging signal or an additional BCH (or a third BCH) 130 are transmitted, is illustrated. The first BCH 110 may be referred to as, for example, a primary BCH (PBCH) or xBCH, and the second BCH 120 may be referred to as, for example, a secondary BCH (SBCH) or an enhanced/evolved/extended BCH (eBCH), or the like.

An information block (e.g., a master information block (MIB)) may be periodically transmitted at a determined position through an xBCH 110. For convenience of description, the case where information transmitted through the xBCH 110 is an MIB will be described as an example. The MIB may include at least one of a system frame number (SFN), a beam reference signal configuration, whether the eBCH 120 is transmitted, a transmission cycle of the eBCH 120, a transmission position of the eBCH 120, version information of the eBCH 120, and paging area information of a base station transmitting the eBCH 120. According to an embodiment of the disclosure, the MIB may include information on whether a terminal supports access for multiple connections is supported. Receiving the broadcast channel (e.g., the xBCH 110, the bBCH 120, etc.) by the terminal represents receiving a signal (e.g., a signal including an MIB, etc.) transmitted through the BCH (110 or 120), and, for convenience of explanation, receiving (transmitting) the BCHs 110 or 120 and receiving (transmitting) a broadcast signal transmitted through the BCHs 110 or 120 may be used in combination. For example, receiving of the eBCH 120 by the terminal may represent that the terminal receives a signal transmitted through the eBCH 120. The term "base station" and the term "cell" may be used interchangeably.

The following [Table 1] is an example of MIB 110 information of a 5G system according to an embodiment of the disclosure.

TABLE 1

| | |
|---|---|
| SFN | System frame number |
| Beam reference signal configuration | Beam measurement reference signal transmission information (e.g., a cycle, a position, and the like) |
| Whether eBCH is transmitted | Whether eBCH is transmitted in this MIB cycle |
| eBCH transmission cycle | eBCH transmission cycle |
| eBCH version information | For example, when changing eBCH, version information may be incremented by 1 (e.g., using wrap-around, etc.). |
| Paging area information | A paging area code of a base station that transmits eBCH |
| Multiple connection access information | Notifying of supporting multiple cell connection access |

The eBCH 120 may be transmitted in a cycle defined in the MIB 110 or a system, and a transmission position of the eBCH 120 may be defined in the MIB or the system. The eBCH 120 may include at least one piece of information from among a system parameter (e.g., a base station ID, etc.) necessary for accessing a cell by a terminal, radio configuration information (e.g., random access channel (RACH) configuration information, etc.), a paging signal transmission cycle, a paging signal transmission position, transmission information of the remaining system information, paging area information of a base station transmitting the eBCH 120, and information of a paging area to which a terminal that will receive a paging signal belongs. According to an embodiment of the disclosure, the eBCH 120 may include information on whether the terminal supports access for multiple connections is supported.

The following [Table 2] is an example of eBCH information of a 5G system according to an embodiment of the disclosure.

TABLE 2

| | |
|---|---|
| A base station ID | For example, a globally unique ID of a base station, etc. |
| Radio configuration | For example, a parameter necessary for system access, etc. |
| Paging signal transmission indication | Whether a paging signal is transmitted in an eBCH cycle may be notified. |
| A paging signal transmission position | Information on a resource position at which a paging signal is transmitted |
| A paging signal transmission cycle | A paging signal transmission cycle |
| Paging area information | A paging area code of a base station that transmits eBCH |
| Paging area-specific paging signal transmission information | Whether a paging signal for each paging area of the system is transmitted in an eBCH cycle may be notified. |
| Transmission information of the remaining system information | Whether system information other than eBCH is transmitted may be notified. |
| Multiple connection access information | Notifying of supporting multiple cell connection access |

(1-2) An Embodiment of a Paging Monitoring Operation

A terminal may receive configuration information (e.g., an MIB transmitted through the xBCH 110, etc.) and may acquire at least one of whether the eBCH 120 is transmitted, a transmission cycle of the eBCH 120 and a transmission position of the eBCH 120, version information of the eBCH 120, and paging area information of a base station that transmits an MIB.

When the MIB 110 indicates transmission of the eBCH 120, the terminal may receive the eBCH 120 according to a transmission cycle of the eBCH 120 and a transmission position of the eBCH 120. The transmission cycle of the eBCH 120 and the transmission position of the eBCH 120 may be values transmitted through the MIB 110 or values previously defined by system and known to the terminal. According to an embodiment, when version information of the eBCH 120 is used, if a version information value of the eBCH 120 is not changed, the terminal may omit reception of the eBCH 120.

The terminal may receive, via the eBCH 120, radio configuration information or a system parameter necessary for cell access. If information on whether remaining system information (e.g., an additional BCH 130) is transmitted is received via the eBCH 120, the terminal may receive the remaining system information 130 at a transmission position of the remaining system information. The transmission position of the remaining system information 130 may be a value acquired through transmission information of the remaining system information transmitted via the eBCH 120 or a value previously defined by the system.

According to an embodiment, if the MIB 110 and/or the eBCH 120 are received, the terminal may acquire information on whether the base station supports multiple connection access via a signal transmitted via the MIB 110 and/or the eBCH 120. When the base station supports multiple connection access of the terminal according to the information of the MIB 110 and/or the eBCH 120, a terminal that supports the multiple connection access may perform a multiple connection access procedure via the base station. Further, a terminal that does not support multiple connection access may perform radio access technology (RAT) connection supported by the base station via the base station. As an embodiment, when the terminal supports multiple connection access via an LTE cell and a 5G cell, and the base station supports multiple connection access via the LTE cell and the 5G cell, the terminal may perform a procedure of multiple connection access to the LTE cell and the 5G cell via the base station. Another embodiment, when the terminal supports access via only the 5G cell, and the base station supports multiple connection access via the LTE cell and the 5G cell, the terminal may perform a procedure of multiple connection access to the 5G cell via the base station. As still another embodiment, when the terminal supports access via only the LTE cell, and the base station supports multiple connection access via the LTE cell and the 5G cell, the terminal may not perform a procedure of multiple connection access to the 5G cell via the base station. The terminal may perform only a procedure of multiple connection access to the LTE cell via the base station.

According to an embodiment, a terminal in an idle mode may identify paging area information of a base station when the MIB 110 and/or the eBCH 120 are received. The terminal may perform a position registration procedure on the basis of the paging area information.

According to an embodiment, when the MIB 110 and/or the eBCH 120 are received, the terminal in the idle mode may confirm via the eBCH 120 whether a paging signal is transmitted. According to an embodiment, whether the paging signal is transmitted may be indicated as a 1-bit paging signal indicator and transmitted via the eBCH 120. Alternatively, according to an embodiment, whether the paging signal is transmitted may be indicated as information of a resource position in which the paging signal is transmitted. According to an embodiment, whether the paging signal transmission is performed may be indicated as information notifying of whether the paging signal is transmitted to each paging area supported by the system. The eBCH 120 may include at least one among information of the paging signal transmission cycle, information of the paging signal transmission position, and information of the number of paging signal transmission symbols. According to an embodiment, the terminal in an idle mode state may receive a paging signal on the basis of the paging signal transmission information acquired from the eBCH 120. According to an embodiment, the terminal in the idle mode state may receive a paging signal on the basis of paging signal transmission information for each paging area, which is acquired from the eBCH 120. According to an embodiment, when the eBCH 120 does not include information of the transmission cycle of the paging signal or information of the transmission position of the paging signal, the transmission cycle of the paging signal or the transmission position of the paging signal may be transferred to the terminal in advance via a dedicated signal. According to an embodiment, the paging signal may be transmitted in the same transmission format as that of the eBCH 120 or that of the additional BCH 130. According to an embodiment, the paging signal may be transmitted in the same transmission format as that of a PDSCH. According to an embodiment, the paging signal may be transmitted to one terminal as a target. Alternatively, the paging signal may be transmitted to one or more terminals as a target. The transmission format of the paging signal may correspond to one among an MCS level, a modulation order, channel coding, the number of repetitions, and a physical channel.

(1-3) An Embodiment of a Paging Monitoring Operation in a Beamforming System (1-3-1)

In the case of a system to which beamforming is applied, at a paging signal monitoring time, a terminal may search for a downlink beam suitable for receiving the paging signal, monitor the suitable downlink beam, and receive the eBCH 120. Further, if a paging area has not been changed, the terminal may receive whether the paging signal is transmitted, according to indication of the eBCH 120. The paging signal may be received at a transmission resource position indicated by the eBCH 120 or at a transmission resource position previously known to the terminal. The terminal having determined, via the paging signal, that downlink data has been pending may continuously perform an access procedure for data transmission or reception via the base station. The terminal having determined, via the paging signal, that the downlink data has not been pending may maintain the idle mode. Meanwhile, when a change in the paging area is determined, the terminal may perform a position registration procedure. The terminal may perform the position registration procedure and receive the paging signal.

(1-3-2)

In the case of the system to which beamforming is applied, when a terminal searches, at a paging signal monitoring time, for a downlink beam suitable for receiving the paging signal, if it is determined that the terminal is located in a serving cell having been connected before transition to the idle mode, the terminal may monitor the serving cell and a used downlink beam and receive the eBCH 120. The terminal may receive whether the paging signal is transmitted, according to indication of the eBCH 120. The paging signal may be received at a transmission resource position indicated by the eBCH 120 or at a transmission resource position previously known to the terminal. The terminal having determined, via the paging signal, that downlink data has been pending may continuously perform an access procedure for data transmission or reception via the base station. The terminal having determined, via the paging signal, that the downlink data has not been pending may maintain the idle mode. Meanwhile, when a change in the paging area is determined, the terminal may perform a position registration procedure. The terminal may perform the position registration procedure and receive the paging signal.

(1-3-3)

In the case of the system to which beamforming is applied, at a paging signal monitoring time, a terminal may search for a downlink beam suitable for paging signal reception, monitor the suitable downlink beam, and receive the eBCH 120. According to an embodiment, the terminal may receive information indicating whether the paging signal is transmitted to each paging area. According to an embodiment, the information indicating whether the paging signal is transmitted to each paging area may include information indicating whether the paging signal corresponding to identification information (ID) of each paging area is transmitted. The information indicating whether the paging signal is transmitted to the each paging area may be transmitted via the eBCH 120. In accordance with the information indicating whether the paging signal is transmitted to the each paging area, the terminal may confirm whether there is a paging signal to be transmitted to a paging area, to which the terminal itself belongs. If the paging area has not been changed, the terminal may receive whether the paging signal is transmitted, according to indication (information indicating whether the paging signal is transmitted to the paging area) of the eBCH 120. The paging signal may be received at a transmission resource position indicated by the eBCH 120 or at a transmission resource position previously known to the terminal. The terminal having determined, via the paging signal, that downlink data has been pending may continuously perform an access procedure for data transmission or reception via the base station. The terminal having determined, via the paging signal, that the downlink data has not been pending may maintain the idle mode. Meanwhile, when a change in the paging area is determined, the terminal may perform a position registration procedure. The terminal may perform the position registration procedure and receive the paging signal.

(1-3-4)

Figure 2:
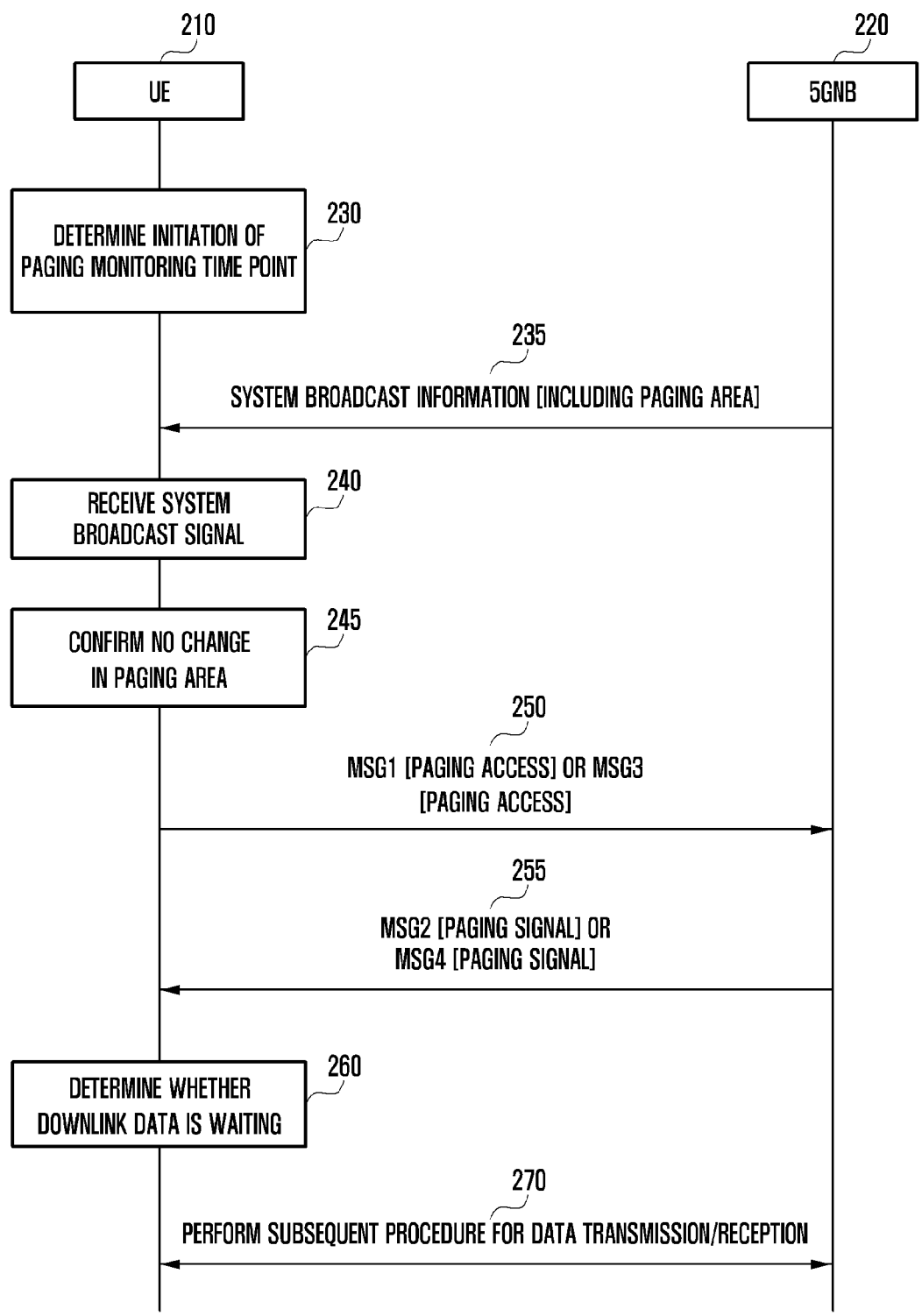
FIG. 2 is an example of a paging monitoring procedure in a 5G system according to an embodiment of the disclosure.

FIG. 2 is an example of a paging monitoring procedure in a 5G system according to an embodiment of the disclosure.

Referring to FIG. 2, in the case of a system to which beamforming is applied, a terminal 210 may determine initiation of a paging signal monitoring time, in step 230. At the paging signal monitoring time, the terminal 210 may search for a downlink beam suitable for paging signal reception, monitor the suitable downlink beam, and receive the eBCH 120, in steps 235 and 240. The eBCH 120 may be system broadcast information, and the eBCH 120 may include paging area information. The eBCH 120 may be transmitted by a base station 220. The base station 220 may be an LTE base station (evolved node B (eNB)), and may be a 5G base station (5GNB). When the base station 220 is a 5G base station (5GNB), the base station 220 may be a next generation base station (new radio node B (NR NB), gNB). This may also be applied to the following embodiments in the same way.

When the terminal 210 confirms (determines), in step 245, that a paging area has not been changed, the terminal 210 and the base station 220 may perform a random access procedure according to indication of the eBCH 120 in steps 250 and 255. While the random access procedure is being performed, the base station 220 may recognize the terminal 210 on the basis of paging access information, such as a terminal identifier (e.g., an ID of the terminal 210, a random access preamble for the terminal, etc.). The base station 220 may transmit a paging signal to the terminal 210 via the random access procedure. The paging signal which is transmitted to the terminal 210 by the base station 220 may be a unicast signal or may be a broadcast signal. When the paging signal is a broadcast signal, the paging signal may further include information to allow the terminal 210, which has received the paging signal, to check whether the paging signal indicates the terminal 210 itself.

For example, the base station 220 having received, in step 250, the paging access information (e.g., a terminal ID etc.) via msg1 of the random access procedure may transmit, in step 255, the paging signal to the terminal 210 via msg2 of the random access procedure. For example, an embodiment of a format of msg2 including the paging signal may include at least one among a 1-bit use format of a random access response (RAR) message, a 1-bit use format of an RAR message grant, a format concatenated to the RAR message (e.g., the RAR message grant may be a UL grant of the size sufficient for transmission of the RAR message and the paging signal), a format separated from the RAR message, a format transmitted instead of the RAR message, or the like. According to an embodiment, msg2 may include information indicating that the paging signal is to be transmitted (e.g., information indicating whether the paging signal is transmitted, etc.). The base station 220 may transmit the paging signal to the terminal 210 by using a separate message after transmission of msg2.

As another example, the base station 220 having received, in step 250, a terminal ID, etc. via msg3 of the random access procedure may transmit, in step 255, the paging signal to the terminal 210 via msg4 of the random access procedure. According to an embodiment, msg4 may include information indicating that the paging signal is to be transmitted (e.g., information indicating whether the paging signal is transmitted, etc.). The base station 220 may transmit the paging signal to the terminal 210 by using a separate message after transmission of msg4.

The terminal 210 having determined, via the paging signal in step 260, that downlink data has been pending may continuously perform an access procedure for data transmission or reception via the base station 220 in step 270. The terminal 210 having determined, via the paging signal, that the downlink data has not been pending may maintain an idle mode. Also, when a change in the paging area is determined in step 245, the terminal 210 may perform a position registration procedure. Although not illustrated, the terminal 210 may perform the position registration procedure and receive the paging signal.

(1-3-5)

Figure 3:
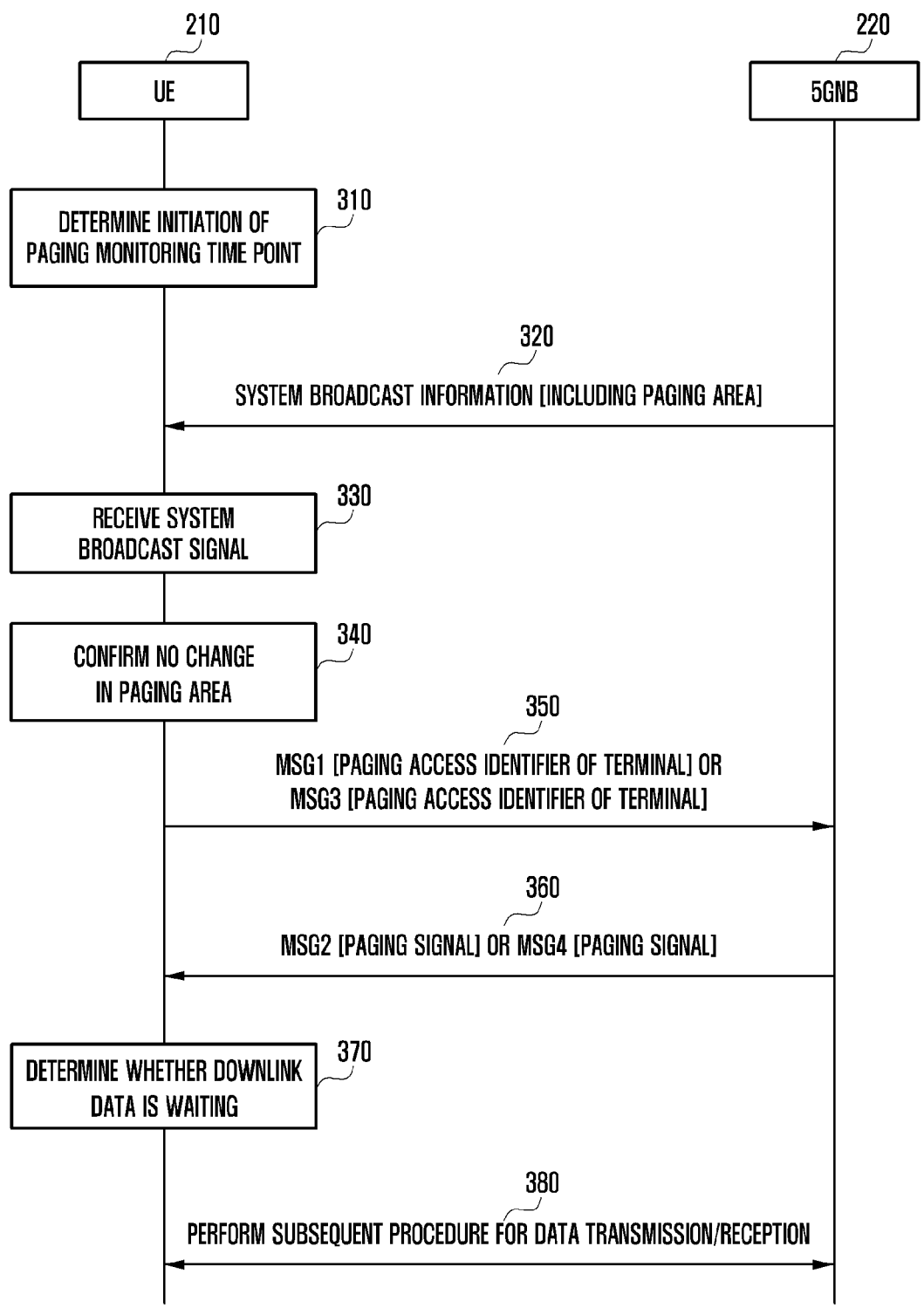
FIG. 3 is another example of a paging monitoring procedure in a 5G system according to an embodiment of the disclosure.

FIG. 3 is still another example of a paging monitoring procedure in a 5G system according to an embodiment of the disclosure.

Referring to FIG. 3, in the case of the system to which beamforming is applied, the terminal 210 may determine, in step 310, initiation of a paging signal monitoring time. At the paging signal monitoring time, the terminal 210 may search for a downlink beam suitable for paging signal reception, monitor the suitable downlink beam, and receive the eBCH 120, in steps 320 and 330.

When it is confirmed (determined) in step 340 that a paging area has not been changed, the terminal 210 and the base station 220 may perform a random access procedure according to indication of the eBCH 210, in steps 350 and 360. While the random access procedure is being performed, the base station 220 may recognize that there are one or more terminals 210 that monitor paging on the basis of paging access identification information of the terminal, such as a paging identifier (e.g., a random access preamble for paging, a random access resource for paging, a random access symbol for paging, etc.). The base station 220 may transmit a paging signal to the one or more terminals 210 via the random access procedure.

For example, the base station 220 having received, in step 350, the paging access identification information (e.g., a paging ID, etc.) of the terminal via msg1 of the random access procedure may transmit, in step 360, the paging signal to the one or more terminals 210 via msg2 of the random access procedure. For example, an embodiment of a format of msg2 including the paging signal may include at least one among a 1-bit use format of an RAR message, a 1-bit use format of an RAR message grant, a format concatenated to the RAR message (e.g., the RAR message grant may be a UL grant of the size sufficient for transmission of the RAR message and the paging signal), a format separated from the RAR message, a format transmitted instead of the RAR message, or the like. According to an embodiment, msg2 may include information indicating that the paging signal is to be transmitted (e.g., information indicating whether the paging signal is transmitted, etc.). The base station 220 may transmit the paging signal to the terminal 210 by using a separate message after transmission of msg2.

As another example, the base station 220 having received, in step 350, paging access identification information (e.g., a paging ID, etc.) of the terminal via msg3 of the random access procedure may transmit, in step 360, the paging signal to the one or more terminal 210 via msg4 of the random access procedure. According to an embodiment, msg4 may include information indicating that the paging signal is to be transmitted (e.g., information indicating whether the paging signal is transmitted, etc.). The base station 220 may transmit the paging signal to the terminal 210 by using a separate message after transmission of msg4.

The procedure may also be applied when the random access procedure including a paging identifier is performed in each beam.

The terminal 210 having determined, via the paging signal in step 370, that downlink data has been pending may continuously perform, in step 380, an access procedure for data transmission or reception via the base station 220. The terminal 210 having determined, via the paging signal, that the downlink data has not been pending may maintain an idle mode. Also, when a change in the paging area is determined in step 340, the terminal 210 may perform a position registration procedure. Although not illustrated, the terminal 210 may perform the position registration procedure and receive the paging signal.

(1-3-6)

Figure 4:
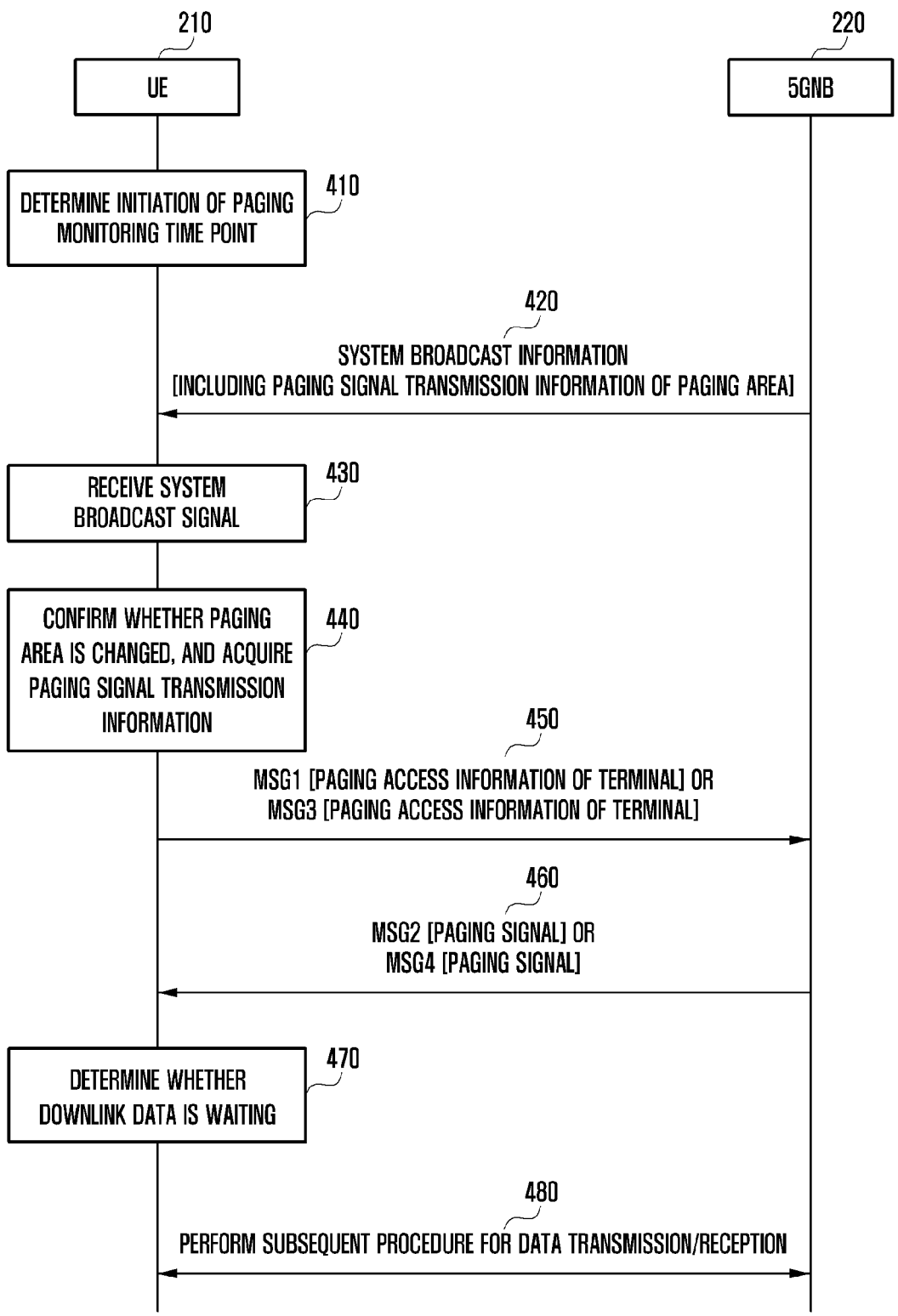
FIG. 4 is still another example of a paging monitoring procedure in a 5G system according to an embodiment of the disclosure.

FIG. 4 is still another example of a paging monitoring procedure in a 5G system according to an embodiment of the disclosure.

Referring to FIG. 4, in the case of the system to which beamforming is applied, a terminal 210 may determine initiation of a paging signal monitoring time, in step 410. At the paging signal monitoring time, the terminal 210 may search for a downlink beam suitable for paging signal reception, monitor the suitable downlink beam, and receive the eBCH 120, in steps 420 and 430.

The terminal 210 may receive information indicating whether a paging signal is transmitted to each paging area via the eBCH 210 transmitted in step 420. In step 440, the terminal 210 may check whether there is a paging signal to be transmitted to a paging area to which the terminal 210 itself belongs. In step 440, the terminal 210 may check whether a paging area has been changed, and may check whether there is a paging signal to be transmitted in the paging area.

When the terminal 210 confirms (determines) in step 440 that the paging area has not been changed, the terminal 210 and the base station 220 may perform a random access procedure according to indication of the eBCH 120, in steps 450 and 460. While the random access procedure is being performed, the base station 220 may recognize that there are one or more terminals 210 that monitor paging on the basis of paging access identification information of the terminal, such as a paging identifier (e.g., a random access preamble for paging, a random access resource for paging, a random access symbol for paging, etc.). The base station 220 may transmit a paging signal to the one or more terminals 210 via the random access procedure.

For example, the base station 220 having received, in step 450, the paging access identification information (e.g., a paging ID, etc.) of the terminal via msg1 of the random access procedure may transmit, in step 460, the paging signal to the one or more terminals 210 via msg2 of the ransom access procedure. An embodiment of a format of msg2 including the paging signal may include at least one among a 1-bit use format of an RAR message, a 1-bit use format of an RAR message grant, a format concatenated to the RAR message (e.g., the RAR message grant may be a UL grant of the size sufficient for transmission of the RAR message and the paging signal), a format separated from the RAR message, a format transmitted instead of the RAR message, or the like. According to an embodiment, msg2 may include information indicating that the paging signal is to be transmitted (e.g., information indicating whether the paging signal is transmitted, etc.). The base station 220 may transmit the paging signal to the terminal 210 by using a separate message after transmission of msg2.

As another example, the base station 220 having received, in step 450, paging access identification information (e.g., a paging ID, etc.) of the terminal via msg3 of the random access procedure may transmit, in step 460, the paging signal to the one or more terminal 210 via msg4 of the random access procedure. According to an embodiment, msg4 may include information indicating that the paging signal is to be transmitted (e.g., information indicating whether the paging signal is transmitted, etc.). The base station 220 may transmit the paging signal to the terminal 210 by using a separate message after transmission of msg4.

The procedure may also be applied when the random access procedure including a paging identifier is performed in each beam.

The terminal 210 having determined, via the paging signal in step 470, that downlink data has been pending may continuously perform an access procedure for data transmission or reception via the base station 220 in step 480. The terminal 210 having determined, via the paging signal, that the downlink data has not been pending may maintain an idle mode. Also, when a change in the paging area is determined in step 440, the terminal 220 may perform a position registration procedure. Although not illustrated, the terminal 210 may perform the position registration procedure and receive the paging signal.

(1-3-7)

Figure 5:
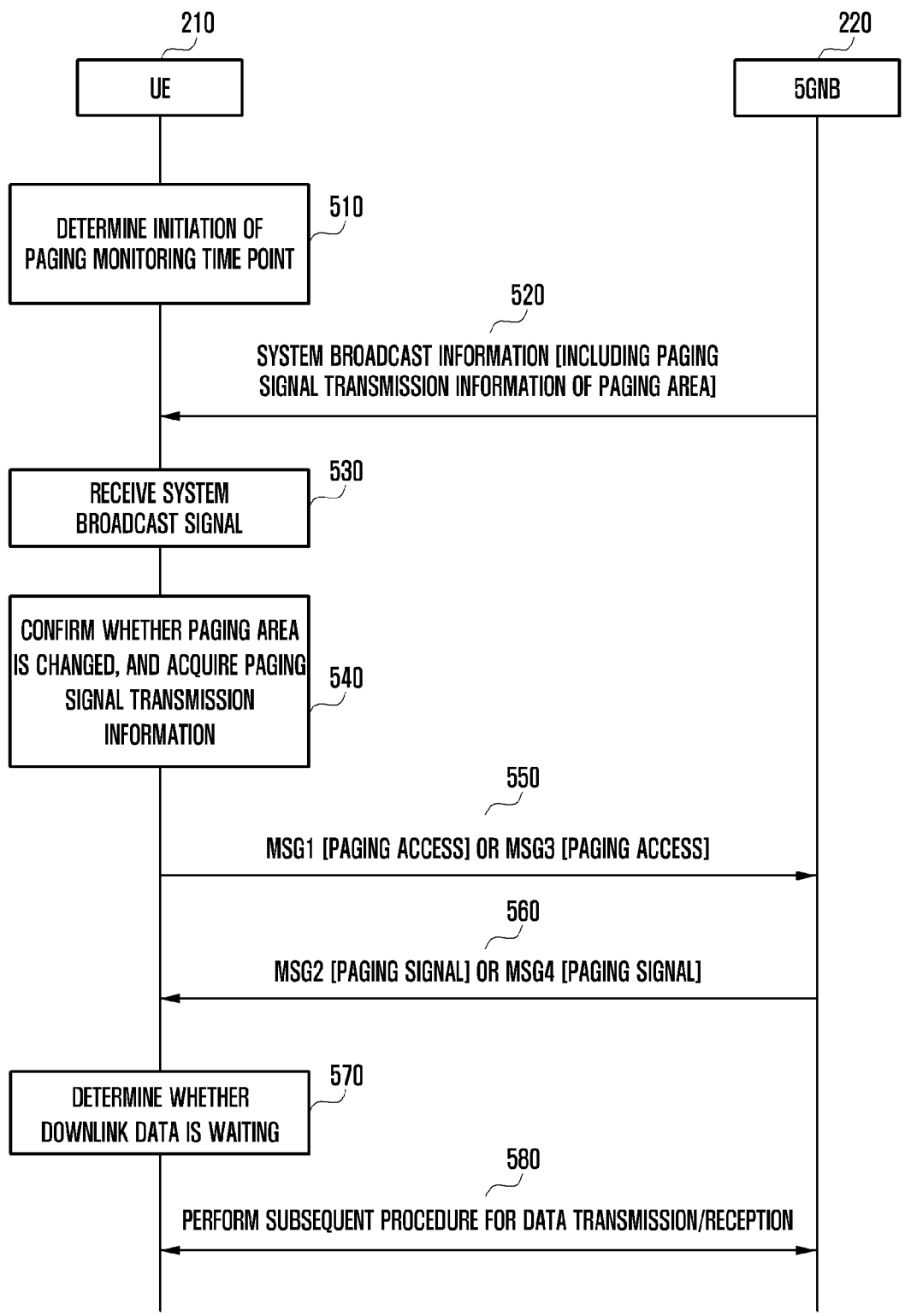
FIG. 5 is still another example of a paging monitoring procedure in a 5G system according to an embodiment of the disclosure.

FIG. 5 is still another example of a paging monitoring procedure in a 5G system according to an embodiment of the disclosure.

Referring to FIG. 5, in the case of the system to which beamforming is applied, a terminal 210 may determine initiation of a paging signal monitoring time, in step 510. The terminal 210 may search, at a paging signal monitoring time, for a downlink beam suitable for paging signal reception, monitors the suitable downlink beam, and receive the eBCH 120, in steps 520 and 530.

The terminal 210 may receive information indicating whether a paging signal is transmitted to each paging area via the eBCH 210 transmitted in step 520. In step 540, the terminal 210 may check whether there is a paging signal to be transmitted to a paging area to which the terminal 210 itself belongs. In step 540, the terminal 210 may check whether a paging area has been changed, and may check whether there is a paging signal to be transmitted in the paging area.

When the terminal 210 confirms (determines) in step 440 that the paging area has not been changed, the terminal 210 and the base station 220 may perform a random access procedure according to indication of the eBCH 120, in steps 550 and 560. While the random access procedure is being performed, the base station 220 may recognize the terminal 210 on the basis of paging access information, such as a terminal identifier (e.g., the terminal ID, the random access preamble for the terminal, etc.). The base station 220 may transmit the paging signal to the terminal via the random access procedure.

For example, the base station 220 having received, in step 550, the paging access information (e.g., a terminal ID etc.) via msg1 of the random access procedure may transmit, in step 560, the paging signal to the terminal 210 via msg2 of the random access procedure. An embodiment of a format of msg2 including the paging signal may include at least one among 1-bit use format of an RAR message, a 1-bit use format of an RAR message grant, a format concatenated to the RAR message (e.g., the RAR message grant may be a UL grant of the size sufficient for transmission of the RAR message and the paging signal), a format separated from the RAR message, a format transmitted instead of the RAR message, or the like. According to an embodiment, msg2 may include information indicating that the paging signal is to be transmitted (e.g., information indicating whether the paging signal is transmitted, etc.). The base station 220 may transmit the paging signal to the terminal 210 by using a separate message after transmission of msg2.

As another example, the base station 220 having received, in step 550, a terminal ID, etc. via msg3 of the random access procedure may transmit, in step 560, the paging signal to the terminal 210 via msg4 of the random access procedure. According to an embodiment, msg4 may include information indicating that the paging signal is to be transmitted (e.g., information indicating whether the paging signal is transmitted, etc.). The base station 220 may transmit the paging signal to the terminal 210 by using a separate message after transmission of msg4.

The terminal 210 having determined, via the paging signal in step 570, that downlink data has been pending may continuously perform an access procedure for data transmission or reception via the base station 220 in step 580. The terminal 210 having determined, via the paging signal, that the downlink data has not been pending may maintain an idle mode. When a change in the paging area is determined in step 540, the terminal 210 may perform a position registration procedure. Although not illustrated, the terminal 210 may perform the position registration procedure and receive the paging signal.

Figure 6:
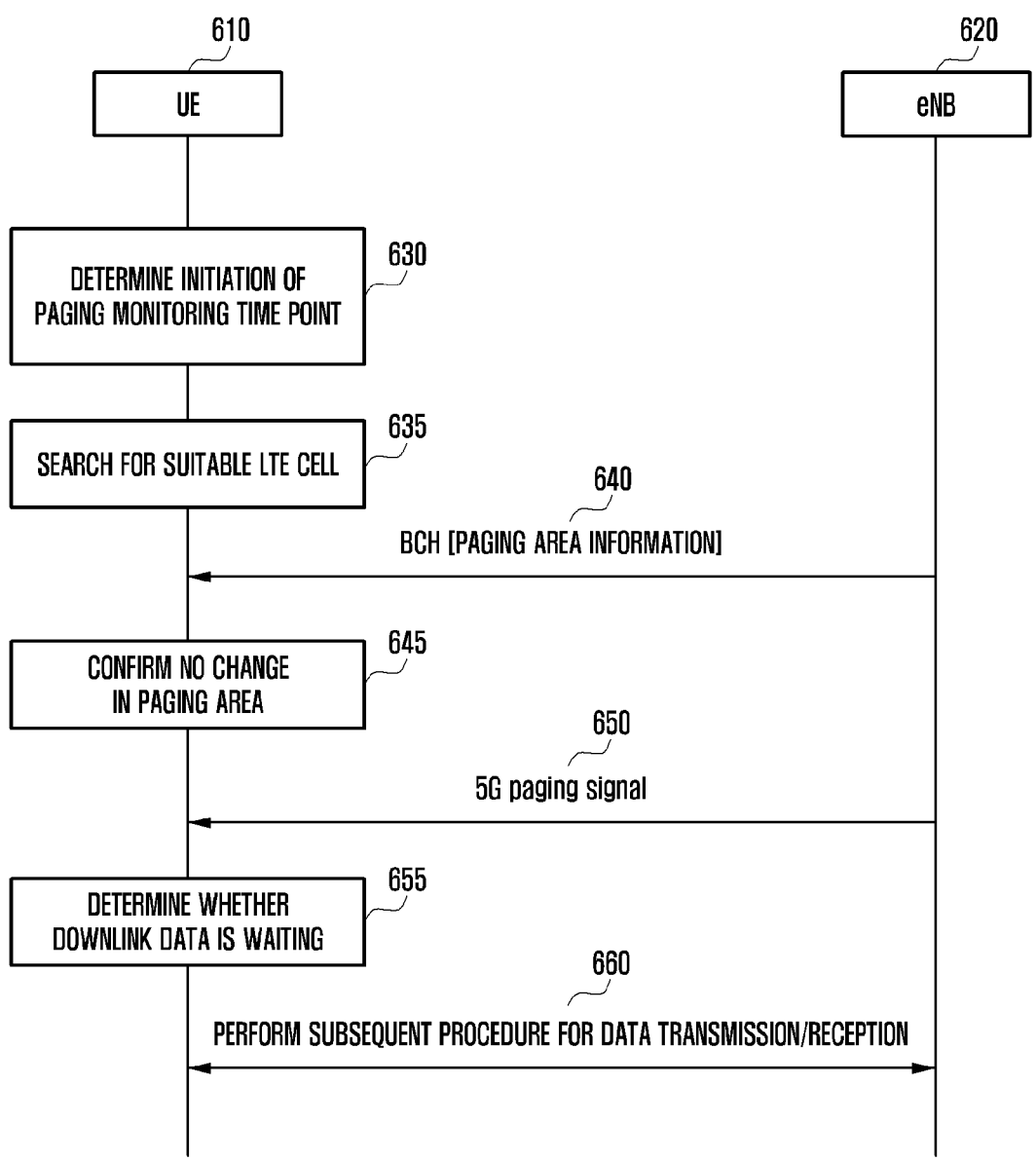
FIG. 6 is still another example of a paging monitoring procedure in a 5G system according to an embodiment of the disclosure.

(1-4) Another Embodiment of a Paging Monitoring Operation in a Beam Forming System FIG. 6 is still another example of a paging monitoring procedure in a 5G system according to an embodiment of the disclosure.

Referring to FIG. 6, in the case of the system to which beamforming is applied, a terminal 610 may determine, in step 630, initiation of a paging signal monitoring time. At a paging signal monitoring time, the terminal 610 may search for an LTE cell 620 suitable for paging signal reception, in step 635. The terminal 610 may receive the eBCH 120 (or BCH) from the selected LTE cell 620, in step 640.

When the terminal 610 confirms (determines) in step 645 that a paging area has not been changed, the terminal 610 may receive, in step 650, a paging signal according to indication of the eBCH 120. Here, the paging signal may be a signal related to whether data to be transmitted from a 5G base station is pending.

The eBCH 120 or the paging signal transmitted from the LTE cell 620 may be transmitted or received using a transmission format specific to a terminal supporting the system, to which beamforming is applied, a transmission format specific to a 5G terminal, or a decoding identifier (e.g., using a separate paging RNTI different from a paging RNTI used in an existing LTE system, and the like).

The terminal 610 having determined, via the paging signal in step 655, that downlink data has been pending may continuously perform, in step 660, an access procedure for data transmission or reception via the LTE base station 620. For example, the terminal 610 and the 5G base station may perform, in step 660, a procedure of establishing a 5G connection for 5G data transmission or reception via the LTE base station 620. For example, a procedure of RRC setup between the terminal 610 and the 5G be may be performed, and a procedure of setting a bearer (e.g., a signaling radio bearer (SRB) 3) for 5G RRC may be performed.

The terminal 610 having determined, via the paging signal, that the downlink data has not been pending may maintain an idle mode. Also, when a change in the paging area is determined in step 645, the terminal 610 may perform a position registration procedure. Although not illustrated, the terminal 610 may perform the position registration procedure and receive the paging signal.

Figure 7:
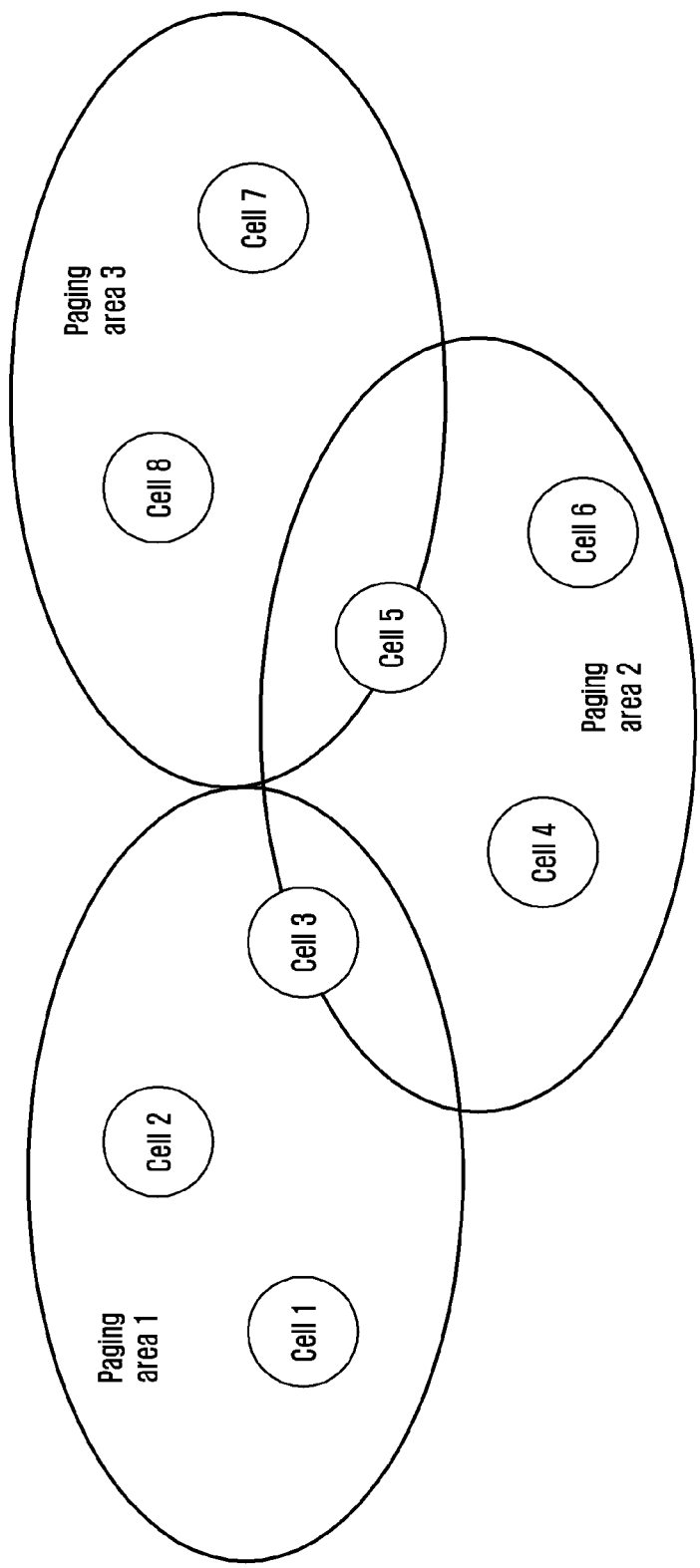
FIG. 7 is an example of a cell-based paging area operation according to an embodiment of the disclosure.
Figure 8:
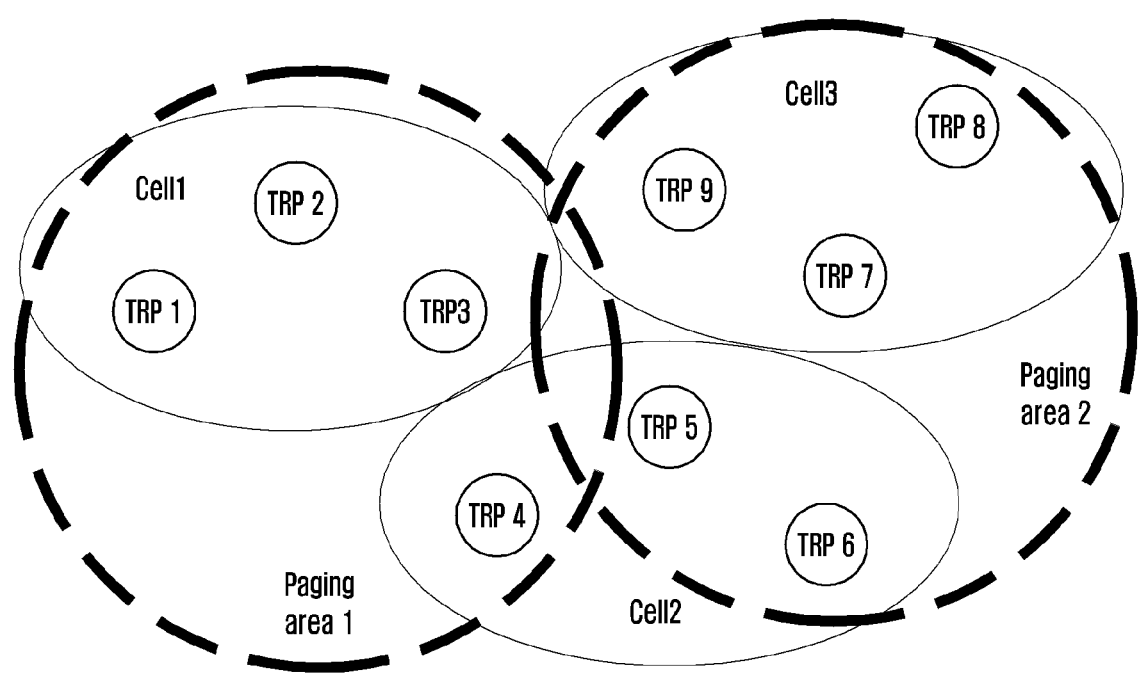
FIG. 8 is an example of a TRP-based paging area operation according to an embodiment of the disclosure.
Figure 9:
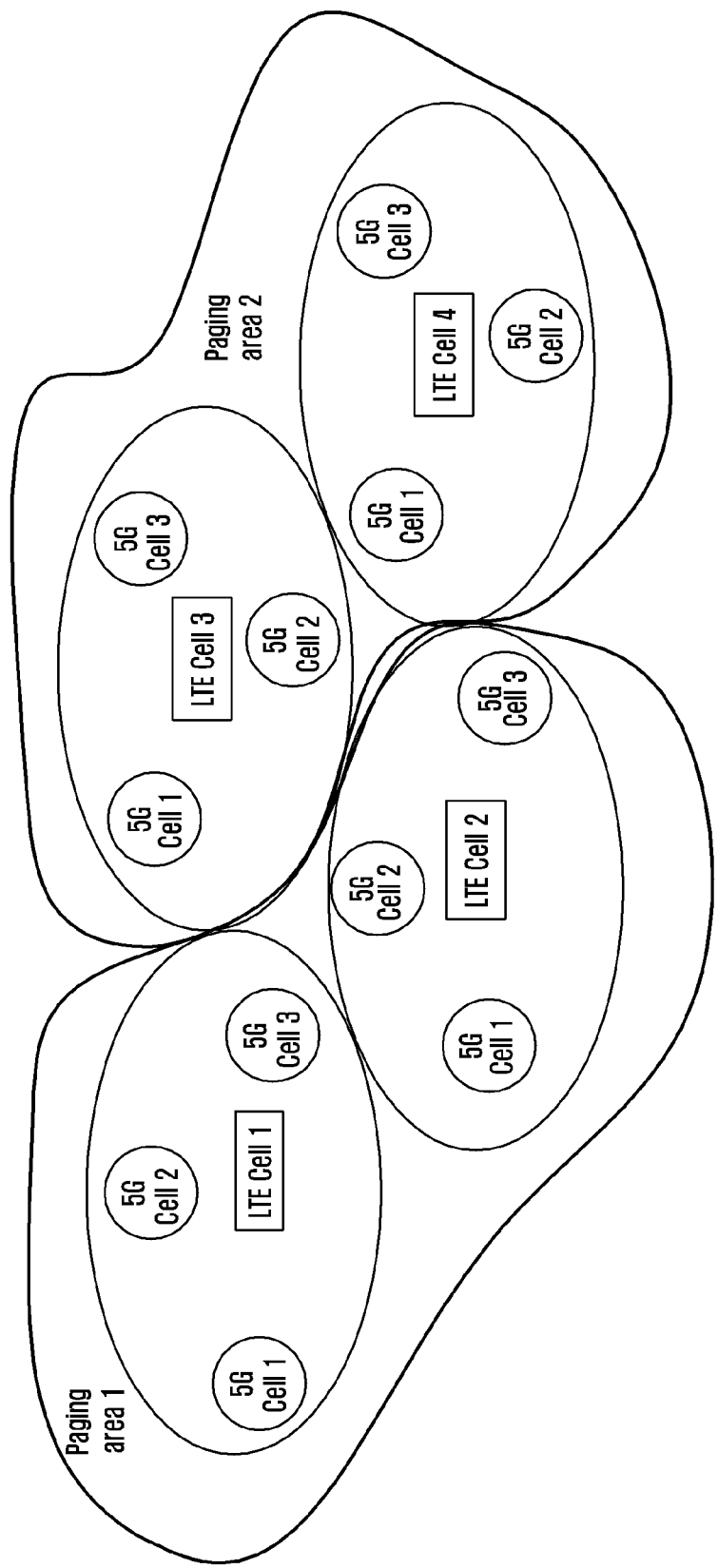
FIG. 9 is an example of an LTE base station-based paging area operation according to an embodiment of the disclosure.
Figure 10:
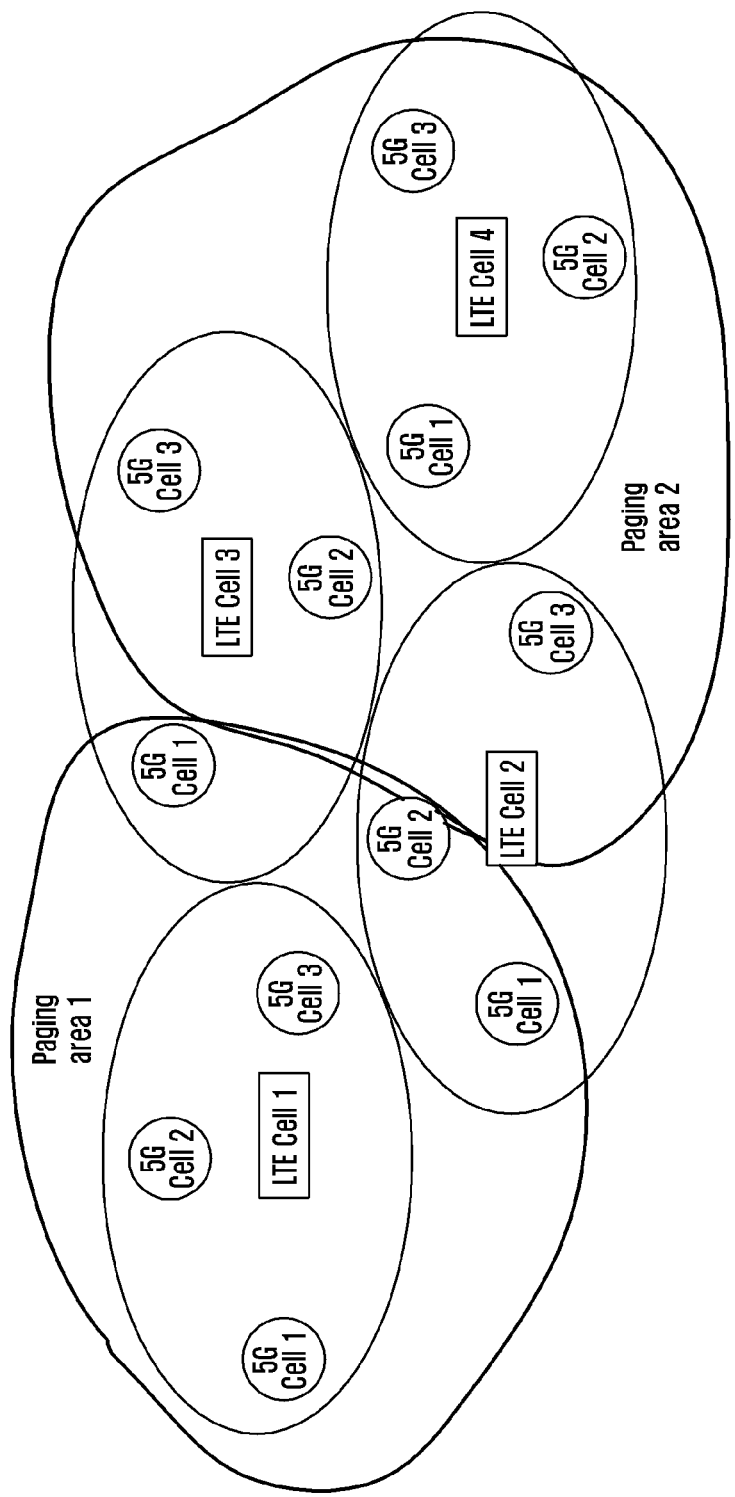
FIG. 10 is an example of a 5G base station-based paging area operation according to an embodiment of the disclosure.

(1-5) An Embodiment of a Paging Area in an LTE and 5G Coexistence System or a 5G System FIG. 7 is an example of a cell-based paging area operation according to an embodiment of the disclosure, FIG. 8 is an example of a TRP-based paging area operation according to an embodiment of the disclosure, FIG. 9 is an example of an LTE base station-based paging area operation according to an embodiment of the disclosure, and FIG. 10 is an example of a 5G base station-based paging area operation according to an embodiment of the disclosure.

An MIB or an eBCH may include paging area code information. A paging area may be configured based on a cell, a transmission/reception point (TRP), an LTE base station, a 5G base station, a radio unit (RU), a data unit (DU), a control unit (CU), or the like. For example, in a cell-based paging area, one or more cells may constitute one paging area. For example, in a TRP-based paging area, one or more TRPs may constitute one paging area. For example, in an LTE base station-based paging area, one or more LTE base stations may constitute one paging area. Here, one LTE base station may be connected to one or more 5G base stations. For example, in a 5G base station-based paging area, one or more 5G base stations may constitute one paging area. Here, one 5G base station may be connected to one or more LTE base stations. For example, in a CU-based paging area, one or more CUs may constitute one paging area.

Referring to FIG. 7, one or more cells may constitute one paging area. Further, one cell may belong to one or more paging areas. Referring to FIG. 8, one or more TRPs belonging to one or more cells may constitute one paging area. One TRP may belong to one or more paging areas. Referring to FIG. 9, one or more LTE base stations may constitute one paging area. One LTE base station may belong to one or more paging areas. Referring to FIG. 10, one or more 5G base stations may constitute one paging area. One 5G base station may belong to one or more paging area.

The terminal having received paging area code information transmitted from the MIB or the BCH/eBCH may determine (confirm) whether the MIB or BCH/eBCH includes paging area code information that is unknown to the terminal, instead of including paging area code information that is known to the terminal. If the MIB or the BCH/eBCH does not include paging area code information that is known to the terminal, the terminal may perform a position registration procedure via a cell having received the MIB or the BCH/eBCH. As another embodiment, the terminal having received paging area code information transmitted from the MIB or the BCH/eBCH and information indicating whether a paging signal for each paging area may determine whether there is paging signal transmission to its own paging area. If there is paging signal transmission to the terminal's own paging area, and the MIB or the BCH/eBCH includes paging area code information that is unknown to the terminal, instead of including paging area code information that is known to the terminal, the terminal may perform the position registration procedure through the cell having received the MIB or the BCH/eBCH. The terminal may receive a paging signal. If there is no paging signal transmission to the terminal's own paging area, and the MIB or the BCH/eBCH includes paging area code information that is unknown to the terminal, instead of including paging area code information that is known to the terminal, the terminal may postpone the position registration procedure.

Figure 11:
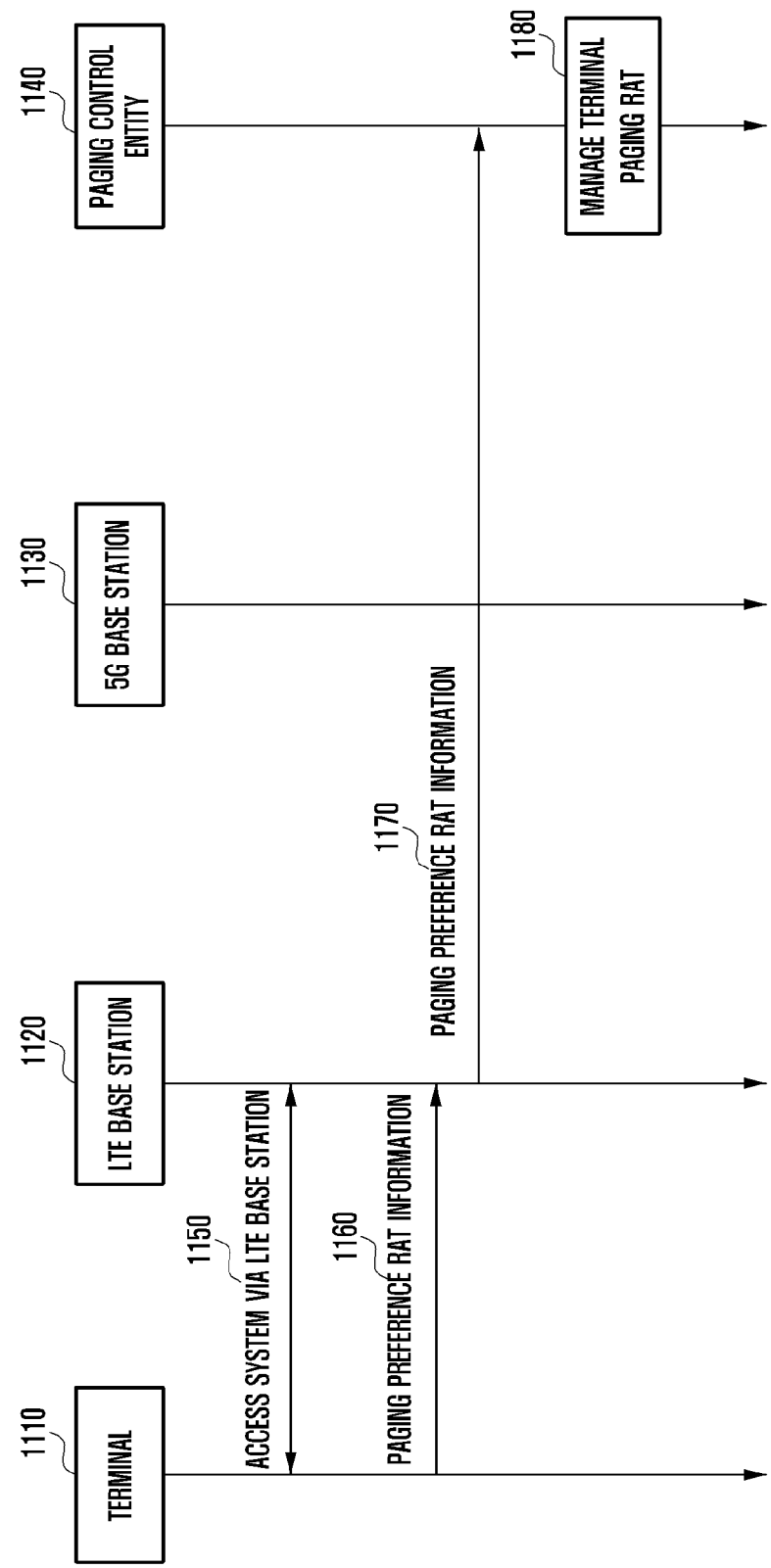
FIG. 11 is an embodiment of a paging RAT selection procedure in a 4G and 5G coexistence system according to an embodiment of the disclosure.
Figure 12:
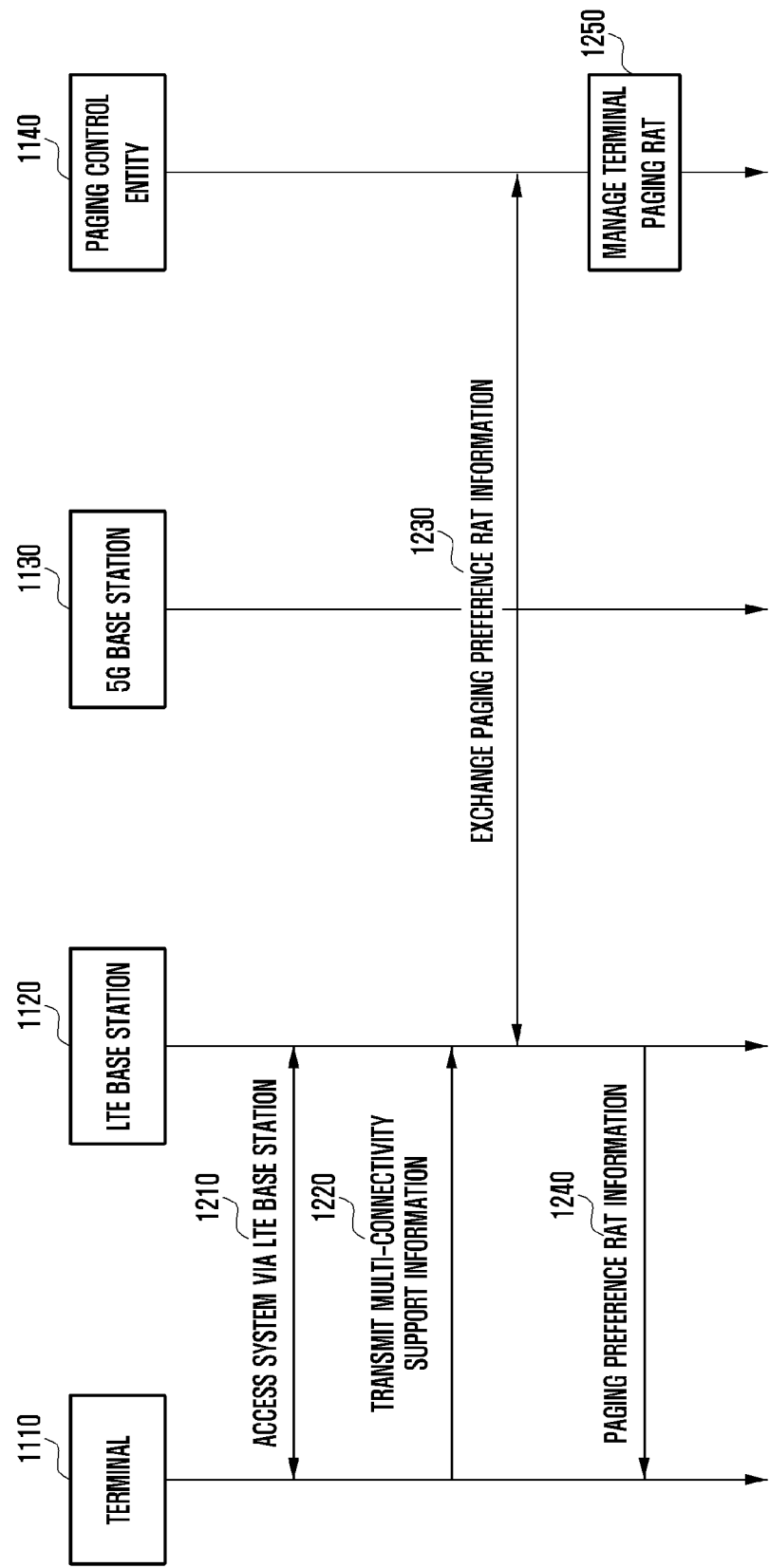
FIG. 12 is another embodiment of a paging RAT selection procedure in a 4G and 5G coexistence system according to an embodiment of the disclosure.
Figure 13:
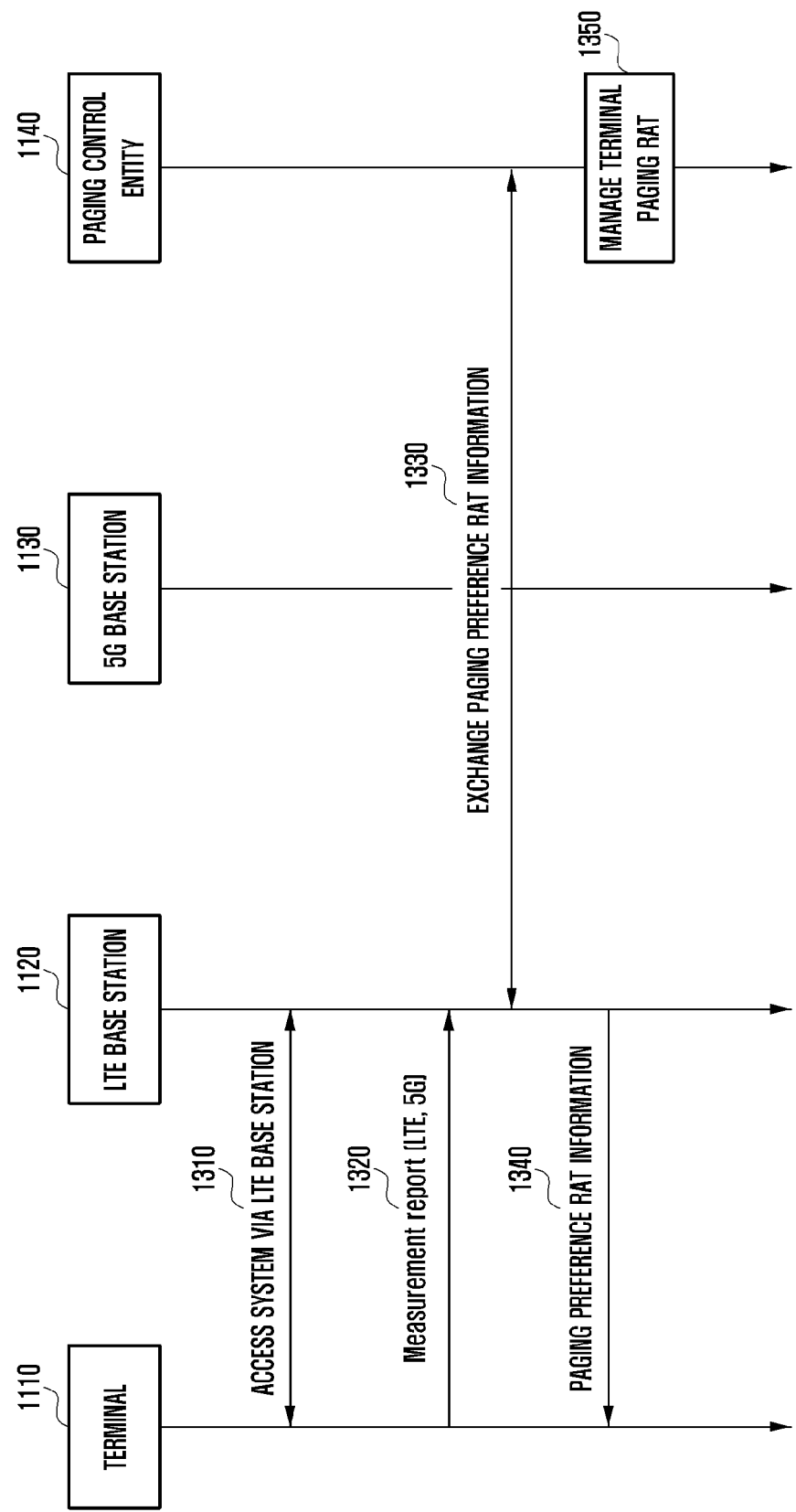
FIG. 13 is still another embodiment of a paging RAT selection procedure in a 4G and 5G coexistence system according to an embodiment of the disclosure.
Figure 14:
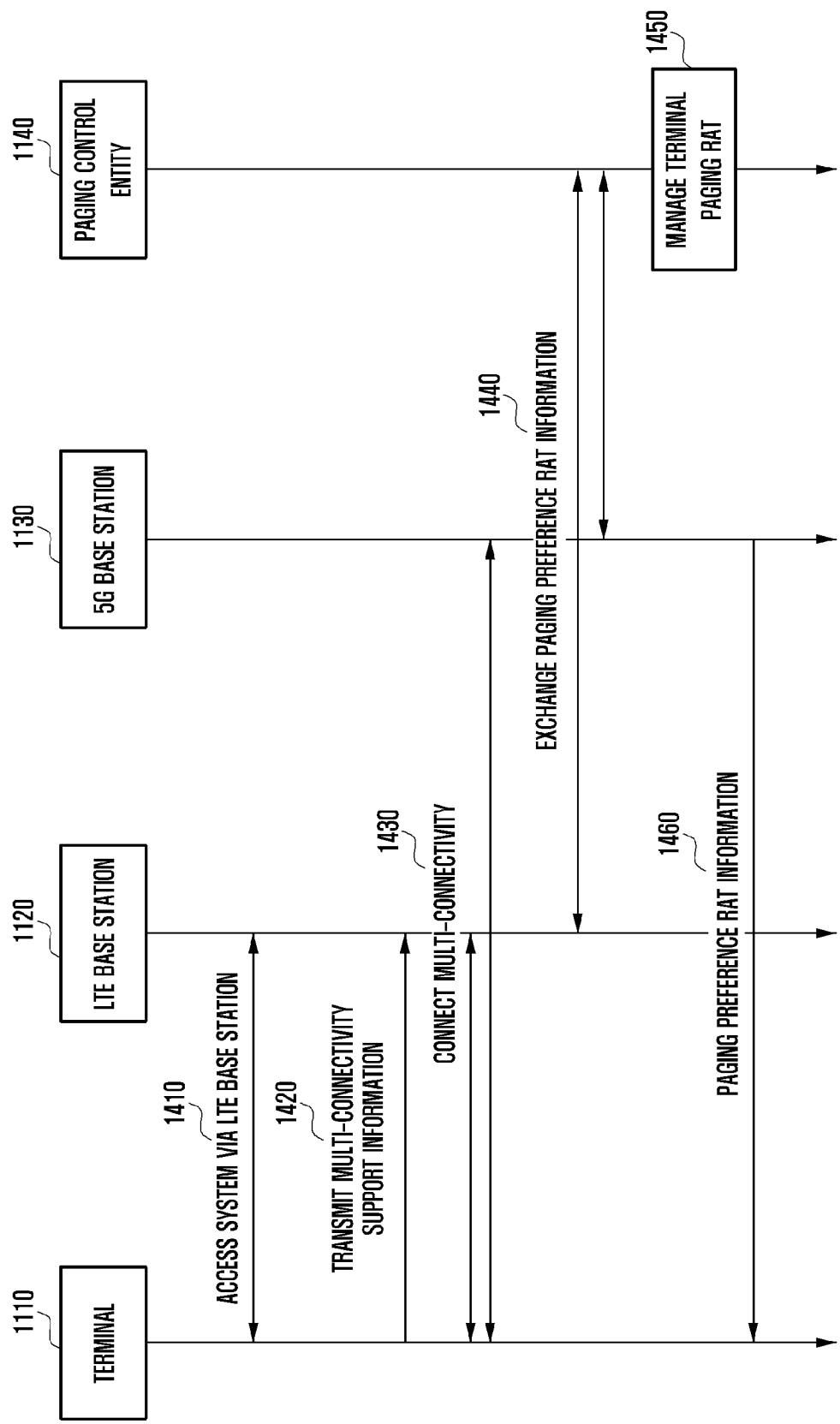
FIG. 14 is still another embodiment of a paging RAT selection procedure in a 4G and 5G coexistence system according to an embodiment of the disclosure.

(1-6) An Embodiment of a Paging RAT Operation Procedure in an LTE and 5G Coexisting System FIG. 11 is an embodiment of a paging RAT selection procedure in a 4G and 5G coexistence system according to an embodiment of the disclosure, FIG. 12 is another embodiment of a paging RAT selection procedure in a 4G and 5G coexistence system according to an embodiment of the disclosure, FIG. 13 is still another embodiment of a paging RAT selection procedure in a 4G and 5G coexistence system according to an embodiment of the disclosure, and FIG. 14 is still another embodiment of a paging RAT selection procedure in a 4G and 5G coexistence system according to an embodiment of the disclosure.

Referring to FIG. 11, in the case of a terminal 1110 that is concurrently connected to an LTE cell (an LTE base station) 1120 and a 5G cell (a 5G base station) 1130 so as to be able to perform data transmission or reception, the terminal 1110 may select an RAT (or a paging preference RAT) to receive a paging signal in an idle mode state.

More specifically, in step 1150, the terminal 1110 may be system-connected to the LTE base station 1120. In step 1160, the terminal 1110 may determine whether the paging signal is received in the LTE cell 1120 or the paging signal is received in the 5G cell 1130, and may transmit, to the LTE base station (1120), information on the determined cell to receive the paging signal. Here, the information may be paging preference RAT information. According to an embodiment, the terminal 1110 may transfer the paging preference RAT information to the base station 1120 via a UE capability transmission procedure, an idle mode transition procedure, an RRC configuration (re)setting procedure, or a position registration procedure.

The LTE base station 1120 may transmit the received paging preference RAT information to a paging control (management) entity 1140 in step 1170. The paging control entity 1140 may be a mobility management entity (MME). According to an embodiment, the paging control entity 1140 may be an access and mobility management function (AMF), a user plane function (UPF), a session management function (SMF), and the like, and may be an entity that manages the idle mode of the terminal. In step 1180, the paging control entity 1140 may manage the paging RAT of the terminal according to the received paging preference RAT information.

As another embodiment, referring to FIG. 12, when it is determined that the terminal 1110 supports a multi-RAT or a multi-connectivity (including LTE and 5G) capability, the base station 1120 or 1130 may determine whether the corresponding terminal 1110 receives the paging signal in the LTE cell 1120 or receives the paging signal in the 5G cell 1130.

More specifically, in step 1210, the terminal 1110 may be system-connected to the LTE base station 1120. In step 1120, the terminal 1110 may transmit, to the LTE base station 1120, information on whether or not the terminal supports the multi-RAT or the multi-connectivity. When it is determined that the terminal 1110 supports the multi-RAT or the multi-connectivity (including LTE and 5G), the LTE base station 1120 may determine whether the terminal 1110 receives the paging signal in the LTE cell 1120 or receives the paging signal in the 5G cell 1130, that is, the LTE base station 1120 may determine an RAT (or a paging preference RAT), based on which the terminal 1110 receives the paging signal in the idle mode state. Here, in step 1230, the LTE base station 1120 may exchange the paging preference RAT information with the paging control entity 1140, so as to determine the RAT, based on which the terminal 1110 receives the paging signal in the idle mode state. Alternatively, in step 1230, the LTE base station 1120 may transmit, to the paging control entity 1140, information (i.e., the paging preference RAT information) on the RAT, based on which the terminal 1110 receives the paging signal in the idle mode state. In step 1250, the paging control entity 1140 may manage the paging RAT of the terminal according to the received paging preference RAT information.

In step 1240, the LTE base station 1120 may transmit, to the terminal 1110, information (i.e., the paging preference RAT information) of which the cell receives the paging signal. According to an embodiment, the LTE base station 1120 may transfer the paging preference RAT information to the terminal 1110 via a UE capability transmission procedure, an idle mode transition procedure, an RRC configuration (re)setting procedure, or a position registration procedure.

As another embodiment, referring to FIG. 13, a procedure of determining the paging preference RAT of the terminal 1110 may include transferring a measurement result of the cell or the RAT to the base station 1120 by the terminal 1110, determining available RAT or cell information of the terminal 1110 by the base station 1120, and determining the paging preference RAT.

More specifically, in step 1310, the terminal 1110 may be system-connected to the LTE base station 1120. In step 1320, the terminal 1110 may report (measurement report) a measurement result of the terminal to the LTE base station 1120. The measurement result may be a measurement result for a cell (e.g., LTE or 5G) or an RAT, which the terminal 1110 supports. According to the measurement result received from the terminal 1110, the LTE base station 1120 may determine whether the terminal 1110 receives the paging signal in the LTE cell 1120 or receives the paging signal in the 5G cell 1130, that is, the LTE base station 1120 may determine the RAT (or the paging preference RAT), based on which the terminal 1110 receives the paging signal in the idle mode state. Here, in step 1330, the LTE base station 1120 may exchange the paging preference RAT information with the paging control entity 1140, so as to determine the RAT, based on which the terminal 1110 receives the paging signal in the idle mode state. Alternatively, in step 1330, the LTE base station 1120 may transmit, to the paging control entity 1140, information (i.e., the paging preference RAT information) on the RAT, based on which the terminal 1110 receives the paging signal in the idle mode state. In step 1350, the paging control entity 1140 may manage the paging RAT of the terminal according to the received paging preference RAT information.

In step 1340, the LTE base station 1120 may transmit, to the terminal 1110, information (i.e., the paging preference RAT information) of which the cell receives the paging signal. According to an embodiment, the LTE base station 1120 may transfer the paging preference RAT information to the terminal 1110 via a UE capability transmission procedure, an idle mode transition procedure, an RRC configuration (re)setting procedure, or a position registration procedure.

In the above, a case is described as an example, the case where signaling for selecting the paging preference RAT of the terminal 1110 is performed with the LTE base station 1120. However, when the terminal 1110 is connected to the LTE base station 1120 and the 5G base station 1130 through a multiple connection access, it would be obvious that each piece of RAT information (e.g., measurement on the LTE cell and measurement on the 5G cell) may be transmitted or received via each of the base stations 1120 and 1130.

As another embodiment, referring to FIG. 14, paging preference RAT indication transmitted to the terminal 1110 that supports the multi-RAT or the multi-connectivity (including LTE and 5G) capability may be transmitted via signaling transmitted from a base station corresponding to a selected RAT.

More specifically, in step 1410, the terminal 1110 may be system-connected to the LTE base station 1120. In step 1420, the terminal 1110 may transmit, to the LTE base station 1120, information on whether or not the terminal supports the multi-RAT or the multi-connectivity. The terminal 1110 may be connected to the LTE base station 1120 and the 5G base station 1130 in a multi-connectivity manner, as described in step 1430.

When the paging preference RAT of the terminal 1110 is the LTE cell 1120, the terminal 1110 may include idle mode configuration information of the terminal 1110 in a message exchanged between the terminal 1110 and the LTE base station 1120, and may transmit the message, in step 1430. The idle mode configuration information may include at least one among a paging cycle, a paging offset, and a paging identification. The idle mode configuration information may be interpreted as a paging preference RAT indicator. For example, it may be interpreted that a base station itself (in this example, the LTE base station 1120), which has received the idle mode configuration information, is the paging preference RAT of the terminal 1110. According to an embodiment, the idle mode configuration information may include the paging preference RAT information.

As another example, when the paging preference RAT of the terminal 1110 is the 5G cell 1130, the terminal 1110 may include the idle mode configuration information of the terminal 1110 in a message exchanged between the terminal 1110 and the 5G base station 1130, and may transmit the message, in step 1430. The idle mode configuration information may include at least one among a paging cycle, a paging offset, and a paging identification. The idle mode configuration information may be interpreted as a paging preference RAT indicator.

In step 1440, the LTE base station 1120 and/or the 5G base station 1130 may transmit, to the paging control entity 1140, information (i.e., the paging preference RAT information) on the RAT, based on which the terminal 1110 receives the paging signal in the idle mode state. Alternatively, if the LTE base station 1120 and/or the 5G base station 1130 transmits the paging preference RAT information to the paging control entity 1140, the paging control entity 1140 may transmit the paging preference RAT information back to the LTE base station 1120 and/or the 5G base station 1130, or may transmit the paging preference RAT information to the base station 1120 or 1130, to which the paging preference RAT information is not transmitted. In step 1450, the paging control entity 1140 may manage the paging RAT of the terminal according to the received paging preference RAT information.

In step 1460, the terminal 1110 may receive the paging preference RAT information from the base station 1120 or 1130. According to an embodiment, the terminal 1110 may receive a paging preference RAT from the base station (e.g., the 5G base station 1130) corresponding to an RAT selected as the paging preference RAT. According to an embodiment, the base station 1120 or 1130 may transfer the paging preference RAT information to the terminal 1110 via a UE capability transmission procedure, an idle mode transition procedure, an RRC configuration (re)setting procedure, or a position registration procedure.

Although not illustrated, as another embodiment, the paging preference RAT information transmitted to the terminal 1110 may be determined based on a cell in which the terminal 1110 accesses the system. For example, when the terminal 1110 performs system access via the LTE cell 1120, the LTE cell 1220 may be determined as the paging preference RAT of the terminal. When the terminal 1110 performs system access via the 5G cell 1130, the 5G cell 1130 may be determined as the paging preference RAT of the terminal 1110.

Although not illustrated, as another embodiment, when it is determined that the terminal 1110 supports the multi-RAT or the multi-connectivity (including LTE and 5G) capability while using a service capable of receiving the paging signal from the LTE cell 1120, the paging control entity 1140 (or the base station 1120 or 1130 or the terminal 1110) may determine that the corresponding terminal 1110 is able to receive the paging signal in the LTE cell 1120. As still another embodiment, when it is determined that the terminal 1110 supports the multi-RAT or the multi-connectivity (including LTE and 5G) capability while using a service capable of receiving the paging signal from the 5G cell 1130, the paging control entity 1140 (or the base station 1120 or 1130 or the terminal 1110) may determine that the corresponding terminal 1110 is able to receive the paging signal in the 5G cell 1130. When the terminal 1110 uses one or more services, before the terminal 1110 transitions to the idle mode, the paging control entity 1140 (or the base station 1120 or 1130) may explicitly notify the terminal 1110 of the multi-RAT or the multi-connectivity (including LTE and 5G) capability and a type of a service allowing the terminal 1110 to receive the paging signal. As another embodiment, before the terminal 1110 transitions to the idle mode, the paging control entity 1140 (or the base station 1120 or 1130) may determine which RAT or cell receives the paging signal, on the basis of service information (e.g., a quality of service (QoS) of a radio bearer, a separate service type that can be distinguished based on a service profile or in an RAN level, etc.) used in data transmission or reception by the terminal 1110, and may indicate the determined information to the terminal 1110.

An anchor base station or a core network entity controlling paging of the terminal 1110 may manage the paging preference RAT information of the terminal. The paging preference RAT information of the terminal 1110, which is stored in the core network entity or the anchor base station, may be acquired in the middle of performing a procedure of exchanging the paging preference RAT information between the terminal 1110 and the base station or performing a procedure of notifying that the terminal 1110 has transitioned to the idle mode, to the core network entity or the anchor base station by the base station. The anchor base station may be a base station which the terminal 1110 is accessing, or a base station that manages a context of the terminal having transitioned to the idle mode. According to an embodiment, an entity that determines the paging preference RAT information of the terminal 1110 and an entity that manages the paging preference RAT information may be identical or different.

The paging preference RAT information may be changed when the terminal 1110 performs handover to access a new base station, during communication with a serving base station, while the terminal 1110 is monitoring paging in the idle mode, or while a multi-connectivity cell of the terminal 1110 is being added/modified/deleted. If the core network entity or the anchor base station determine to change the paging preference RAT information of the terminal 1110, the core network entity or the anchor base station may include paging preference RAT change indication information of the terminal 1110 in a paging indication message of the terminal 1110, and may transmit the paging indication message to the terminal 1110. According to an embodiment, the LTE base station 1120 or the 5G base station 1130, which has received the paging preference RAT change indication information of the terminal 1110 from the core network entity or the anchor base station, may transmit a paging signal including the paging preference RAT change indication information to the terminal 1110. The terminal 1110 having received the paging preference RAT change indication information from the paging signal may monitor the indicated paging preference RAT from a later point in time.

If the paging preference RAT information indicates paging reception in the LTE cell 1120, the terminal 1110 in the idle mode state may perform an operation of monitoring the paging signal in the LTE cell 1120. The terminal 1110 may not monitor the 5G cell 1130. According to an embodiment, the terminal 1110 may turn off the power of a 5G modem.

As another embodiment, if the paging preference RAT information indicates paging reception in the 5G cell, the terminal 1110 may perform an operation of monitoring the paging signal in the 5G cell 1130. The terminal 1110 may not monitor the LTE cell 1120. According to an embodiment, the terminal 1110 may turn off the power of an LTE modem.

When the paging signal is required to be transmitted to the terminal 1110, the core network entity or the anchor base station may transmit a paging indication message to a base station corresponding to an RAT indicated by the paging preference RAT information of the terminal 1110, on the basis of the paging preference RAT information.

For example, when the paging preference RAT of the terminal 1110 is LTE, the core network entity or the anchor base station may transmit the paging indication message for the terminal 1110 to the LTE base station 1120 in which the terminal 1110 manages a registered paging area. The LTE base station 1120 having received the paging indication message may transmit the paging message including the terminal identifier to the terminal 1110.

As another example, when the paging preference RAT of the terminal 1110 is 5G, the core network entity or the anchor base station may transmit the paging indication message for the terminal 1110 to the 5G base station 1130 in which the terminal 1110 manages the registered paging area. The 5G base station 1130 having received the paging indication message may transmit the paging message including the terminal identifier to the terminal 1110.

According to an embodiment of the disclosure, when one base station includes one or more cells (e.g., a multi-carrier, etc.), carrier frequencies of the respective cells may be different from each other, and the paging preference RAT may be a cell in a base station of a heterogeneous RAT or an identical RAT. Indication information for the paging preference RAT may include at least one among an RAT ID, a cell ID, and a frequency ID.

In the following, a procedure of paging preference RAT exchanging between the terminal 1110 and the base station 1120 or 1130, a procedure of exchanging paging preference RAT information of the terminal 1110 between the core network entity/anchor base station and the serving base station, a procedure of paging monitoring based on the paging preference RAT information of the terminal 1110, and a procedure of receiving the paging indication message including the paging preference RAT information of the terminal 1110 will be described.

(1-6-1)

Figure 15:
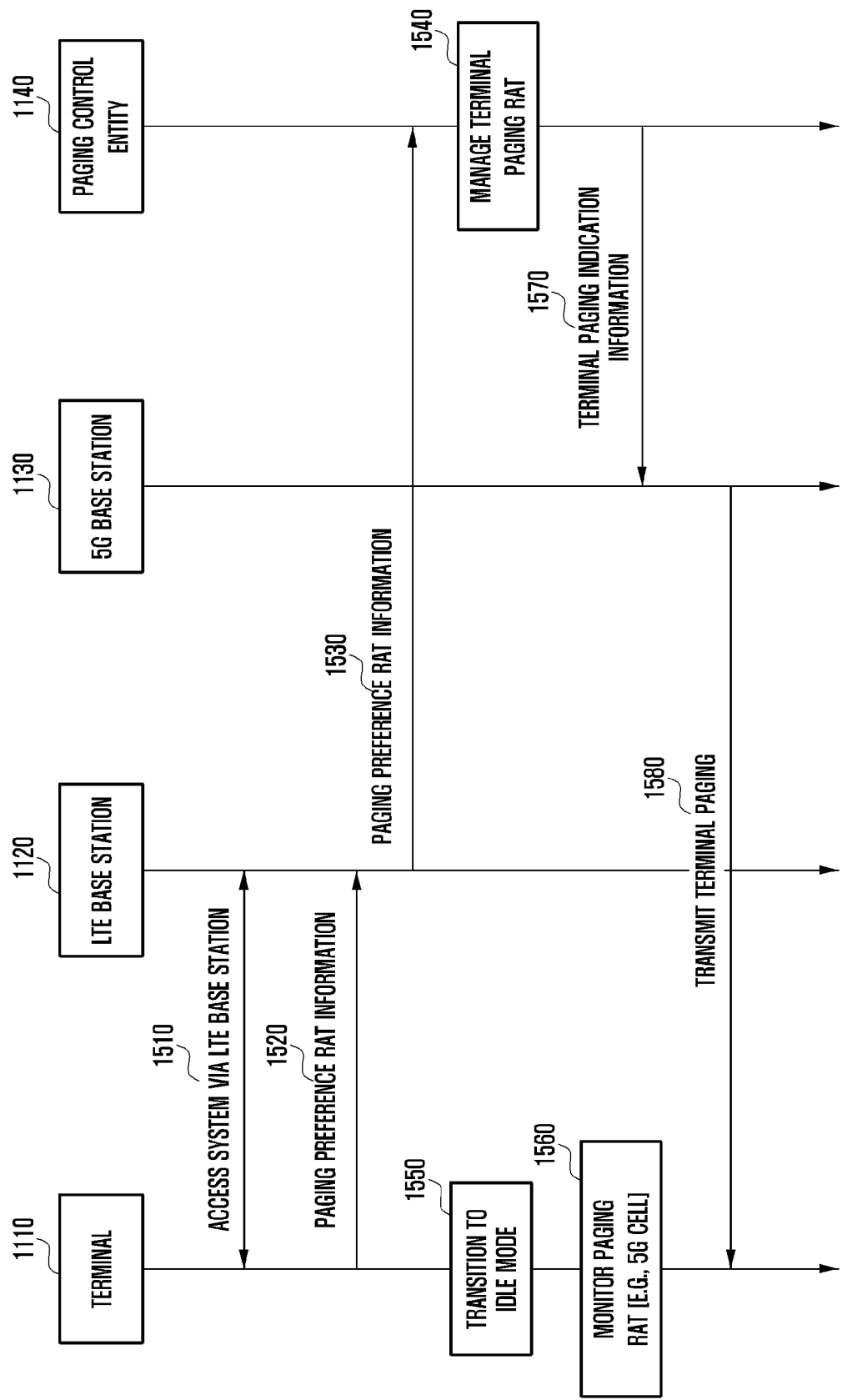
FIG. 15 is an embodiment of a paging RAT operation procedure in a 4G and 5G coexistence system according to an embodiment of the disclosure.

FIG. 15 is an embodiment of a paging RAT operation procedure in a 4G and 5G coexistence system according to an embodiment of the disclosure.

The terminal 1110 may access the system via the LTE base station 1120 in step 1510. In step 1520, the terminal 1110 may transmit paging preference RAT information via the LTE base station 1120. In step 1530, the LTE base station 1120 may inform the paging control entity 1140 of the paging preference RAT information of the terminal 1110. In step 1540, the paging control entity 1140 may manage a paging RAT of the terminal 1110.

While the terminal 1110 is performing data transmission or reception via the LTE base station 1120 and/or the 5G base station 1130, the terminal 1110 may transition to the idle mode in step 1550. During the idle mode, in step 1560, the terminal 1110 may monitor the paging preference RAT and may receive a paging signal. According to an embodiment, the paging preference RAT of the terminal 1110 may be the 5G cell 1130. In this case, the terminal 1110 may monitor the 5G cell 1130 and may receive the paging signal. Alternatively, according to an embodiment, the paging preference RAT of the terminal 1110 may be the LTE cell 1130.

If the paging signal is required to be transmitted to the terminal 1110, the paging control entity 1140 may transmit terminal paging indication information to the cell 1130 corresponding to a paging (preference) RAT of the terminal in step 1570. For example, when the paging preference RAT of the terminal 1110 is the 5G cell, the paging control entity 1140 may transmit the terminal paging indication information to the 5G base station 1130 that manages the 5G cell.

The 5G cell 1130 having received the terminal 1110 paging indication information may transmit the paging signal to the terminal in step 1580. The terminal 1110 may monitor the 5G cell 1130 and may receive the paging signal.

Meanwhile, according to an embodiment, the LTE base station 1120 to the 5G base station 1130 may transmit multi-connectivity access support information. According to an embodiment of the disclosure, the terminal 1110 may monitor a base station that supports multi-connectivity access from among base stations corresponding to the paging RAT.

(1-6-2)

Figure 16:
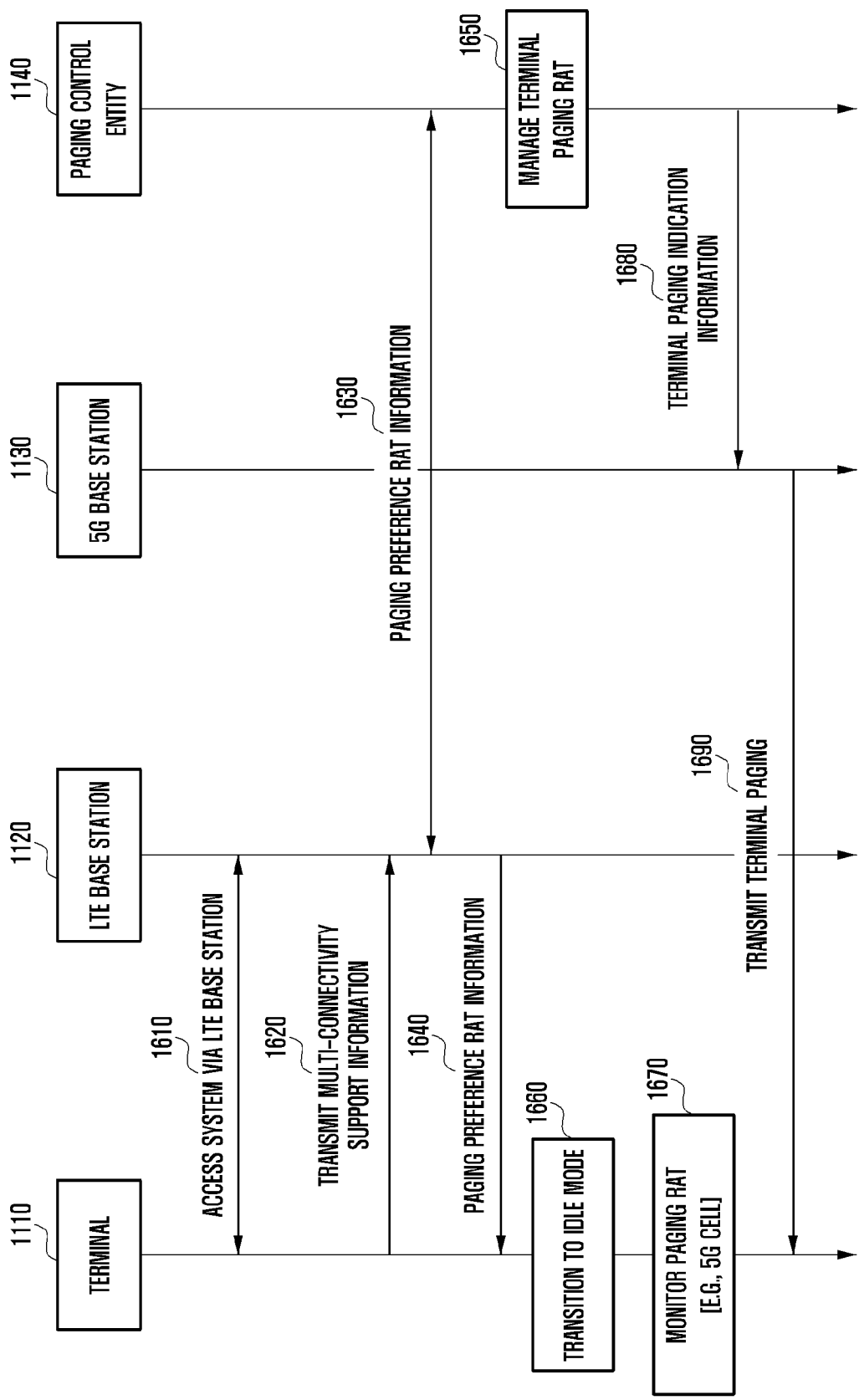
FIG. 16 is another embodiment of a paging RAT operation procedure in a 4G and 5G coexistence system according to an embodiment of the disclosure.

FIG. 16 is still another embodiment of a paging RAT operation procedure in a 4G and 5G coexistence system according to an embodiment of the disclosure.

The terminal 1110 may access the system via the LTE cell 1120 in step 1610. In step 1620, the terminal 1110 may transmit the multi-connectivity support information via the LTE base station 1120. In step 1630, the LTE base station 1120 may exchange paging preference RAT information of the terminal 1110 with the paging control entity 1140 on the basis of the multi-connectivity support information. For example, the LTE base station 1120 may determine the paging preference RAT information of the terminal 1110 on the basis of the multi-connectivity support information of the terminal 1110, and may transmit the determined paging preference RAT information to the paging control entity 1140. Alternatively, the LTE base station 1120 may transmit the multi-connectivity support information of the terminal 1110 to the paging control entity 1140, and the paging control entity 1140 may determine the paging preference RAT information of the terminal 1110 and may transmit the same to the LTE base station 1120. Alternatively, on the basis of the multi-connectivity support information of the terminal 1110, the LTE base station 1120 and the paging control entity 1140 may perform negotiation on the basis of the multi-connectivity support information of the terminal 1110, may determine the paging preference RAT information of the terminal 1110, and may exchange the same.

In step 1640, the LTE base station 1120 may transmit the paging preference RAT information to the terminal 1110. In step 1650, the paging control entity 1140 may manage the paging RAT for the terminal 1110.

While the terminal 1110 is performing data transmission or reception via the LTE base station 1120 and/or the 5G base station 1130, the terminal 1110 may transition to the idle mode in step 1660. During the idle mode, in step 1670, the terminal 1110 may monitor the paging preference RAT and may receive a paging signal. According to an embodiment, the paging preference RAT of the terminal 1110 may be the 5G cell 1130. In this case, the terminal 1110 may monitor the 5G cell 1130 and may receive the paging signal. Alternatively, according to an embodiment, the paging preference RAT of the terminal 1110 may be the LTE cell 1130.

If the paging signal is required to be transmitted to the terminal 1110, the paging control entity 1140 may transmit, in step 1680, terminal paging indication information to the 5G cell 1130 corresponding to the paging RAT of the terminal 1110. For example, when the paging preference RAT of the terminal 1110 is the 5G cell, the paging control entity 1140 may transmit the terminal paging indication information to the 5G base station 1130 that manages the 5G cell.

The 5G cell 1130 having received the terminal 1110 paging indication information may transmit the paging signal to the terminal in step 1690. The terminal 1110 may receive the 5G cell 1130 and may monitor the paging signal.

Meanwhile, according to an embodiment, the LTE base station 1120 to the 5G base station 1130 may transmit multi-connectivity access support information. According to an embodiment of the disclosure, the terminal 1110 may monitor a base station that supports multi-connectivity access from among base stations corresponding to the paging RAT.

(1-6-3)

Figure 17:
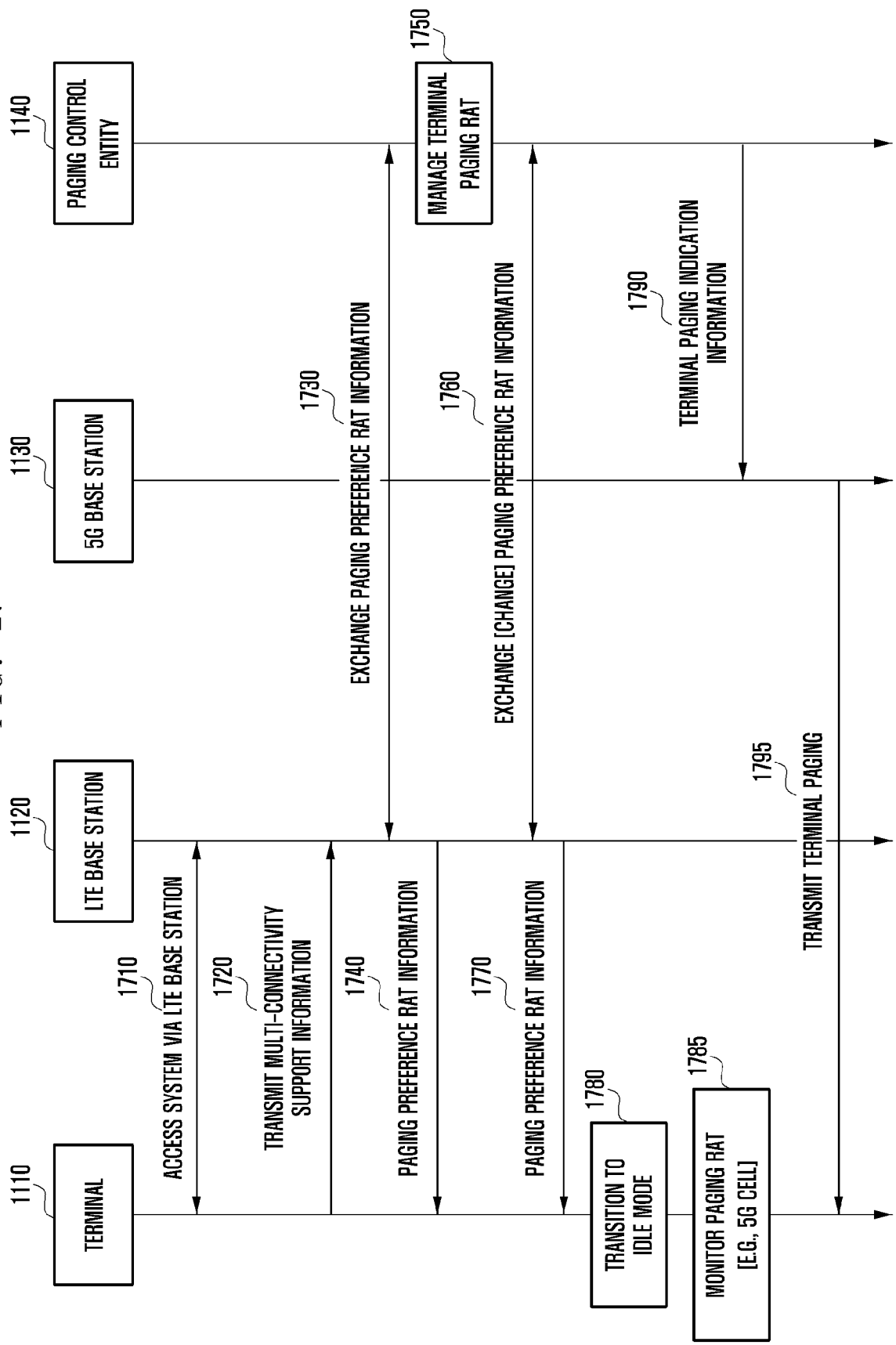
FIG. 17 is still another embodiment of a paging RAT operation procedure in a 4G and 5G coexistence system according to an embodiment of the disclosure.

FIG. 17 is still another embodiment of a paging RAT operation procedure in a 4G and 5G coexistence system according to an embodiment of the disclosure.

The terminal 1110 may access the system via the LTE cell 1120 in step 1710. In step 1720, the terminal 1110 may transmit the multi-connectivity support information via the LTE base station 1120. In step 1730, the LTE base station 1120 may exchange paging preference RAT information of the terminal 1110 with the paging control entity 1140 on the basis of the multi-connectivity support information. The description relating thereto has been described above, and a detailed description will be omitted.

In step 1740, the LTE base station 1120 may transmit the paging preference RAT information to the terminal 1110. According to an embodiment, a paging preference RAT of the terminal 1110 may be the LTE cell 1120. In step 1750, the paging control entity 1140 may manage a paging RAT for the terminal 1110.

Meanwhile, in step 1760, the paging control entity 1140 may determine to change the paging preference RAT of the terminal 1110. The paging control entity 1140 may transmit paging preference RAT change information of the terminal 1110 to the LTE base station 1120. In step 1770, the LTE base station 1120 may transmit the changed paging preference RAT information to the terminal 1110. According to an embodiment, the changed paging preference RAT of the terminal 1110 may be the 5G cell 1130.

While the terminal 1110 is performing data transmission or reception via the LTE base station 1120 and/or the 5G base station 1130, the terminal 1110 may transition to the idle mode in step 1780. During the idle mode, in step 1785, the terminal 1110 may monitor the paging preference RAT and may receive a paging signal. As described above, the changed paging preference RAT of the terminal may be the 5G cell 1130.

If the paging signal is required to be transmitted to the terminal 1110, the paging control entity 1140 may transmit, in step 1790, terminal paging indication information to the 5G cell 1130 corresponding to the paging RAT of the terminal 1110. The 5G cell having received the terminal paging indication information may transmit the paging signal to the terminal. For example, when the paging preference RAT of the terminal 1110 is the 5G cell, the paging control entity 1140 may transmit the terminal paging indication information to the 5G base station 1130 that manages the 5G cell.

The 5G cell 1130 having received the terminal paging indication information may transmit the paging signal to the terminal 1110 in step 1795. The terminal 1110 may monitor the 5G cell 1130 and may receive the paging signal.

Meanwhile, according to an embodiment, the LTE base station 1120 to the 5G base station 1130 may transmit multi-connectivity access support information. According to an embodiment of the disclosure, the terminal 1110 may monitor a base station that supports multi-connectivity access from among base stations corresponding to the paging RAT.

(1-6-4)

Figure 18:
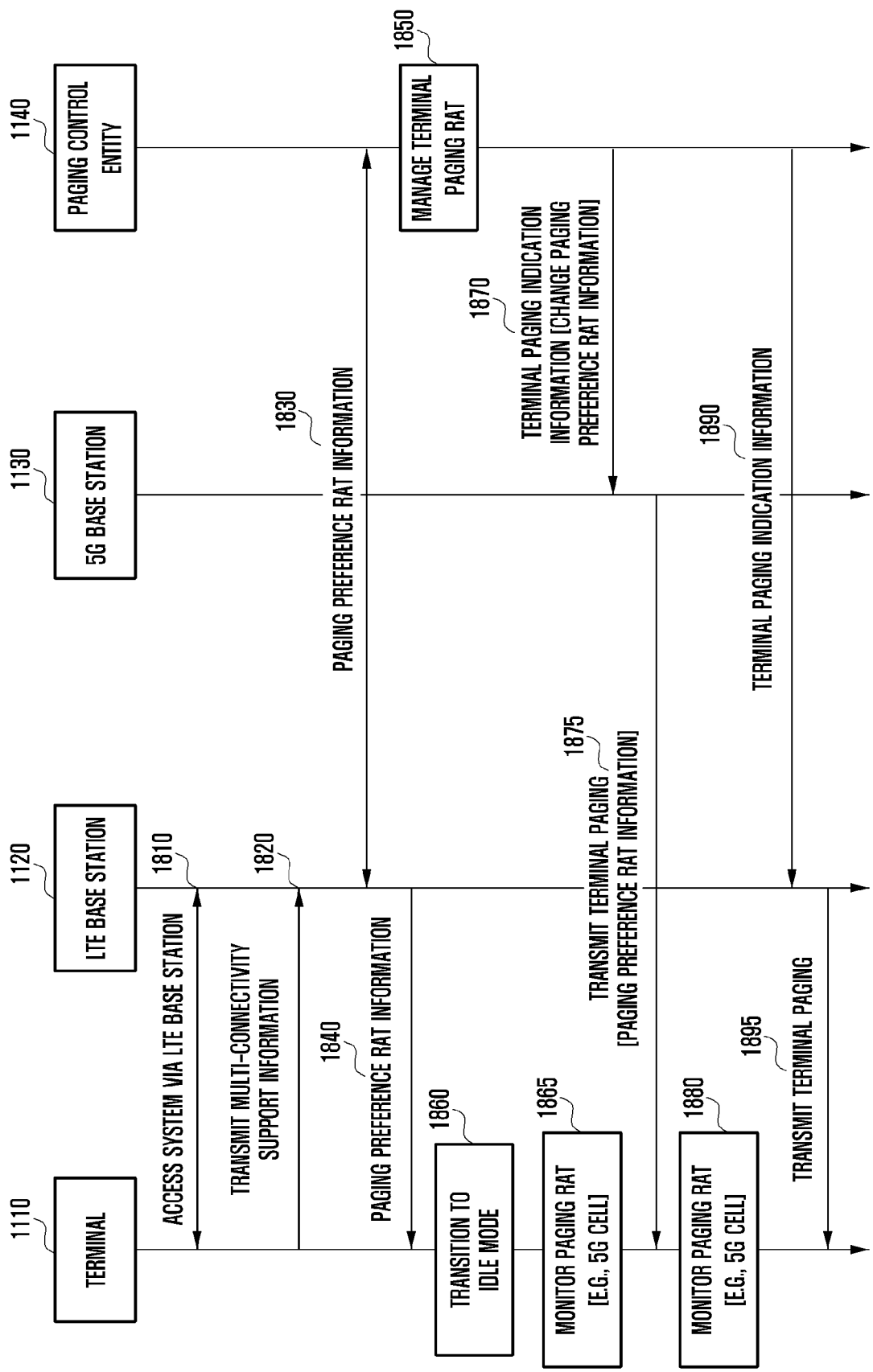
FIG. 18 is still another embodiment of a paging RAT operation procedure in a 4G and 5G coexistence system according to an embodiment of the disclosure.

FIG. 18 is still another embodiment of a paging RAT operation procedure in a 4G and 5G coexistence system according to an embodiment of the disclosure.

The terminal 1110 may access the system via the LTE cell 1120 in step 1810. In step 1820, the terminal 1110 may transmit the multi-connectivity support information via the LTE base station 1120. In step 1830, the LTE base station 1120 may exchange paging preference RAT information of the terminal 1110 with the paging control entity 1140 on the basis of the multi-connectivity support information. The description relating thereto has been described above, and a detailed description will be thus omitted.

In step 1840, the LTE base station 1120 may transmit the paging preference RAT information to the terminal 1110. According to an embodiment, a paging preference RAT of the terminal 1110 may be the 5G cell 1130. In step 1850, the paging control entity 1140 may manage a paging RAT for the terminal 1110.

While the terminal 1110 is performing data transmission or reception via the LTE base station 1120 and the 5G base station 1130, the terminal 1110 may transitions to the idle mode in step 1860. During the idle mode, in step 1865, the terminal 1110 may monitor the paging preference RAT and may receive a paging signal.

According to an embodiment of the disclosure, in step 1870, the paging control entity 1140 may determine to change a paging preference RAT of the terminal having transitioned to the idle mode. The paging control entity 1140 may transmit terminal paging indication information including paging preference RAT change information of the terminal 1110 to the cell 1130 corresponding to the current paging preference RAT. In the embodiment above, the 5G cell 1130 may receive the terminal paging indication information from the paging control entity 1140.

According to the terminal paging indication information, in step 1875, the 5G base station 1130 may transmit a paging signal including the terminal paging preference RAT change information to the terminal 1110. The paging signal herein may include the changed paging preference RAT information.

The terminal 1110 having received the paging signal including the paging preference RAT change information may monitor the new paging preference RAT in step 1880. According to the embodiment above, the new paging preference RAT may be the LTE cell 1120.

If the paging signal is required to be transmitted to the terminal 1110, the paging control entity 1140 may transmit the terminal paging indication information to the cell 1120 corresponding to the paging RAT of the terminal 1110, in step 1890. In the embodiment above, the LTE cell 1120 may correspond to the paging RAT.

The LTE cell 1120 having received the terminal paging indication information may transmit the paging signal to the terminal 1110 in step 1895. The terminal 1110 may receive monitor the LTE cell 1120 and may receive the paging signal.

Meanwhile, according to an embodiment, the LTE base station 1120 to the 5G base station 1130 may transmit multi-connectivity access support information. According to an embodiment of the disclosure, the terminal 1110 may monitor a base station that supports multi-connectivity access from among base stations corresponding to the paging RAT.

(1-6-5)

Figure 19:
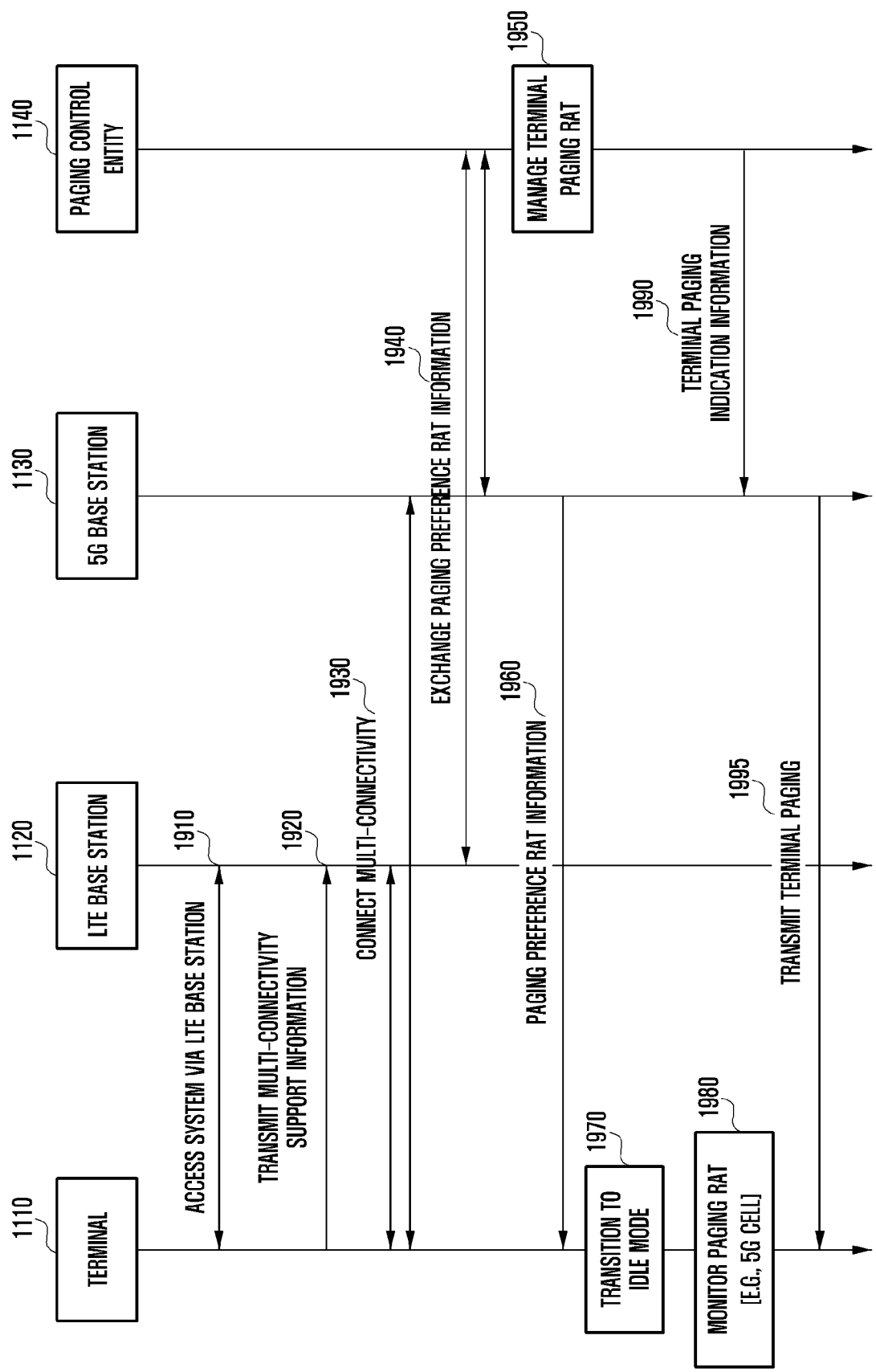
FIG. 19 is still another embodiment of a paging RAT operation procedure in a 4G and 5G coexistence system according to an embodiment of the disclosure.

FIG. 19 is still another embodiment of a paging RAT operation procedure in a 4G and 5G coexistence system according to an embodiment of the disclosure.

The terminal 1110 may access the system via the LTE cell 1120 in step 1910. In step 1920, the terminal 1110 may transmit the multi-connectivity support information via the LTE base station 1120. In step 1930, the terminal 1110 may be connected to the LTE cell 1120 and the 5G cell 1130 so as to perform multi-connectivity data transmission or reception.

In step 1940, the LTE base station 1120, the 5G base station 1130, and the paging control entity 1140 may exchange paging preference RAT information for the terminal 1110. A specific operation relating thereto is similar to the embodiment described in FIG. 14, and a detailed description will be thus omitted.

In step 1950, the paging control entity 1140 may manage a paging RAT for the terminal 1110. For example, when the 5G cell 1130 is a paging preference RAT, the 5G cell 1130 may transmit paging preference RAT information to the terminal 1110 in step 1960. According to an embodiment of the disclosure, the paging preference RAT of the terminal 1110 may be the 5G cell 1130.

While the terminal 1110 is performing data transmission or reception via the LTE base station 1120 and/or the 5G base station 1130, the terminal 1110 may transition to the idle mode in step 1970. During the idle mode, in step 1980, the terminal 1110 may monitor the paging preference RAT and may receive the paging signal.

When the paging signal is required to be transmitted to the terminal 1110, the paging control entity 1140 may transmit terminal paging indication information to the cell 1130 corresponding to the paring RAT of the terminal 1110 in step 1990. In an embodiment, the 5G cell 1130 may correspond to the paging RAT.

The 5G cell 1130 having received the terminal paging indication information may transmit the paging signal to the terminal 1110 in step 1995. The terminal 1110 may monitor the 5G cell 1130 and may receive the paging signal.

Meanwhile, according to an embodiment, the LTE base station 1120 to the 5G base station 1130 may transmit multi-connectivity access support information. According to an embodiment of the disclosure, the terminal 1110 may monitor a base station that supports multi-connectivity access from among base stations corresponding to the paging RAT.

According to an embodiment, when terminal 1110 is unable to detect (sense) a cell corresponding to the paging preference RAT in order to monitor the paging signal, the terminal 1110 may initiate a terminal-initiated connection (UE-initiated connection) setting procedure, via an accessible RAT cell. The terminal 1110 may receive or transmit a downlink packet or an uplink packet, which has been pending, via the UE-initiated connection setting procedure.

In the various embodiments, examples in which the terminal performs a system access procedure via the LTE base station are described. However, the case where the terminal performs a system access procedure via the 5G base station may also be described in the same way. That is, the terminal and the 5G base station may perform a procedure of exchanging multi-connectivity capability information of the terminal and a procedure of exchanging the paging preference RAT information, and may perform a procedure of exchanging the paging preference RAT information between the LTE base station/5G base station and the paging control entity.

Further, it is obvious that the 5G may include an RAT other than LTE.

It is obvious that the LTE base station described as an example in the disclosure may be replaced with a 5G base station operating in a low frequency band, for example, 6 GHz or lower, 3.5 GHz, 2 GHz, 700 MHz band or the like. Each of the steps described in the various embodiments does not mean sequential steps, and steps described later may be performed first, and each of the steps may be performed concurrently.

Embodiment 2

(2-1) An Embodiment of a Terminal Access Procedure in the LTE and 5G Coexistence System
(2-1-1)

Figure 20:
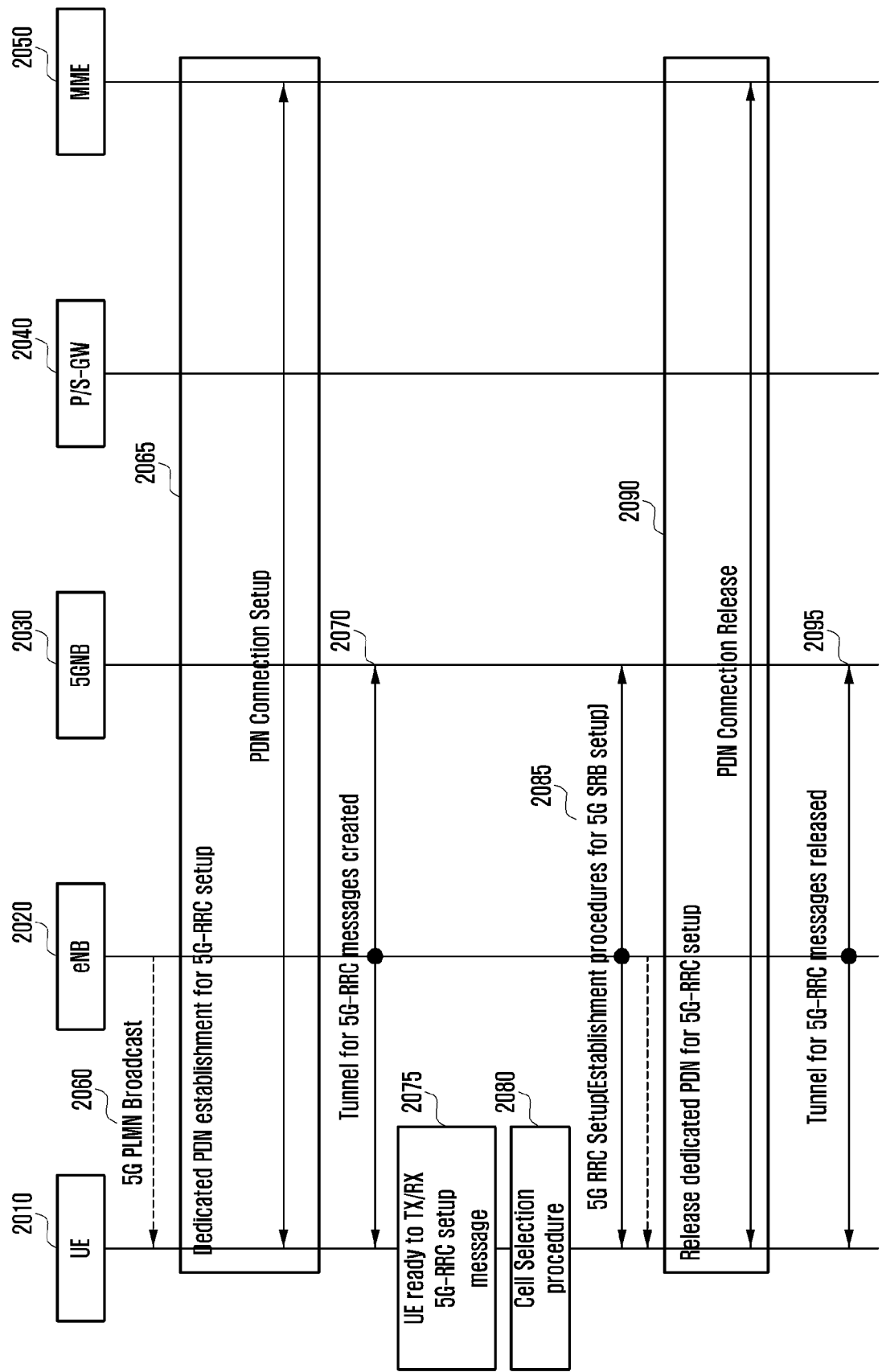
FIG. 20 is an embodiment of a 5G RRC connection operation procedure in a 4G and 5G coexistence system according to an embodiment of the disclosure.

FIG. 20 is an embodiment of a 5G RRC connection operation procedure in a 4G and 5G coexistence system according to an embodiment of the disclosure.

Referring to FIG. 20, an embodiment of the disclosure indicates an access procedure of a terminal 2010 in a system in which an LTE base station 2020 and a 5G base station 2030 coexist. The procedure may be applied to the case of initial access of the terminal 2010 or the case of re-access in which the terminal 2010 transitions from an idle mode to a connected mode. An embodiment applied to the case of re-access in which the terminal 2010 transitions from the idle mode to the connected mode may include the case where the LTE base station (eNB) 2020 receives paging and performs a system access procedure.

In step 2060, when the 5G base station (5GNB, gNB, or NR NB) 2030 is present around the LTE base station (eNB) 2020, the LTE base station (eNB) 2020 may broadcast an identifier (identification information) of the 5G base station 2030, for example, a 5G public land mobile network (PLMN) of the corresponding 5G base station 2030. The indicator of the 5G base station may be included in system information (e.g., a master information block (MIB), a system information block (SIB), etc.) so as to be transmitted, or may also be transmitted by a terminal-specific (UE-specific) method for only the corresponding terminal 2010.

In step 2065, when the terminal 2010 receives 5G base station information, the terminal 2010 considers that there is the 5G base station (5GNB) 2030 nearby, and may perform a procedure of establishing a packet data network (PDN) connection for transmission/reception of a control signal (e.g., 5G RRC signaling) for establishment of connection to the 5G base station (5GNB) 2030. The terminal 2010 may establish a new PDN connection between the terminal 2010 and the LTE base station 2020 in order to transmit RRC signaling to or receive the RRC signaling from the 5G base station 2030, wherein the RRC signaling may be, for example, 5G RRC signaling for 5G connection establishment. For example, if the terminal 2010 transmits a 5G RRC message, which is to be transmitted to the 5G base station 2030, via a new PDN connection that is different from the PDN connection for LTE message transmission or reception between the terminal 2010 and the LTE base station 2020, the LTE base station 2020 may transmit (forward) the 5G RRC message to the 5G base station 2030 via the connection between the LTE base station 2020 and the 5G base station 2030. That is, the terminal 2010 may transmit the RRC message to or receive the RRC message from the 5G base station 2030 via the new PDN connection. Another embodiment of a condition, as described above, which triggers performing of a procedure of establishing a PDN connection for transmission/reception of 5G RRC signaling will be described in details in embodiment (2-3). For convenience of explanation, the PDN connection for transmitting the 5G RRC signaling may be referred to as a 5G PDN connection.

When step 2065 is completed, a tunnel (channel) for transmitting a 5G RRC message may be generated (established) between the terminal 2010 and the 5G base station (5GNB) 2030, in step 2070. In step 2075, the terminal 2010 may exchange the 5G RRC message with the 5G base station 2030 via the tunnel (channel). According to an embodiment, with respect to the PDN connection and the tunnel (channel) for transmission/reception of the 5G RRC signaling, an indicator indicating that the PDN connection and the tunnel (channel) are dedicated to the 5G RRC signaling may be used.

In step 2080, the terminal 2010 may perform a cell selection procedure of measuring a signal intensity to select a suitable 5G base station (5GNB) 2030 in synchronization with the 5G base station (5GNB) 2030. When the terminal 2010 selects the suitable 5G base station (5GNB) 2030, the terminal 2010 may perform a 5G RRC connection setup with the 5G base station (5GNB) 2030 in step 2085.

When direct communication between the 5G base station (5GNB) 2030 and the terminal 2010 becomes available by performing the 5G RRC connection setup procedure, 5G RRC signaling between the terminal 2010 and the 5G base station (5GNB) 2030 via the LTE base station (eNB) 2020 may not be necessary. In step 2090, the terminal 2010, the 5G base station (5GNB) 2030, and the LTE base station (eNB) 2020 may perform a procedure of releasing the 5G PDN connection having been set for 5G RRC signaling. For example, if the terminal 2010 receives a 5G RRC connection setup message from the 5G base station 2030, the terminal 2010 and the 5G base station 2030 may release the 5G PDN connection having been set for the 5G RRC signaling, and the terminal 2010 may transmit a 5G RRC connection setup complete message via a direct connection to the 5G base station 2030, in response to the release of the 5G PDN connection. As another example, when the terminal 2010 receives a 5G RRC connection reconfiguration message from the 5G base station 2030, the terminal 2010 and the 5G base station 2030 may release the PDN connection having been set for the 5G RRC signaling, and the terminal 2010 may transmit a 5G RRC connection reconfiguration complete message via a direct connection to the 5G base station 2030, in response to the release of the PDN connection. It is obvious that the 5G RRC connection setup message, the 5G RRC connection setup complete message, the 5G RRC connection reconfiguration message, or the 5G RRC connection reconfiguration complete message may be changed to another message having the same purpose (e.g., 5G RRC configuration).

When step 2090 is completed, the tunnel (channel) for transmitting the 5G RRC message between the terminal 2010 and the 5G base station (5GNB) 2030 may be released in step 2095. According to an embodiment, with respect to the PDN connection and the tunnel (channel) for transmission/reception of the released 5G RRC signaling, an indicator indicating that the PDN connection or the tunnel (channel) is dedicated to the 5G RRC signaling may be released.

(2-1-2)

Figure 21:
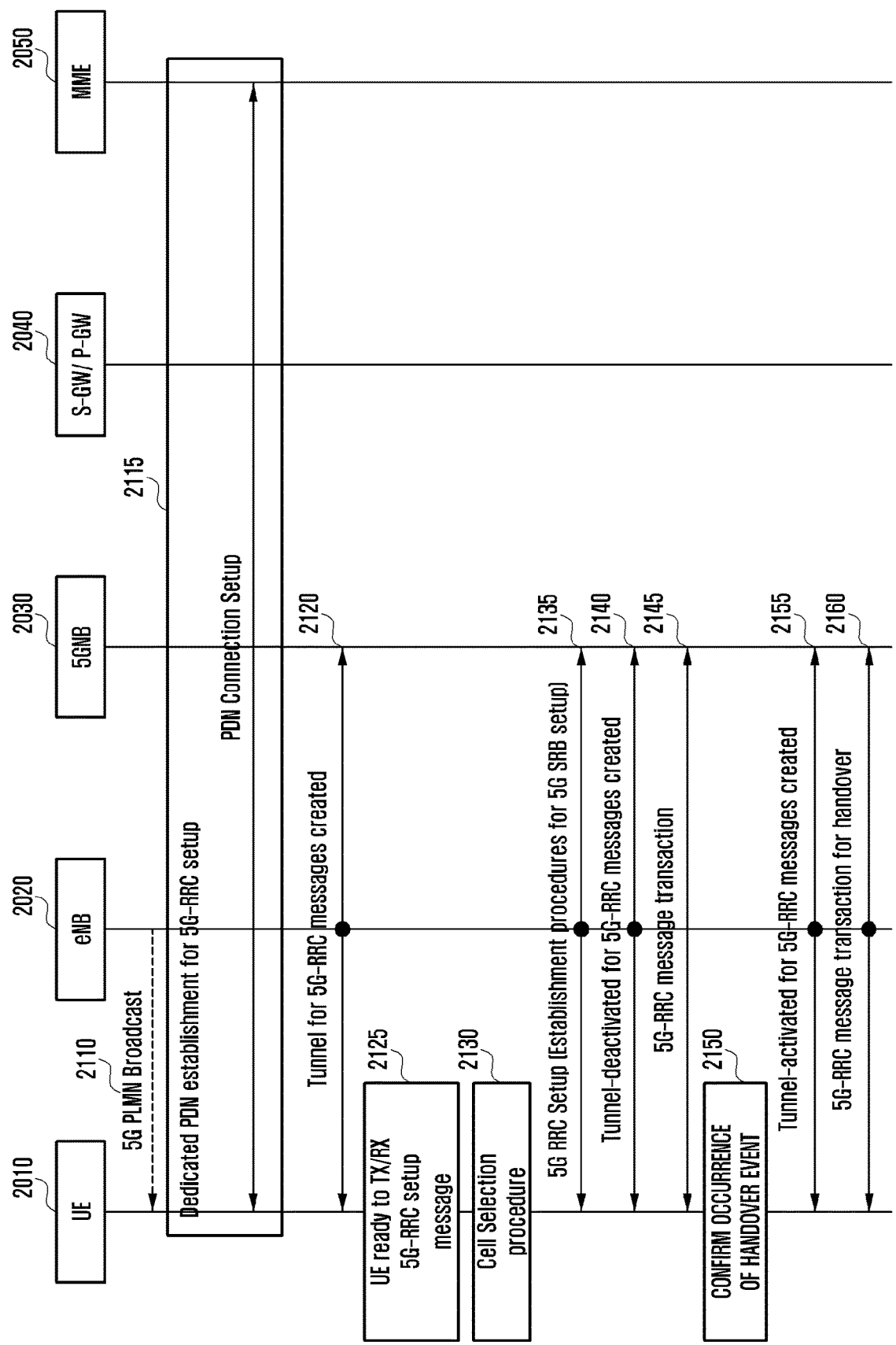
FIG. 21 is another embodiment of a 5G RRC connection operation procedure in a 4G and 5G coexistence system according to an embodiment of the disclosure.

FIG. 21 is still another embodiment of a 5G RRC connection operation procedure in a 4G and 5G coexistence system according to an embodiment of the disclosure.

Referring to FIG. 21, according to another embodiment of the disclosure, a procedure of releasing the 5G PDN connection having been set for the 5G RRC signaling may not be performed, and the 5G PDN connection may be used to transmit or receive the 5G RRC signaling for mobility (e.g., handover, etc.). That is, when the terminal 2010 determines occurrence of a handover event, the terminal 2010 may transmit the 5G RRC signaling transmitted to the 5G base station 2030 via the 5G PDN connection. The 5G base station 2030 may transmit the 5G RRC signaling including information, which enables the terminal 2010 to perform handover, to the terminal 2010 via the 5G PDN connection. Normal packet transmission or reception after the terminal 2010 performs handover to the target 5G base station 2030 may be performed via direct communication between the terminal 2010 and the target 5G base station 2030 without going through the PDN connection. When a 5G RLF event occurs or the 5G RRC connection is re-established, the terminal 2010 may transmit the 5G RRC signaling, which is transmitted to the 5G base station 2030, via the 5G PDN connection.

More specifically, when the 5G base station (5GNB) 2030 is present around the LTE base station (eNB) 2020, the LTE base station (eNB) 2020 may broadcast, in step 2110, an identifier (identification information) of the 5G base station 2030, for example, the 5G PLMN of the corresponding 5G base station 2030. The identifier of the 5G base station may be included in system information (e.g., an MIB, an SIB, etc.) so as to be transmitted, or may be transmitted by a UE-specific method for only the corresponding terminal 2010.

In step 2115, when the terminal 2010 receives information of the 5G base station, the terminal 2010 considers that there exists the 5G base station (5GNB) 2030 nearby, and may perform a procedure of establishing a PDN connection for transmitting/receiving a control signal (e.g., 5G RRC signaling) for establishing a connection to the 5G base station (5GNB) 2030. Specific descriptions relating thereto have been provided in the part related to FIG. 20, and detailed descriptions thereof will be thus omitted. Another embodiment of a condition, as described above, which triggers performing of a procedure of establishing a PDN connection for transmitting/receiving 5G RRC signaling will be described in details in embodiment (2-3).

When step 2115 is completed, a tunnel (channel) for transmitting the 5G RRC message may be generated (established) between the terminal 2010 and the 5G base station (5GNB) 2030 in step 2120. In step 2125, the terminal 2010 may exchange the 5G RRC message with the 5G base station 2030 via the tunnel (channel). According to an embodiment, with respect to the PDN connection and the tunnel (channel) for transmission/reception of the 5G RRC signaling, an indicator indicating that the PDN connection and the tunnel (channel) are dedicated to the 5G RRC signaling may be used.

In step 2130, the terminal 2010 may perform a cell selection procedure of measuring a signal intensity to select a suitable 5G base station (5GNB) 2030 in synchronization with the 5G base station (5GNB) 2030. If the terminal 2010 selects the suitable 5G base station (5GNB) 2030, the terminal 2010 may perform a procedure of setting up the 5G RRC connection with the 5G base station (5GNB) 2030, in step 2135.

When direct communication between the 5G base station (5GNB) 2030 and the terminal 2010 becomes available by performing the 5G RRC connection setup procedure, 5G RRC signaling between the terminal 2010 and the 5G base station (5GNB) 2030 via the LTE base station (eNB) 2020 may not be necessary. In step 2140, the terminal 2010, the 5G base station (5GNB) 2030, and the LTE base station 2020 may stop (or deactivate) use of the PDN connection or the tunnel (channel) established for the 5G RRC signaling. For example, when the terminal 2010 receives a 5G RRC connection setup message from the 5G base station 2030, the terminal 2010 and the 5G base station 2030 may stop using the PDN connection having been set for the 5G RRC signaling, and the terminal 2010 may transmit, in response thereto, a 5G RRC connection setup complete message via a direct connection to the 5G base station 2030. It is obvious that the 5G RRC connection setup message or the 5G RRC connection setup complete message may be changed to another message having the same purpose. As another example, when the terminal 2010 receives a 5G RRC connection reconfiguration message from the 5G base station 2030, the terminal 2010 and the 5G base station 2030 may deactivate the PDN connection having been set for the 5G RRC signaling, and the terminal 2010 may transmit, in response thereto, a 5G RRC connection reconfiguration complete message via a direct connection to the 5G base station 2030. According to an embodiment, the 5G base station 2030 and the LTE base station 2020 may exchange information on stopping use of the PDN connection or the tunnel (channel). According to an embodiment, with respect to the PDN connection and the tunnel (channel), an indicator indicating that the PDN connection or the tunnel (channel) is dedicated to the 5G RRC signaling may be deactivated.

When step 2140 is completed, the tunnel (channel) for transmitting the 5G RRC message between the terminal 2010 and the 5G base station (5GNB) 2030 may be deactivated, and the terminal 2010 and the 5G base station (5GNB) 2030 may directly transmit or receive the 5G RRC message, in step 2145.

Thereafter, in step 2150, the terminal 2010 may confirm a handover event for changing of the 5G cell. Here, in step 2155, for handover 5G RRC signaling, the terminal 2010 may transmit, to the LTE base station 2020, signaling for activation of use of the PDN connection or the tunnel (channel) for the deactivated 5G RRC signaling. The signaling transmitted to the LTE base station 2020 may include indicator information of the tunnel (channel) or the PDN connection. To this end, the terminal 2010, the LTE base station 2020, and the 5G base station 2030 may activate the 5G PDN connection or the tunnel (channel).

According to another embodiment, when the 5G base station 2030 confirms a handover event for changing of the 5G cell by the terminal 2010, the 5G base station 2030 may transmit, to the terminal 2010 and the LTE base station 2020, signaling for activation of use of the PDN connection or the tunnel (channel) for the deactivated 5G RRC signaling, for the handover 5G RRC signaling. The signaling, which the 5G base station 2030 transmits to the terminal 2010 or the LTE base station 2020, may include indicator information of the tunnel (channel) or the PDN connection.

According to still another embodiment, when the terminal 2010 confirms the handover event for changing of the 5G cell by the terminal 2010, signaling (e.g., NAS signaling) between the terminal and the network entity, for activation of use of the PDN connection or the tunnel (channel) for the deactivated 5G RRC signaling, may be transmitted via the LTE base station 2020 or the 5G base station 2030, for the handover 5G RRC signaling. The signaling between the terminal and the network entity may include indicator information of the tunnel (channel) or the PDN connection. The network entity having received the indicator information of the tunnel (channel) or the PDN connection may transmit activation indication information of the tunnel (channel) or the PDN connection to the LTE base station 2020 or the 5G base station 2030. The terminal 2010, the LTE base station 2020, and the 5G base station 2030 may transmit or receive the 5G RRC signaling of the terminal 2010 via the activated PDN connection or tunnel (channel).

As another embodiment of the disclosure, the terminal 2010 that attempts re-access to the 5G cell after occurrence of a radio link failure (RLF) may transmit deactivated PDN connection or tunnel (channel) activation indication information to the 5G base station 2030 or the LTE base station 2020 in order to transmit or receive 5G RRC signaling for re-access to the 5G cell. The terminal 2010 may add information of the tunnel (channel) or PDN connection to be activated to a message to be transmitted to the LTE base station 2020 or the 5G base station 2030. The terminal 2010 may add information of the tunnel (channel) or PDN connection to be activated to a message (e.g., NAS signaling) to be transmitted to the network entity.

Here, an interface between the LTE base station 2020 and the 5G base station 2030, for establishing the PDN connection may assume a direct connection or a connection via another network entity.

In the above embodiment, an example of performing a procedure of accessing the 5G base station 2030 by the terminal 2010 after establishing the PDN connection via the LTE base station 2020 has been described. However, it is obvious that the example may be expanded to the case where the terminal 2010 performs a procedure of multi-connection access to the LTE base station 2020 after establishing the PDN connection via the 5G base station 2030.

(2-2) Another Embodiment of Processing 5G RRC Signaling in the LTE and 5G Coexistence System (2-2-1)

Figure 22:
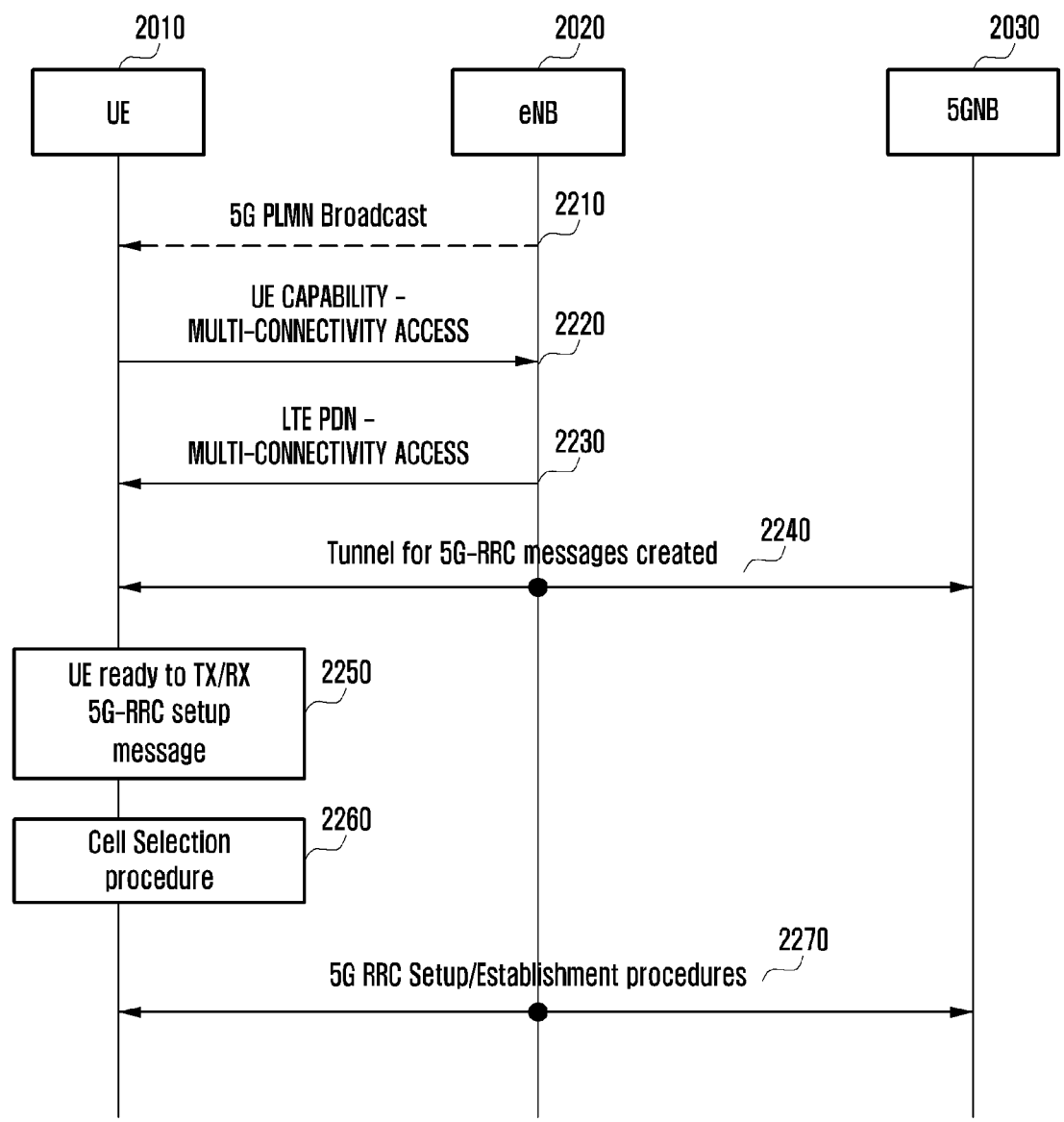
FIG. 22 is still another embodiment of a 5G RRC connection operation procedure in a 4G and 5G coexistence system according to an embodiment of the disclosure.

FIG. 22 is still another embodiment of a 5G RRC connection operation procedure in a 4G and 5G coexistence system according to an embodiment of the disclosure.

Referring to FIG. 22, when the terminal 2010 transmits 5G RRC signaling to or receives the 5G RRC signaling from the LTE base station 2020 via a PDN connection or a tunnel (channel), the terminal 2010 may transmit or receive the 5G RRC signaling via the PDN connection/tunnel (channel) previously established between the LTE base station 2020 and the terminal 2010, instead of separately establishing the PDN connection/tunnel (channel) for the 5G RRC signaling.

More specifically, when the 5G base station (5GNB) 2030 is present around the LTE base station (eNB) 2020, the LTE base station (eNB) 2020 may broadcast, in step 2210, an identifier (identification information) of the 5G base station 2030, for example, the 5G PLMN of the corresponding 5G base station 2030. An indicator of the 5G base station 2030 may be included in system information (e.g., an MIB, an SIB, etc.) so as to be transmitted, or may be transmitted by a UE-specific method for only the corresponding terminal 2010.

In step 2220, when the terminal 2010 receives 5G base station information, the terminal 2010 considers that the 5G base station (5GNB) 2030 is present nearby, and may perform a procedure of establishing a PDN connection for transmitting/receiving 5G RRC signaling for establishing a connection to the 5G base station (5GNB) 2030. In step 2220, the terminal 2010 may request establishment of the PDN connection for transmitting/receiving 5G RRC signaling, by transferring multi-connection access capability of the terminal 2010 to the LTE base station 2020.

In step 2230, the LTE base station 2020 may transmit, to the terminal 2010, LTE PDN connection information for transmitting/receiving the 5G RRC signaling. In step 2230, the LTE base station 2020 may assign an indicator for classifying the 5G RRC signaling transmitted or received via an LTE PDN connection. According to an embodiment of the disclosure, the terminal 2010 and the LTE base station 2020 may use a separate radio network temporary identifier (RNTI) for classifying the LTE RRC message and a 5G RRC message. For example, a 5G RRC connection reconfiguration message transmitted by the 5G base station 2030 so as to allow an RRC access procedure to be performed between the terminal 2010 and the 5G base station 2030 may be encoded with the RNTI for 5G RRC and transmitted. For example, the 5G RRC connection setup complete message transmitted by the terminal 2010 so as to allow the RRC access procedure to be performed between the terminal 2010 and the 5G base station 2030 may be encoded with the RNTI for 5G RRC and transmitted.

A tunnel (channel) for transmission/reception of the 5G RRC signaling using the LTE PDN connection is established between the terminal 2010, the LTE base station 2020, and the 5G base station 2030 in step 2240, and the terminal 2010 may exchange a 5G RRC message with the 5G base station 2030 via the tunnel (channel) in step 2250. According to an embodiment, when the terminal 2010 and the 5G base station 2030 transmit the 5G RRC signaling to or receive the 5G RRC signaling from the LTE base station 2020 via the preset PDN connection/tunnel (channel), a message transmitted via the PDN connection/tunnel (channel) may include a header or identification information (indicator) for indication of the 5G RRC signaling. In the case of an uplink, the terminal 2010 may include indication information for indication of the 5G RRC signaling in at least one among a packet data convergence protocol (PDCP) header, a radio link control (RLC) header, a medium access control (MAC) header, or a MAC control element (CE), which is attached to the 5G RRC signaling. In the case of a downlink, the 5G base station 2030 may include indication information for indication of the 5G RRC signaling in at least one among a PDCP header, an RLC header, a MAC header, or a MAC CE, which is attached to the 5G RRC signaling. Alternatively, in the case of a downlink, the LTE base station 2020 may include indication information for indication of the 5G RRC signaling in at least one among a PDCP header, an RLC header, a MAC header, or a MAC CE, which is attached to the 5G RRC signaling.

In step 2260, the terminal 2010 may perform a cell selection procedure of measuring a signal intensity to select a suitable 5G base station (5GNB) 2030 in synchronization with the 5G base station (5GNB) 2030. If the terminal 2010 selects the suitable 5G base station (5GNB) 2030, the terminal 2010 may perform a procedure of setting up the 5G RRC connection with the 5G base station (5GNB) 2030, in step 2270.

According to an embodiment, 5G RRC signaling transmission or reception using the preset LTE PDN connection may be used until the terminal 2010 completes setting of the RRC connection to the 5G base station 2030. According to an embodiment, the 5G RRC signaling transmission or reception using the preset LTE PDN connection may be used when the terminal 2010 sets the RRC connection to the 5G base station 2030, when the terminal 2010 determines a 5G cell handover event, and when the terminal 2010 determines an RLF event. According to an embodiment, the 5G RRC signaling transmission or reception using the preset LTE PDN connection may be used during a period in which the terminal 2010 maintains connection with the LTE cell.

(2-2-2)

Figure 23:
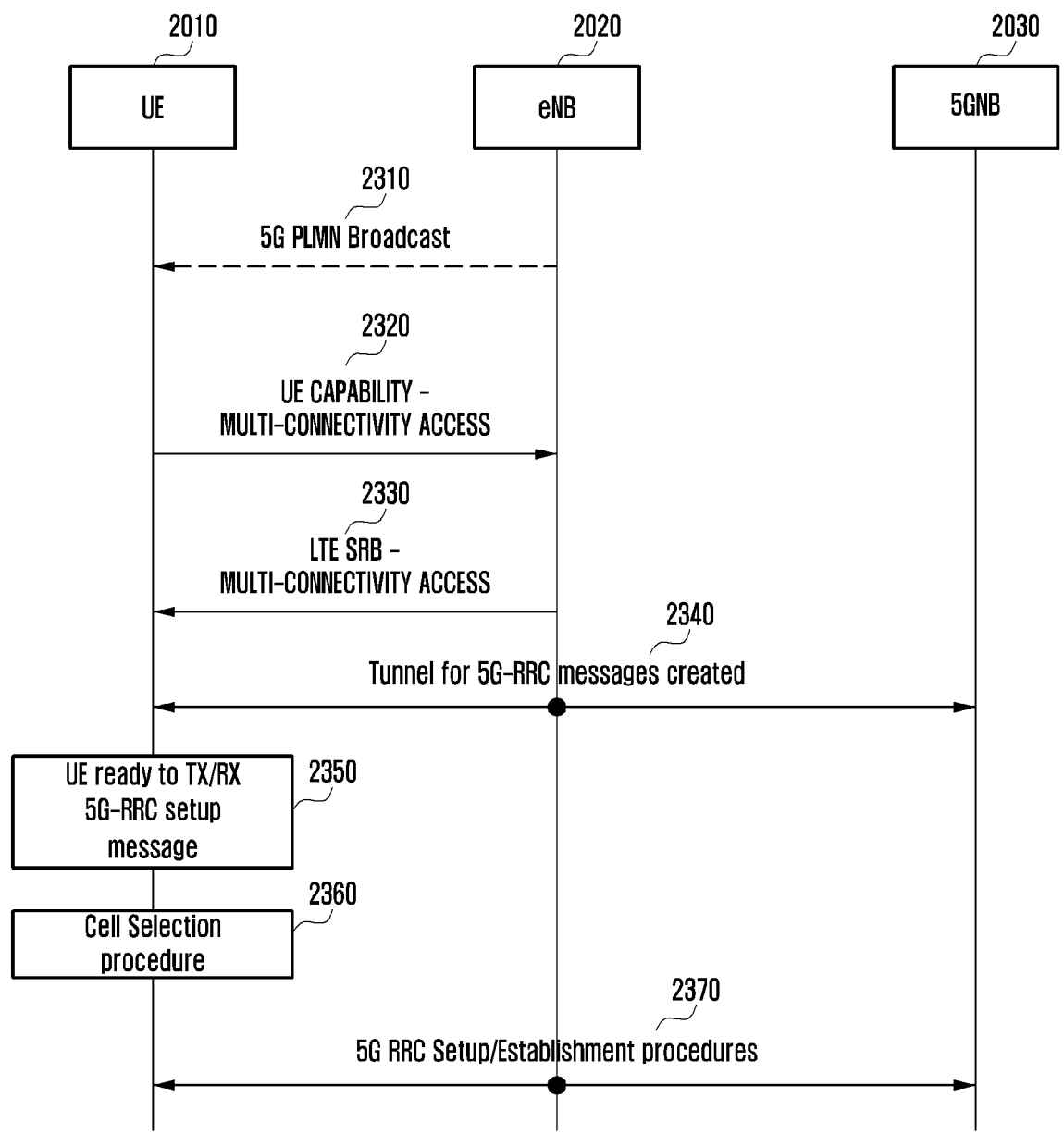
FIG. 23 is still another embodiment of a 5G RRC connection operation procedure in a 4G and 5G coexistence system according to an embodiment of the disclosure.

FIG. 23 is still another embodiment of a 5G RRC connection operation procedure in a 4G and 5G coexistence system according to an embodiment of the disclosure.

Referring to FIG. 23, according to another embodiment of the disclosure, an LTE signaling bearer (e.g., a signaling radio bearer (SRB)) may be used as a channel for transmitting 5G RRC signaling. The LTE signaling bearer may include a signaling bearer for transmitting RRC signaling to or receiving RRC signaling from the LTE.

More specifically, when the 5G base station (5GNB) 2030 is present around the LTE base station (eNB) 2020, the LTE base station (eNB) 2020 may broadcast, in step 2310, an identifier (identification information) of the 5G base station 2030, for example, the 5G PLMN of the corresponding 5G base station 2030. The indicator of the 5G base station 2030 may be included in system information (e.g., an MIB, an SIB, etc.) so as to be transmitted, or may be transmitted by a UE-specific method for only the corresponding terminal 2010.

In step 2320, when the terminal 2010 receives 5G base station information, the terminal 2010 considers that there is the 5G base station (5GNB) 2030 nearby, and may perform a procedure of establishing a connection for transmitting/receiving 5G RRC signaling for setting a connection to the 5G base station (5GNB) 2030. In step 2320, the terminal 2010 may request establishment of the connection for transmission/reception of the 5G RRC signaling, by transferring multi-connection access capability of the terminal 2010 to the LTE base station 2020.

In step 2330, the LTE base station 2020 may transmit, to the terminal 2010, LTE signaling bearer information for transmission/reception of the 5G RRC signaling. In step 2330, the LTE base station 2020 may assign, to the terminal 2010, an indicator that enables the LTE RRC SRB (signaling bearer) and the 5G RRC SRB to be classified. According to an embodiment of the disclosure, the terminal 2010 and the LTE base station 2020 may use a separate RNTI to classify the LTE RRC and the 5G RRC. For example, a 5G RRC connection reconfiguration message transmitted by the 5G base station 2030 so as to allow an RRC access procedure to be performed between the terminal 2010 and the 5G base station 2030 may be encoded with the RNTI for 5G RRC and transmitted. For example, the 5G RRC connection setup complete message transmitted by the terminal 2010 so as to allow the RRC access procedure to be performed between the terminal 2010 and the 5G base station 2030 may be encoded with the RNTI for 5G RRC and transmitted.

A tunnel (channel) for transmission/reception of the 5G RRC signaling using the LTE signaling bearer may be established between the terminal 2010, the LTE base station 2020, and the 5G base station 2030 in step 2340, and the terminal 2010 may exchange a 5G RRC message of the terminal 2010 with the 5G base station 2030 via the tunnel (channel) in step 2350. The terminal 2010 and/or the LTE base station 2020 may include identifier information, which is for classification of whether the RRC signaling transmitted by a signaling bearer for transmission or reception of the RRC signaling of the terminal 2010 and the LTE base station 2020 is for the LTE RRC or the 5G RRC, in at least one among a PDCP header, an RLC header, a MAC header, or a MAC CE, which is attached to the RRC signaling. A specific example thereof has been described with reference to FIG. 22, and a detailed description thereof will be omitted.

In step 2360, the terminal 2010 may perform a cell selection procedure of measuring a signal intensity to select a suitable 5G base station (5GNB) 2030 in synchronization with the 5G base station (5GNB) 2030. If the terminal 2010 selects the suitable 5G base station (5GNB) 2030, the terminal 2010 may perform a procedure of setting up the 5G RRC connection with the 5G base station (5GNB) 2030, in step 2370.

According to an embodiment of the disclosure, the 5G RRC signaling transmission or reception using the LTE signaling bearer may be used until the terminal 2010 completes setting an RRC connection to the 5G base station 2030. According to an embodiment of the disclosure, the 5G RRC signaling transmission or reception using the LTE signaling bearer may be used when the terminal 2010 sets the RRC connection to the 5G base station 2030, when the terminal 2010 determines a 5G cell handover event, and when the terminal 2010 determines an RLF event. According to an embodiment of the disclosure, the 5G RRC signaling transmission or reception using the LTE signaling bearer may be used during a period in which the terminal 2010 maintains connection with the LTE cell.

(2-2-3)

Figure 24:
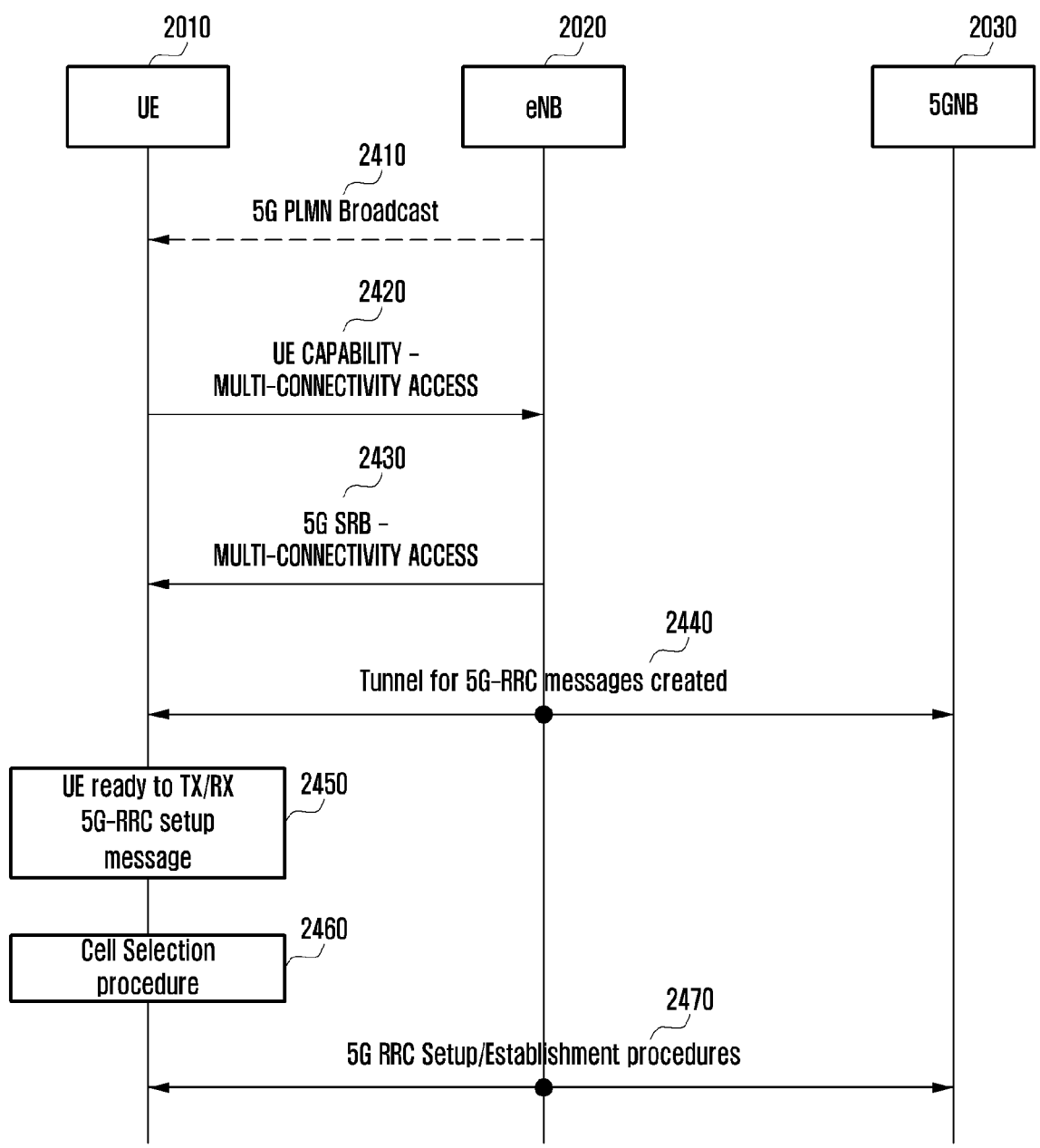
FIG. 24 is still another embodiment of a 5G RRC connection operation procedure in a 4G and 5G coexistence system according to an embodiment of the disclosure.

FIG. 24 is still another embodiment of a 5G RRC connection operation procedure in a 4G and 5G coexistence system according to an embodiment of the disclosure.

Referring to FIG. 24, according to another embodiment of the disclosure, the terminal 2010 and LTE base station 2020 may set a signaling bearer for 5G RRC. For example, a 5G RRC connection reconfiguration message transmitted by the 5G base station 2030 to perform a procedure of RRC access to the 5G base station 2030 may be transmitted through the signaling bearer for the 5G RRC. For example, a 5G RRC connection setup complete message transmitted by the terminal 2010 to perform a procedure of the RRC access to the 5G base station 2030 may be transmitted via the signaling bearer for the 5G RRC. The 5G RRC signaling bearer may be operated by an LTE air interface.

More specifically, when the 5G base station (5GNB) 2030 is present around the LTE base station (eNB) 2020, the LTE base station (eNB) 2020 may broadcast, in step 2410, an identifier (identification information) of the 5G base station 2030, for example, the 5G PLMN of the corresponding 5G base station 2030. An indicator of the 5G base station 2030 may be included in system information (e.g., an MIB, an SIB, etc.) so as to be transmitted, or may be transmitted by a UE-specific method for only the corresponding terminal 2010.

In step 2420, when the terminal 2010 receives 5G base station information, the terminal 2010 considers that there is the 5G base station (5GNB) 2030 nearby, and may perform a procedure of establishing a connection for transmission/reception of 5G RRC signaling for setting a connection to the 5G base station (5GNB) 2030. In step 2420, the terminal 2010 may request establishment of the connection for transmission/reception of the 5G RRC signaling, by transferring multi-connection access capability of the terminal 2010 to the LTE base station 2020.

In step 2430, the LTE base station 2020 may transmit, to the terminal 2010, 5G signaling bearer information for transmission/reception of the 5G RRC signaling. For example, the 5G RRC connection reconfiguration message, which the 5G base station 2030 transmits to the terminal 2010 to perform a procedure of the RRC connection of the terminal 2010 and the 5G base station 2030, may be transmitted by the 5G signaling bearer. For example, the 5G RRC connection setup complete message, which the terminal 2010 transmits to the 5G base station 2030 to perform the procedure of the RRC connection of the terminal 2010 and the 5G base station 2030, may be transmitted by the 5G signaling bearer.

A tunnel (channel) for transmission/reception of the 5G RRC signaling by using the 5G signaling bearer may be established between the terminal 2010, the LTE base station 2020, and the 5G base station 2030 in step 2440, and the terminal 2010 may exchange a 5G RRC message of the terminal 2010 with the 5G base station 2030 via the tunnel (channel) in step 2450.

In step 2460, the terminal 2010 may perform a cell selection procedure of measuring a signal intensity to select a suitable 5G base station (5GNB) 2030 in synchronization with the 5G base station (5GNB) 2030. If the terminal 2010 selects the suitable 5G base station (5GNB) 2030, the terminal 2010 may perform a procedure of setting up the 5G RRC connection with the 5G base station (5GNB) 2030, in step 2470.

According to an embodiment of the disclosure, 5G RRC signaling transmission or reception using the 5G RRC signaling bearer set to the LTE base station 2020 may be used until the terminal 2010 completes setting of RRC connection to the 5G base station 2030. According to an embodiment of the disclosure, the 5G RRC signaling transmission or reception using the 5G RRC signaling bearer set to the LTE base station 2020 may be used when the terminal 2010 sets RRC connection to the 5G base station 2030, when the terminal 2010 determines a 5G cell handover event, and when the terminal 2010 determines an RLF event. According to an embodiment of the disclosure, the 5G RRC signaling transmission or reception using the 5G RRC signaling bearer set to the LTE base station 2020 may be used during a period in which the terminal 2010 maintains connection with the LTE cell.

(2-2-4)

Figure 25:
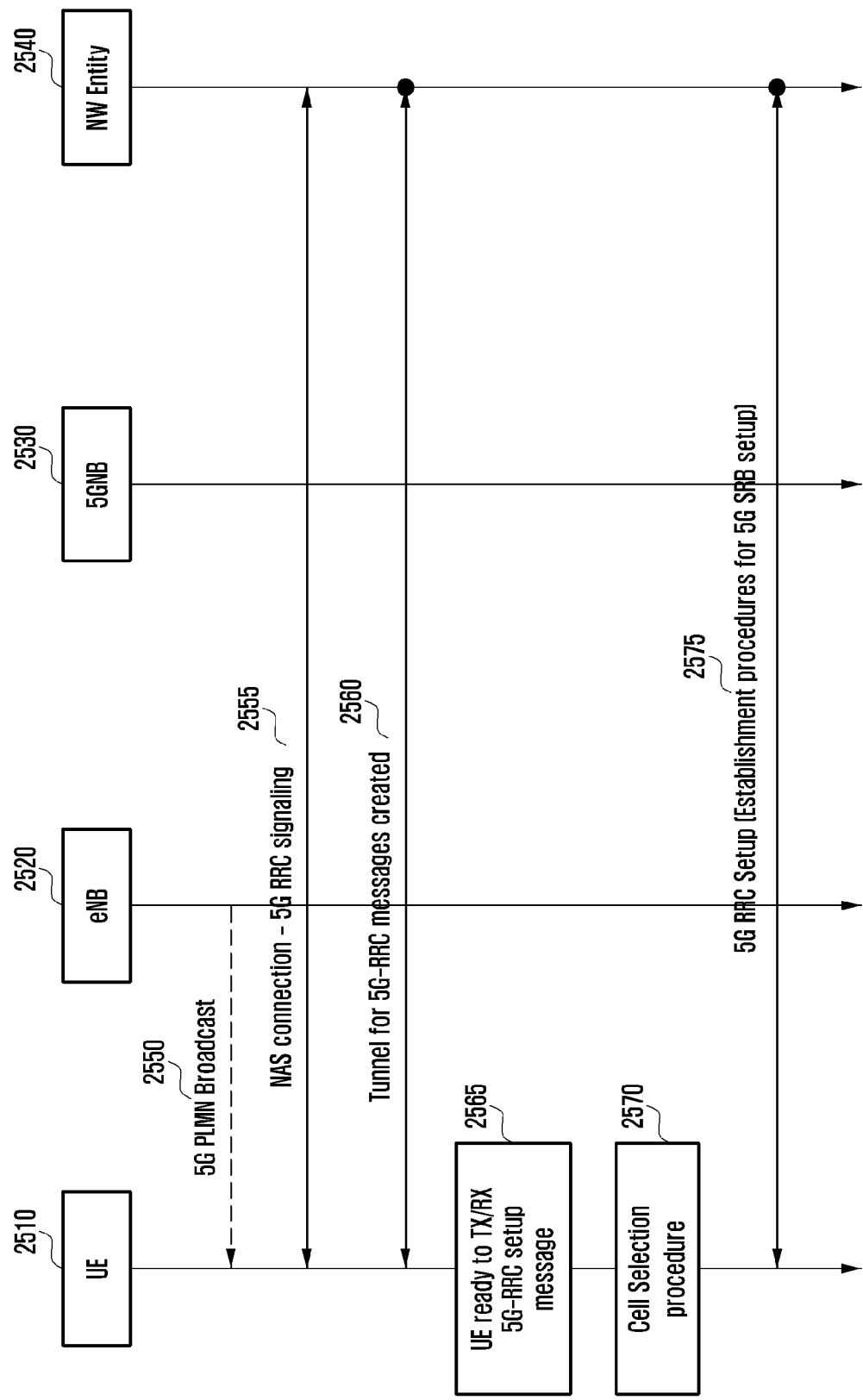
FIG. 25 is still another embodiment of a 5G RRC connection operation procedure in a 4G and 5G coexistence system according to an embodiment of the disclosure.

FIG. 25 is still another embodiment of a 5G RRC connection operation procedure in a 4G and 5G coexistence system according to an embodiment of the disclosure.

Referring to FIG. 25, according to another embodiment of the disclosure, a terminal 2510 and a network entity 2540 may set a 5G RRC signaling bearer to an LTE base station 2520. The 5G RRC signaling bearer may be a signaling bearer that transmits or receives signaling (e.g., non-access stratum (NAS) signaling) between the terminal 2510 and the network entity 2540. According to an embodiment, the network entity 2540 may include at least one among an MME, an AMF, a UPF, an SMF, a P-GW, an S-GW.

More specifically, when the 5G base station (5GNB) 2530 is present around the LTE base station (eNB) 2520, the LTE base station (eNB) 2020 may broadcast, in step 2550, an identifier (identification information) of the 5G base station 2530, for example, the 5G PLMN of the corresponding 5G base station 2530. An indicator of the 5G base station 2530 may be included in system information (e.g., an MIB, an SIB, etc.) so as to be transmitted, or may be transmitted by a UE-specific method for only the corresponding terminal 2510.

In step 2555, when the terminal 2510 receives 5G base station information, the terminal 2010 considers that there is the 5G base station (5GNB) 2530 nearby, and may perform a procedure of establishing a connection for transmission/reception of 5G RRC signaling for setting a connection to the 5G base station (5GNB) 2530. In step 2555, the terminal 2510 may set a 5G RRC signaling connection via the network entity 2540 that processes NAS signaling. In step 2555, the terminal 2510 may transmit multi-connection access capability of the terminal 2510 via the NAS signaling to the network entity 2540. In step 2555, the network entity 2540 may transmit, to the terminal 2510, 5G NAS signaling bearer information for transmission/reception of the 5G RRC signaling. The terminal 2510 and the network entity 2540 may include indication information for classification of whether the exchanged signaling is LTE NAS signaling or 5G NAS signaling. For example, a 5G RRC connection reconfiguration message, which the 5G base station 2530 transmits to the terminal 2510 to perform a procedure of RRC connection of the terminal 2510 and the 5G base station 2530, may be transmitted via the 5G NAS signaling bearer. For example, a 5G RRC connection setup complete message, which the terminal 2510 transmits to the 5G base station 2530 to perform the procedure of RRC connection of the terminal 2510 and the 5G base station 2530, may be transmitted via the 5G NAS signaling bearer.

A tunnel (channel) for transmission/reception of 5G RRC signaling by using the 5G NAS signaling bearer may be established between the terminal 2510, the network entity 2540, the LTE base station 2520, and the 5G base station 2530 in step 2560, and the terminal 2510 may exchange a 5G RRC message of the terminal 2510 with the 5G base station 2530 via the tunnel (channel) in step 2565.

In step 2570, the terminal 2510 may perform a cell selection procedure of measuring a signal intensity to select a suitable 5G base station (5GNB) 2530 in synchronization with the 5G base station (5GNB) 2530. If the terminal 2510 selects the suitable 5G base station (5GNB) 2530, the terminal 2510 may perform a procedure of setting up the 5G RRC connection with the 5G base station (5GNB) 2530, in step 2575.

According to an embodiment of the disclosure, 5G RRC signaling transmission or reception using the 5G NAS signaling bearer may be used until the terminal 2510 completes setting of RRC connection to the 5G base station 2530. According to an embodiment of the disclosure, the 5G RRC signaling transmission or reception using the 5G NAS signaling bearer may be used when terminal 2510 sets the RRC connection to the 5G base station 2530, when the terminal 2510 determines a 5G cell handover event, and the terminal 2510 determines an RLF event. According to an embodiment of the disclosure, the 5G RRC signaling transmission or reception using the 5G NAS signaling bearer may be used during a period in which the terminal 2510 maintains connection with the LTE cell.

(2-2-5)

Figure 26:
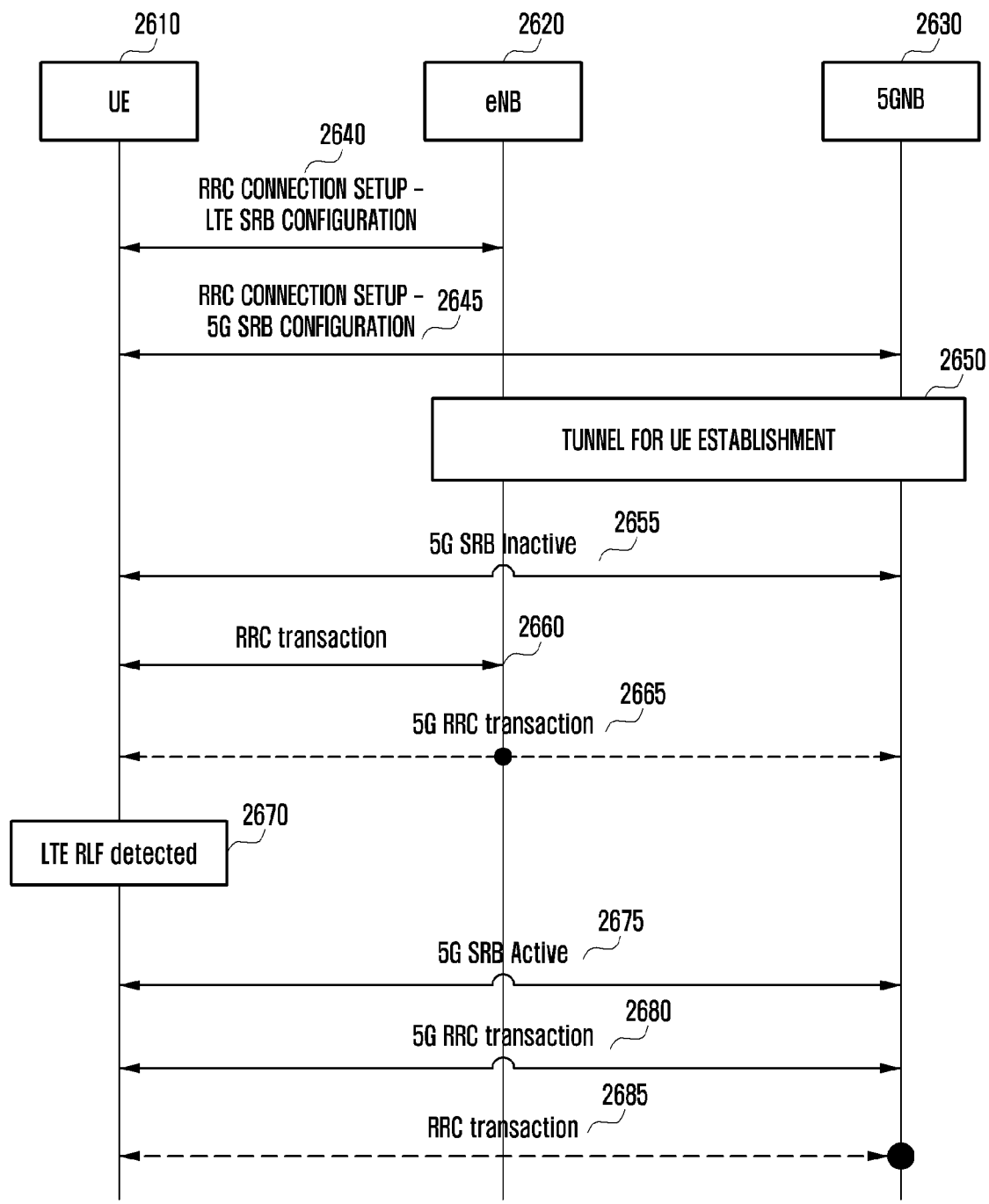
FIG. 26 is still another embodiment of a 5G RRC connection operation procedure in a 4G and 5G coexistence system according to an embodiment of the disclosure.

FIG. 26 is still another embodiment of a 5G RRC connection operation procedure in a 4G and 5G coexistence system according to an embodiment of the disclosure.

Referring to FIG. 26, an embodiment of the disclosure shows an RRC connection configuration procedure of the terminal 2610 in a system where an LTE base station 2620 and a 5G base station 2630 coexist. The procedure may be applied to the case of initial access of the terminal 2610 or the case of re-access in which the terminal 2610 transitions from an idle mode to a connected mode. According to an embodiment of the disclosure, an embodiment, in which the procedure is applied to the case of re-access where the terminal 2610 transitions from the idle mode to the connected mode, may include receiving paging from the LTE base station (eNB) 2620 and performing a system access procedure, by the terminal 2610.

In step 2640, the terminal 2610 may perform a procedure of setting a connection to the LTE base station (eNB) 2620. Here, the terminal 2610 and the LTE base station 2620 may perform a procedure of establishing a connection for transmission/reception of LTE RRC signaling, and a channel for transmission/reception of the LTE RRC signaling may correspond to an LTE RRC signaling radio bearer (SRB).

When there is the 5G base station (5GNB) 2630 around the LTE base station (eNB) 2620, the LTE base station (eNB) 2620 may broadcast an identifier (identification information) of the 5G base station 2630, for example, a 5G PLMN of the 5G base station 2630. An indicator of the 5G base station 2630 may be included in system information (e.g., an MIB, an SIB, etc.) so as to be transmitted, or may be transmitted by a UE-specific method for only the corresponding terminal 2610.

In step 2645, when the terminal 2610 receives 5G base station information, the terminal 2610 considers that the 5G base station (5GNB) 2630 exists nearby, and may perform a procedure of selecting a suitable 5G base station (5GNB) 2630 so as to establish a connection for transmission/reception of 5G RRC signaling for setting of a connection to the 5G base station (5GNB) 2630. Another embodiment of a condition, as described above, which triggers performing of a procedure of establishing a connection for transmission/reception of 5G RRC signaling will be described in details in embodiment (2-3).

When step 2645 is completed, a channel for transmission of a 5G RRC message may be generated (established) between the terminal 2610 and the 5G base station (5GNB) 2630, in step 2650. The terminal 2610 may exchange the 5G RRC message with the 5G base station 2630 via the channel. The channel for transmission/reception of 5G RRC signaling may correspond to, for example, a 5G signaling radio bearer. When a connection for 5G RRC signaling is established between the terminal 2610 and the 5G base station (5GNB) 2630, a tunnel (channel) for transmission of the RRC signaling (an LTE RRC message, the 5G RRC message, or the like) of the terminal 2610 may be established between the LTE base station 2620 and the 5G base station 2630 in step 2650.

According to an embodiment, the tunnel for the RRC signaling of the terminal 2610 between the LTE base station 2620 and the 5G base station 2630 may be used as a pathway that transmits LTE RRC signaling between the LTE base station 2620 and the terminal 2610 when there occurs an event that does not allow the terminal 2610 to transmit LTE RRC signaling to or receive LTE RRC signaling from the LTE base station 2620. Alternatively, according to an embodiment, the tunnel for RRC signaling of the terminal 2610 between the LTE base station 2620 and the 5G base station 2630 may be used as a pathway that transmits the 5G RRC signaling between the terminal 2610 and the 5G base station 2630 when there occurs an event that does not allow 5G RRC signaling between the terminal 2610 and the 5G base station 2630. The event may include, for example, a determination of a radio link failure (RLF) with the LTE base station 2620, a determination of a radio link failure (RLF) with the 5G base station 2630, an LTE base station 2620 handover determination, a 5G base station 2630 handover determination, or the like. According to an embodiment of the disclosure, if the event does not occur, the terminal 2610 and the LTE base station 2620 may directly perform LTE RRC signaling transmission, and the terminal 2610 and the 5G base station 2630 may directly perform 5G RRC signaling transmission. According to another embodiment of the disclosure, if the event does not occur, the terminal 2610 and the LTE base station 2620 may perform LTE RRC signaling transmission and 5G RRC signaling transmission, and a 5G RRC signaling transmission channel between the terminal 2610 and the 5G base station 2630 may be deactivated. According to still another embodiment of the disclosure, if the event does not occur, the terminal 2610 and the 5G base station 2630 may perform 5G RRC signaling transmission and LTE RRC signaling transmission, and an LTE RRC signaling transmission channel between the terminal 2610 and the LTE base station 2620 may be deactivated.

In step 2655, the channel for transmission of 5G RRC signaling between the terminal 2610 and the 5G base station 2630 may be deactivated. In this case, in step 2660, the terminal 2610 and the LTE base station 2620 may perform LTE RRC signaling transmission/reception via the set LTE RRC signaling transmission/reception channel. In step 2665, the terminal 2610 and the 5G base station 2630 may transmit or receive 5G RRC signaling via the tunnel set between the LTE base station 2620 and the 5G base station 2630.

Here, it may be assumed that the 5G RRC signaling transmission/reception between the terminal 2610 and the LTE base station 2620 uses the LTE RRC signaling transmission/reception channel, the separately set 5G PDN connection channel, the separately set 5G LTE signaling bearer channel, the 5G RRC signaling bearer set to the LTE base station 2620, or the NAS signaling bearer channel. Specific examples relating thereto have been described, and detailed descriptions will be thus omitted.

In step 2670, there may occur an event via which the terminal 2610 is unable to transmit LTE RRC signaling to or receive LTE RRC signaling from the LTE base station 2620 via direct connection therebetween (e.g., occurrence of an LTE RLF). In step 2675, the terminal 2610 may activate the 5G RRC signaling transmission/reception channel with the 5G base station 2630. In order to request activation of the 5G RRC signaling transmission/reception channel with the 5G base station 2630, the terminal 2610 may transmit, to the 5G base station 2630, a random access code for requesting activation of the 5G RRC signaling transmission/reception channel, MAC CE-type signaling, or 5G RRC signaling (e.g., RRC connection reestablishment with 5G RRC activation, RRC connection reconfiguration with 5G RRC activation, etc.). In step 2680, the terminal 2610 and the 5G base station 2630 may transmit or receive 5G RRC signaling via the activated 5G RRC signaling transmission/reception channel. In step 2685, the terminal 2610 and the LTE base station 2620 may transmit or receive LTE RRC signaling via the tunnel set between the LTE base station 2620 and the 5G base station 2630.

Here, it may be assumed that the transmission/reception of LTE RRC signaling between the terminal 2610 and the 5G base station 2630 uses the 5G RRC signaling transmission/reception channel, the separately set LTE PDN connection channel, the separately set 5G signaling bearer channel, the LTE RRC signaling bearer set to the 5G base station 2630, or the NAS signaling bearer channel. The activated 5G RRC signaling transmission/reception channel between the terminal 2610 and the 5G base station 2630 may be used until the LTE RRC signaling transmission/reception channel between the terminal 2610 and the LTE base station 2620 is normally operated.

In the described embodiments, it may be assumed that an interface between the LTE base station and the 5G base station, which is for using the preset PDN connection, the LTE signaling bearer, the 5G RRC signaling bearer set to the LTE base station, or the NAS signaling bearer, is directly connected or connected via another network entity. In the described embodiment, examples of performing RRC signaling transmission/reception with the 5G base station by using the PDN connection of the LTE base station, the LTE signaling bearer, the 5G RRC signaling bearer set to the LTE base station, or the 5G NAS signaling bearer set to the LTE base station, have been provided. However, it is obvious that the examples may be expanded to the case of performing RRC signaling transmission/reception with the LTE base station via using the PDN connection set to the 5G base station 2630, the 5G signaling bearer, the LTE RRC signaling bearer set to the 5G base station, or the LTE NAS signaling bearer set to the 5G base station.

(2-3) An Embodiment of an Operation of Triggering a 5G Access Procedure by a Terminal A terminal may determine the presence of a 5G cell so as to trigger a 5G cell access procedure, in which information necessary for determining the presence of the 5G cell may be acquired by the following embodiment. According to an embodiment of the disclosure, the information for triggering of the 5G cell access procedure may be applied to performing of an operation of a PDN connection setting for use of a PDN connection, a 5G RRC indication information configuration for use of an LTE signaling bearer, a 5G RRC signaling bearer configuration for use of a 5G RRC signaling bearer configured to an LTE base station, or a NAS signaling bearer configuration for use of a 5G NAS signaling bearer.

(2-3-1)

Figure 27:
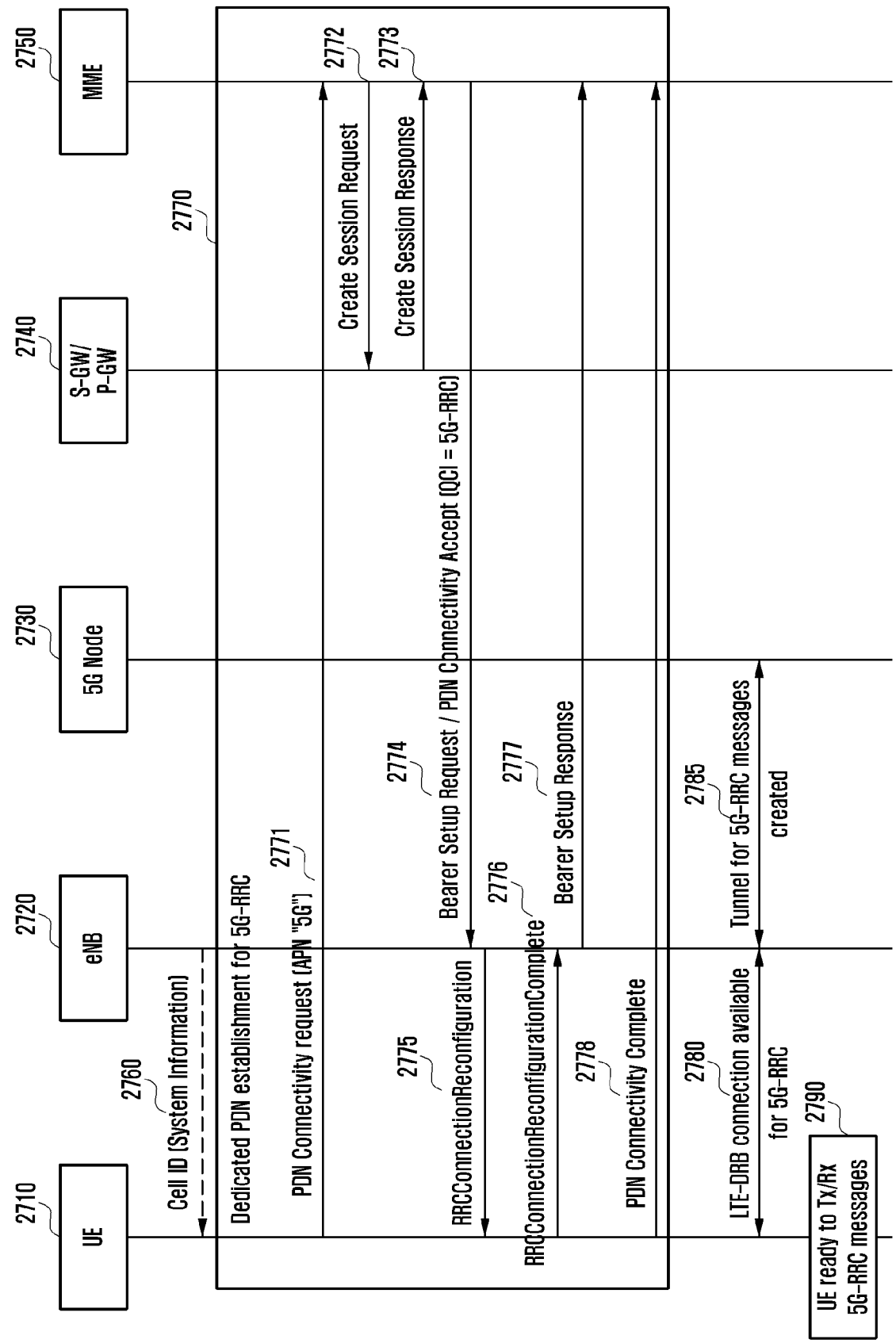
FIG. 27 is an embodiment of an operation procedure of triggering a 5G RRC connection in a 4G and 5G coexistence system according to an embodiment of the disclosure.
Figure 28:
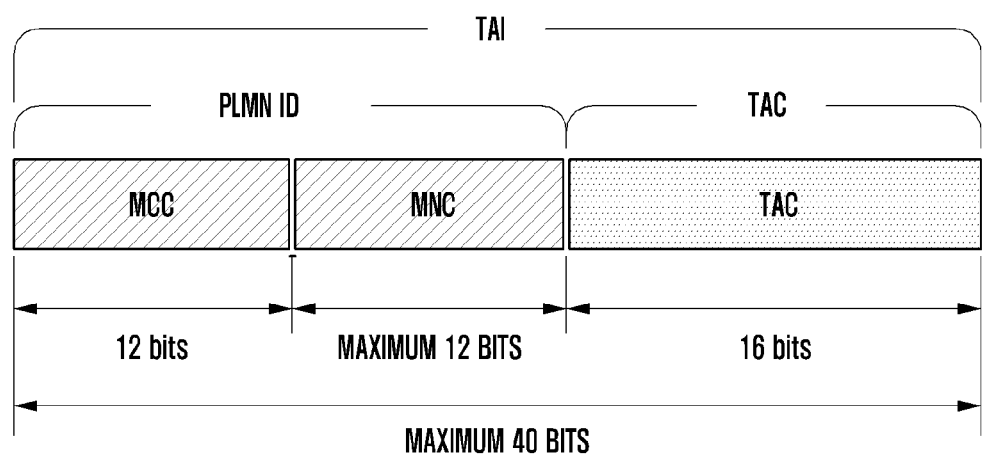
FIG. 28 is an example of a TAI format used in 5G RRC connection triggering in a 4G and 5G coexistence system according to an embodiment of the disclosure.

FIG. 27 is an embodiment of an operation procedure of triggering a 5G RRC connection in a 4G and 5G coexistence system according to an embodiment of the disclosure, and FIG. 28 is an example of a TAI format used in 5G RRC connection triggering in a 4G and 5G coexistence system according to an embodiment of the disclosure.

Referring to FIG. 27, in step 2760, when there is a 5G base station (5GNB) 2730 around an LTE base station 2720, the LTE base station 2720 may transmit identification information of the 5G base station 2730 to the terminal 2710. The information may be transmitted to the terminal in a broadcasting scheme via system information.

More specifically, information used in 5G cell access triggering of the terminal 2710 may include a tracking area identifier or a 5G cell identifier pre-stored in the terminal 2710. When the terminal 2710 accesses the LTE cell 2720, LTE cell identifier information in system broadcast information, which is acquired from the LTE cell 2720, may include information of the 5G cell 2730 coexisting with the LTE cell 2720, in step 2760.

For example, the LTE cell identifier information may include, as illustrated in FIG. 28, tracking area code (TAC) information of the 5G cell 2730 coexisting with the LTE cell 2720. The terminal 2710 having received the TAC information of the 5G cell 2730 may perform comparison with the pre-stored TA identifier of the 5G cell 2730, so as to predict the presence of the 5G cell 2730 coexisting with the LTE base station 2720.

The terminal 2710 having predicted the presence of the 5G cell 2730 coexisting with the LTE cell 2720 may initiate a procedure of accessing the 5G cell 2730 (e.g., a procedure of a PDN connection for 5G RRC signaling) in step 2770. Specifically, in step 2771, the terminal 2710 may transmit a PDN connection request message to an MME 2750. Here, the PDN connection request message may be transmitted by designating an access point name (APN) as a 5G network. This is for 5G PDN connection setting for 5G RRC signaling and specific descriptions relating thereto have been described, and detailed descriptions will be thus omitted. The MME 2750 transmits a session generation request (create session request) message to an S-GW/P-GW 2740 in step 2772, and may receive a session generation response (create session response) message in response thereto from the S-GW/P-GW 2740 in step 2773. Thereafter, in step 2774, the MME 2750 may transmit a bearer setup request message to the LTE base station 2720. The bearer setup request message may include a PDN connectivity accept message. A QoS class identifier (QCI) may be designated as 5G-RRC. In step 2775, the LTE base station 2720 may transmit an RRC connection reconfiguration message to the terminal 2710. In step 2776, the terminal 2710 may transmit an RRC connection reconfiguration complete message to the LTE base station 2720. The LTE base station 2720 may transmit a bearer setup response message to the MME 2750 in step 2777, and the terminal 2710 may transmit a PDN connectivity complete message to the MME 2750 in step 2778. Accordingly, the PDN connection for 5G RRC signaling may be set.

Thereafter, in steps 2870 and 2785, a tunnel (channel) for transmission/reception of 5G RRC signaling may be established between the terminal 2710, the LTE base station 2720, and the 5G base station 2730. In step 2790, the terminal 2710 may exchange a 5G RRC message of the terminal 2710 with the 5G base station 2730 via the tunnel (channel).

(2-3-2)

Figure 29:
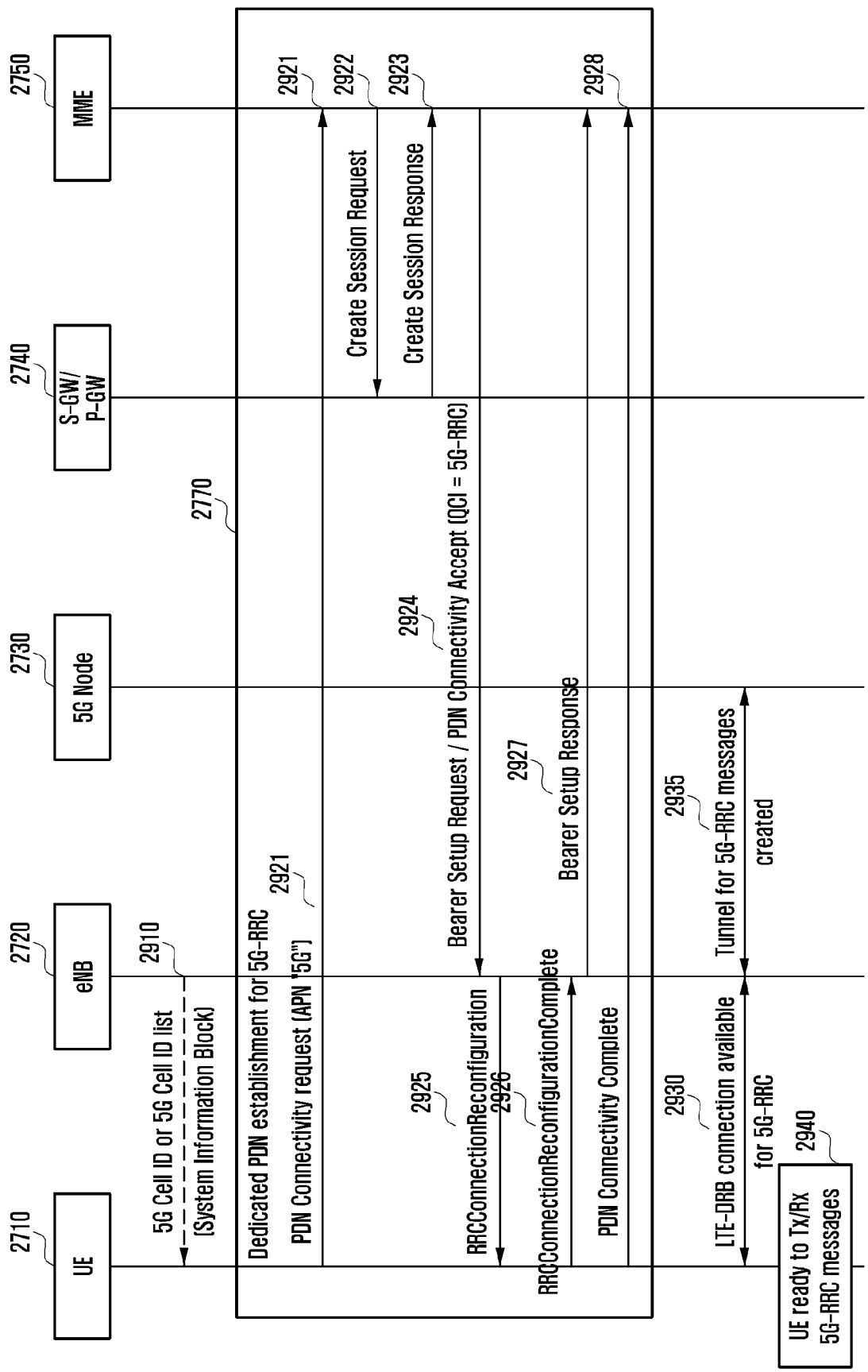
FIG. 29 is another embodiment of an operation procedure of triggering a 5G RRC connection in a 4G and 5G coexistence system according to an embodiment of the disclosure.

FIG. 29 is still another embodiment of an operation procedure of triggering a 5G RRC connection in a 4G and 5G coexistence system according to an embodiment of the disclosure.

Referring to FIG. 29, in step 2910, when there is the 5G base station (5GNB) 2730 around the LTE base station 2720, the LTE base station 2720 may transmit identification information of the 5G base station 2730 to the terminal 2710. The information may be transmitted to the terminal in a broadcasting scheme via system information.

More specifically, the terminal 2710 may acquire an identifier (a 5G cell ID) of the 5G cell 2730 coexisting with the LTE base station 2720 vis system broadcast information transmitted by the LTE base station 2720, when the terminal 2710 accesses the LTE base station 2720. The system broadcast information transmitted by the LTE base station 2720 may include the 5G cell identifier. The terminal 2710 may predict the presence of the 5G cell 2730 coexisting with the LTE base station 2720 via the 5G cell identifier information. The 5G cell identifier may be transmitted in the form of a 5G cell identifier list (5G cell ID list) to the terminal 2710.

The terminal 2710 having predicted the presence of the 5G cell 2730 coexisting with the LTE cell 2720 may initiate a procedure of accessing the 5G cell 2730 (e.g., a procedure of a PDN connection for 5G RRC signaling) in step 2920. Steps 2921 to 2928 are similar to steps 2771 to 2778 in the embodiments described with reference to FIG. 28, and detailed descriptions thereof will be thus omitted.

Thereafter, in steps 2930 and 2935, a tunnel (channel) for transmission/reception of 5G RRC signaling may be established between the terminal 2710, the LTE base station 2720, and the 5G base station 2730. In step 2940, the terminal 2710 may exchange a 5G RRC message of the terminal 2710 with the 5G base station 2730 via the tunnel (channel).

(2-3-3)

Figure 30:
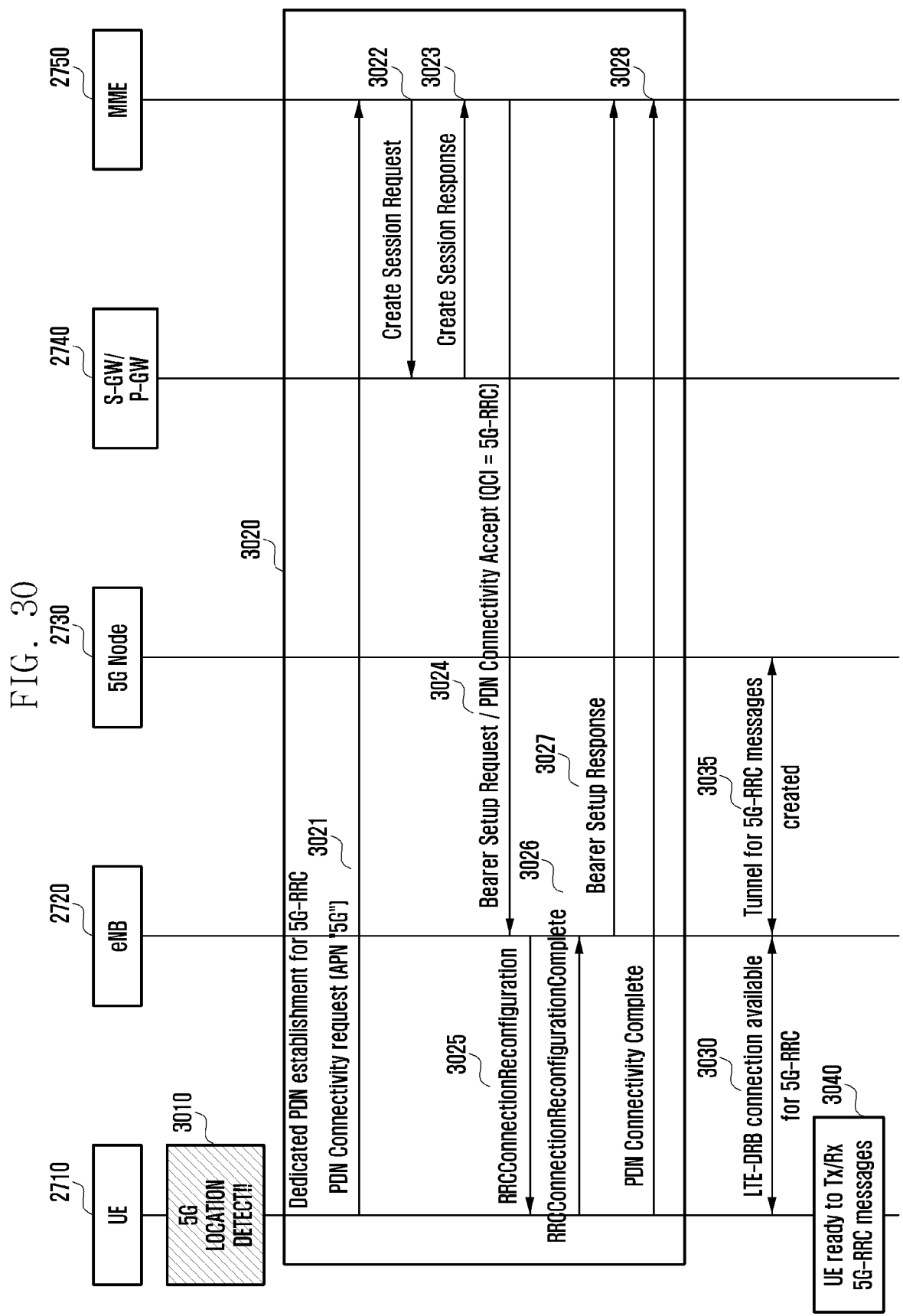
FIG. 30 is still another embodiment of an operation procedure of triggering a 5G RRC connection in a 4G and 5G coexistence system according to an embodiment of the disclosure.

FIG. 30 is still another embodiment of an operation procedure of triggering a 5G RRC connection in a 4G and 5G coexistence system according to an embodiment of the disclosure.

Referring to FIG. 30, the terminal 2710 may previously have stored location information (e.g., latitude, longitude, radius, etc.) of the 5G cell 2730. In step 3010, the terminal 2710 may identify its own location information via a GPS or the like, and may determine whether the terminal 2710 is located at a position corresponding to an area of the 5G cell 2730.

When the terminal 2710 determines that the terminal 2710 itself exists at the position of the 5G cell 2730, the terminal 2710 may initiate a procedure of accessing the 5G cell 2730 (e.g., a PDN connection procedure for 5G RRC signaling), in step 3020. Steps 3021 to 3028 are similar to steps 2771 to 2778 in the embodiments described with reference to FIG. 28, and detailed descriptions thereof will be thus omitted.

Thereafter, in steps 3030 and 3035, a tunnel (channel) for transmission/reception of 5G RRC signaling may be established between the terminal 2710, the LTE base station 2720, and the 5G base station 2730. In step 3040, the terminal 2710 may exchange a 5G RRC message of the terminal 2710 with the 5G base station 2730 via the tunnel (channel).

According to an embodiment, an embodiment of identifying the presence or absence of the 5G cell 2730 by using the GPS may be additionally performed after predicting the presence of the 5G cell 2730 in embodiments (2-3-1) and (2-3-2), and may be used for initiating the procedure of accessing the 5G cell 2730.

(2-3-4)

Figure 31:
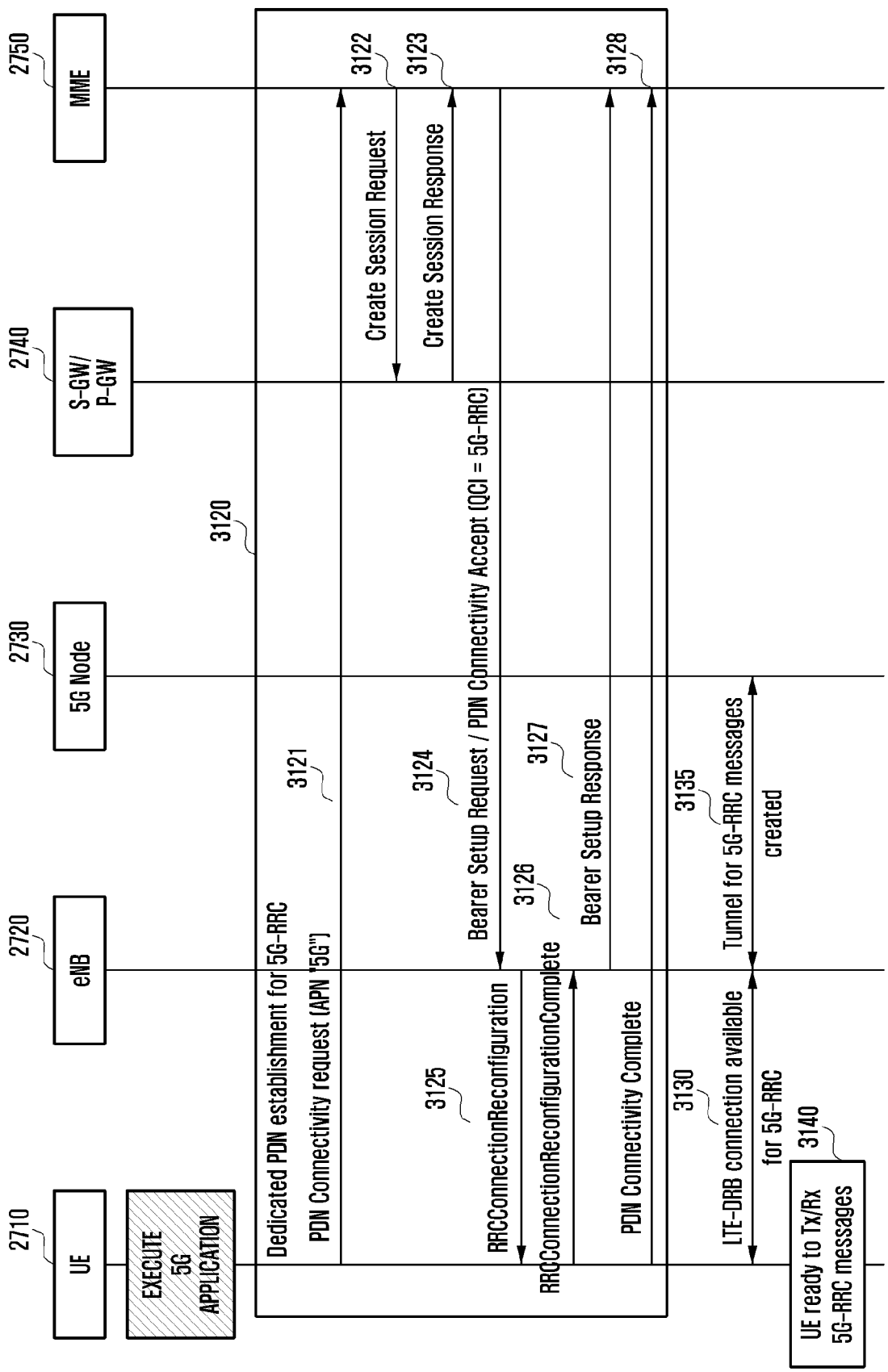
FIG. 31 is still another embodiment of an operation procedure of triggering a 5G RRC connection in a 4G and 5G coexistence system according to an embodiment of the disclosure.

FIG. 31 is still another embodiment of an operation procedure of triggering a 5G RRC connection in a 4G and 5G coexistence system according to an embodiment of the disclosure.

Referring to 31, in step 3110, the terminal 2710 may sense execution of an 5G application. When the 5G application is executed, the terminal 2710 may initiate, in step 3120, a procedure (e.g., a PDN connection procedure for 5G RRC signaling) of accessing the 5G cell 2730. Steps 3121 to 3128 are similar to steps 2771 to 2778 in the embodiments described with reference to FIG. 28, and detailed descriptions thereof will be thus omitted.

Thereafter, in steps 3130 and 3135, a tunnel (channel) for transmission/reception of 5G RRC signaling may be established between the terminal 2710, the LTE base station 2720, and the 5G base station 2730. In step 3140, the terminal 2710 may exchange a 5G RRC message of the terminal 2710 with the 5G base station 2730 via the tunnel (channel).

It is obvious that this embodiment may be applied to identifying the presence or absence of the coexisting 5G cell 2730 by the terminal 2710 on the basis of information provided by the LTE cell 2720, or may be applied after identifying the presence or absence of the 5G cell 2730 on the basis of the GPS. That is, although the presence or absence of the 5G cell 2730 coexisting with the LTE base station 2720 has been determined, if transmission/reception of 5G application data via the 5G cell 2730 is not necessary, the terminal 2710 may not perform the procedure of accessing the 5G cell 2730. When it is determined that the transmission/reception of the 5G application data via the 5G cell 2730 is necessary, the terminal 2710 may perform the procedure of accessing the 5G cell 2730.

(2-3-5)

Figure 32:
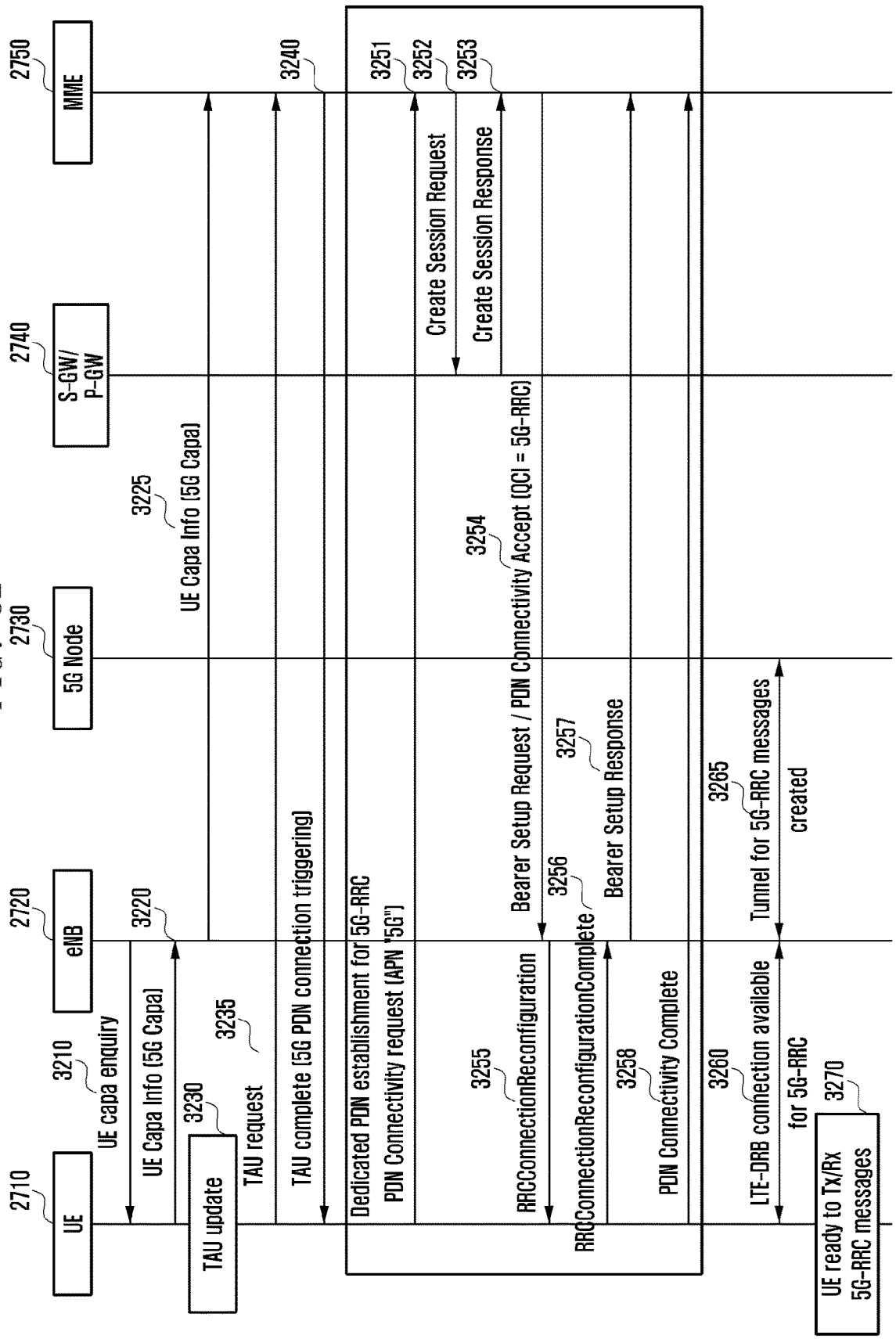
FIG. 32 is still another embodiment of an operation procedure of triggering a 5G RRC connection in a 4G and 5G coexistence system according to an embodiment of the disclosure.

FIG. 32 is still another embodiment of an operation procedure of triggering a 5G RRC connection in a 4G and 5G coexistence system according to an embodiment of the disclosure.

Referring to FIG. 32, in step 3220, the terminal 2710 may transfer, to the LTE base station 2720, the presence of 5G capability when accessing the LTE base station 2720. According to an embodiment, when the LTE base station 2720 requests the terminal 2710 to transmit terminal capability information (e.g., via a UE capability inquiry message) in step 3210, the terminal 2710 may transmit the terminal capability information to the LTE base station 2720 in step 3220.

The 5G capability information of the terminal 2710 may be transmitted, in step 3225, to an entity (e.g., the MME 2750, NG-Core, etc.) that manages capability information of the terminal 2710.

In steps 3230 to 3240, when the terminal 2710 accesses the LTE base station 2720 coexisting with the 5G cell 2730 (including access by handover, access by RLF, access by switching from an idle mode to a connected mode, access by a position registration procedure, etc.), the entity (e.g., the MME 2750) managing the capability information of the terminal 2710 may transmit, to the terminal 2710, signaling (e.g., NAS signaling) between the entity 2750 and the terminal 2710, and may indicate the terminal 2710 to perform the procedure of accessing the 5G cell 2730 (e.g., the PDN connection procedure for 5G RRC signaling). For example, when the terminal 2710 determines in step 3230 that tracking area update (TAU) is necessary, the terminal 2710 may transmit a TAU request message to the MME 2750 in step 3235. In step 3240, the MME 2750 may transmit a TAU complete message to the terminal 2710. Here, information for triggering of the 5G PDN connection may be included in the TAU complete message so as to be transmitted to the terminal 2710.

In step 3250, the terminal 2710 may initiate the procedure of accessing the 5G cell 2730 (e.g., a PDN connection procedure for 5G RRC signaling). Steps 3251 to 3258 are similar to steps 2771 to 2778 in the embodiments described with reference to FIG. 28, and detailed descriptions thereof will be thus omitted.

Thereafter, in steps 3260 and 3265, a tunnel (channel) for transmission/reception of 5G RRC signaling may be established between the terminal 2710, the LTE base station 2720, and the 5G base station 2730. In step 3270, the terminal 2710 may exchange a 5G RRC message of the terminal 2710 with the 5G base station 2730 via the tunnel (channel).

(2-3-6)

Figure 33:
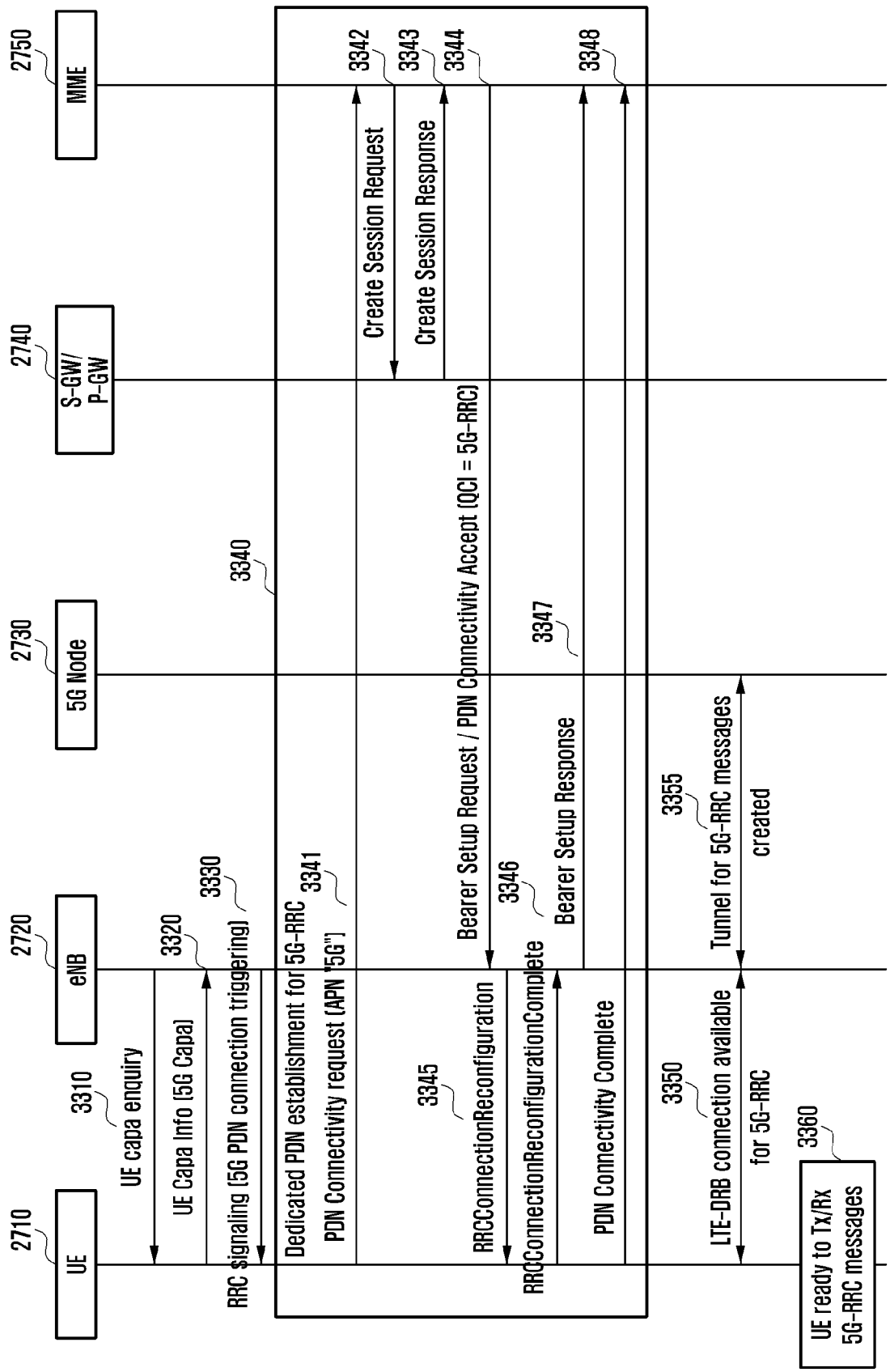
FIG. 33 is still another embodiment of an operation procedure of triggering a 5G RRC connection in a 4G and 5G coexistence system according to an embodiment of the disclosure.

FIG. 33 is still another embodiment of an operation procedure of triggering a 5G RRC connection in a 4G and 5G coexistence system according to an embodiment of the disclosure.

Referring to FIG. 33, the terminal 2710 may transfer, in step 3320, 5G capability to the LTE base station 2720 when the terminal 2710 accesses the LTE base station 2720. According to an embodiment, when the LTE base station 2720 requests the terminal 2710 to transmit terminal capability information (e.g., via a UE capability inquiry message) in step 3310, the terminal 2710 may transmit the terminal capability information to the LTE base station 2720 in step 3320.

When it is determined that terminal 2710 supports 5G capability, the LTE cell 2720 coexisting with the 5G cell 2730 may indicate, in step 3330, the terminal 2710 to perform the procedure of accessing the 5G cell 2730 (e.g., a PDN connection procedure for 5G RRC signaling). For indication of performing the procedure of accessing the 5G cell 2730, a 5G RRC message between the terminal 2710 and the LTE cell 2720 may be transmitted. It may be defined that the RRC message is for triggering of a 5G PDN connection.

In step 3340, the terminal 2710 may initiate the procedure of accessing the 5G cell 2730 (e.g., a PDN connection procedure for 5G RRC signaling). Steps 3341 to 3348 are similar to steps 2771 to 2778 in the embodiments described with reference to FIG. 28, and detailed descriptions thereof will be thus omitted.

Thereafter, in steps 3350 and 3355, a tunnel (channel) for transmission/reception of 5G RRC signaling may be established between the terminal 2710, the LTE base station 2720, and the 5G base station 2730. In step 3360, the terminal 2710 may exchange a 5G RRC message of the terminal 2710 with the 5G base station 2730 via the tunnel (channel).

(2-4) Still Another Embodiment of Processing 5G RRC Signaling in the LTE and 5G Coexistence System According to an embodiment, the information for triggering of the procedure of accessing the 5G cell 2730 in embodiment (2-3) described above may be used as a condition for transmitting or receiving 5G RRC signaling via direction connection to the 5G cell 2730, instead of transmitting or receiving the 5G RRC signaling via the LTE base station 2720.

According to an embodiment, when at least one of the conditions for triggering the procedure of accessing the 5G cell 2730 in accordance with embodiment (2-3) is satisfied, the terminal 2710 may initiate the procedure of accessing the 5G cell 2730 coexisting with the LTE base station 2720. According to an embodiment, the procedure of accessing the 5G cell 2730 may be processed by directly transmitting 5G RRC signaling to or receiving 5G RRC signaling from the 5G cell 2730.

According to an embodiment, while the procedure of accessing the 5G cell 2730 is being performed, the terminal 2710 may notify the 5G cell 2730 of UE capability information (e.g., supporting multi-connectivity with the LTE base station 2720). The 5G cell 2730 having recognized that the terminal 2710 supports multi-connectivity with the LTE base station 2720 may perform a procedure of allowing the terminal 2710 to perform a multi-connectivity operation with the 5G cell 2730 and the LTE base station 2720. The procedure of allowing the terminal 2710 to perform a multi-connectivity operation may include, for example, an operation of transmitting UE capability information of the terminal 2710 to the LTE cell 2720.

The terminal 2710 may acquire, from the LTE base station 2720, configuration information of the 5G cell 2730 coexisting with the LTE base station 2720. The configuration information of the 5G cell 2730 may include, for example, information on whether it is possible the 5G cell 2730 to operate as a standalone cell or to operate as a parasitic cell in another cell. When at least one of the conditions for triggering the procedure of accessing the 5G cell 2730 according to embodiment (2-3) is satisfied, the terminal 2710 may initiate performing a procedure of accessing the 5G cell 2730 capable of operating as a standalone cell. When at least one of the conditions for triggering the procedure of accessing the 5G cell 2730 according to embodiment (2-3) is satisfied, the terminal 2710 may transmit, to the LTE cell 2720, a measurement result (e.g., a measurement report) of the 5G cell 2730 capable of operating as a parasitic cell in another cell, and may initiate data transmission/reception via the 5G cell 2730 and the LTE base station 2720 according to indication of the LTE base station 2720.

It is obvious that the LTE base station described as an example in the disclosure may be replaced with a 5G base station operating in a low frequency band, for example, 6 GHz or lower, 3.5 GHz, 2 GHz, 700 MHz band or the like.

Embodiment 3

Figure 34:
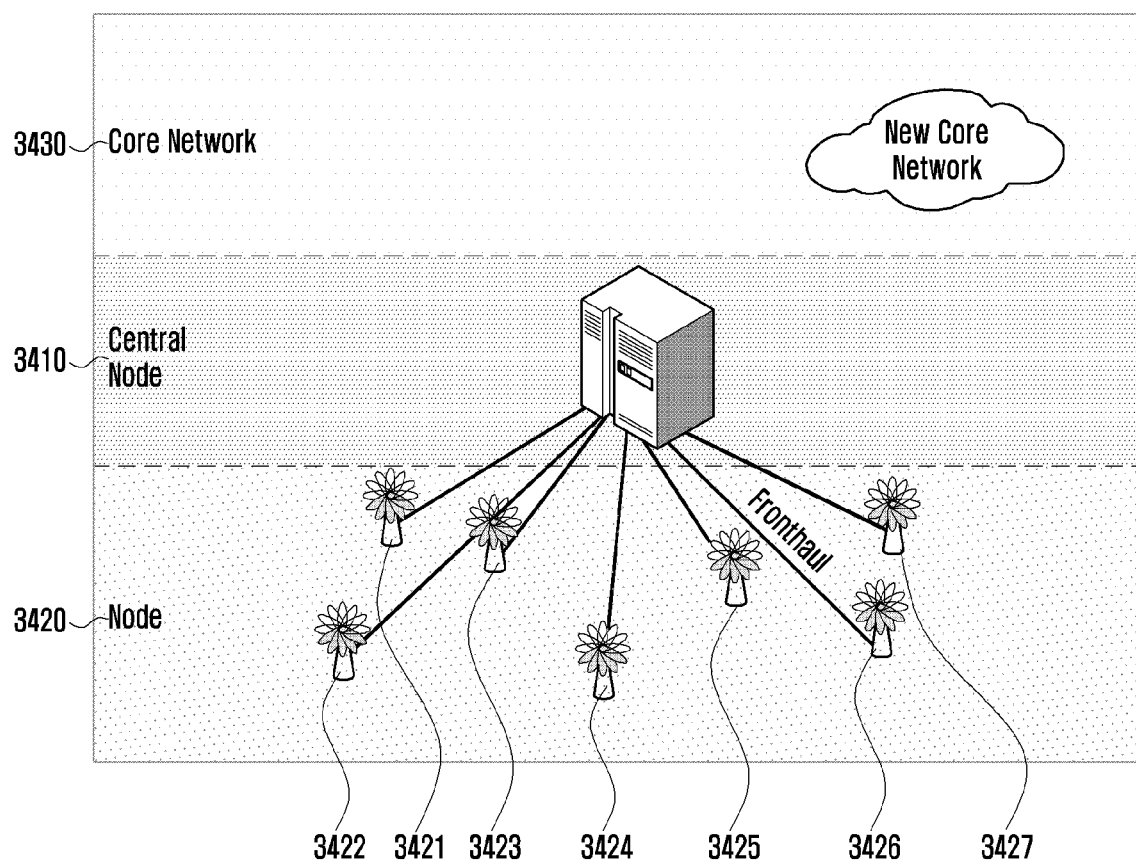
FIG. 34 is an example of a base station dispersion structure according to an embodiment of the disclosure.

FIG. 34 is an example of a base station dispersion structure according to an embodiment of the disclosure.

Referring to FIG. 34, functions corresponding to existing base stations managing radio links are divided and implemented into a central node 3410 and nodes (or normal nodes, distributed nodes, etc.) 3420. The central node 3410 is connected to a plurality of nodes (3420; 3421, 3422, 3423, 3424, 3425, 3426, and 3427), and may manage each node 3420. The central node 3410 may be connected to a core network 3430. The central node 3410 and the node 3420 may be connected wirelessly or by wire, and this may be referred to as fronthaul.

The central node 3410 may be referred to as a central unit (CU), a wireless controller, a data center, an anchor node, and the like. The central node 3410 has all or a part of a protocol stack, and has at least a part of a L2 higher layer protocol stack.

According to an embodiment, the node 3420 may be referred to as a distributed unit (DU), an access unit (AU), a transmission and reception point (TRP), an access point (AP), an evolved Node B (eNB), and the like. The node 3420 may have a part of L1/L2 protocol stack. The node 3420 may be a wireless communication base station operating in a high frequency band using millimeter wave, etc., and may support beamforming depending on an embodiment.

Figure 35:
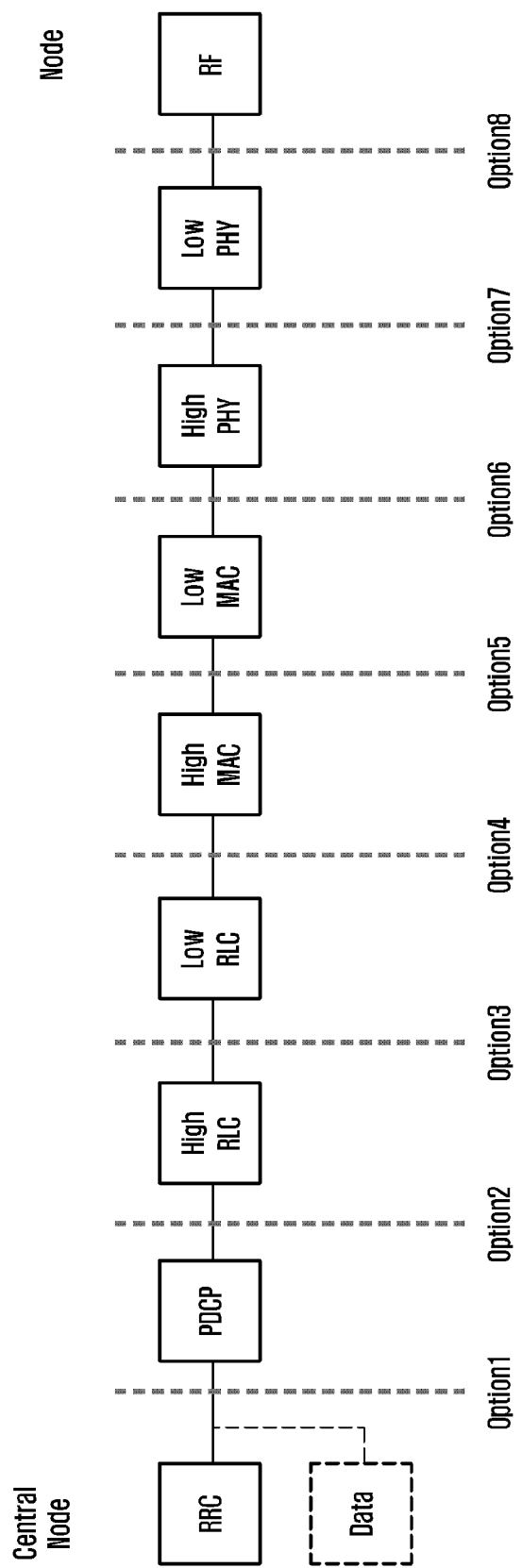
FIG. 35 is a specific example of an LTE protocol stack-based base station dispersion structure according to an embodiment of the disclosure.

FIG. 35 is a specific example of an LTE protocol stack-based base station dispersion structure according to an embodiment of the disclosure.

Referring to FIG. 35, described are cases where a splitting option enabling functions of the central node 3410 and the node 3420 to be divided on the basis of an LTE protocol stack. On the basis of the LTE protocol stack, one splitting option among options 1-8 may be applied, and this may be determined by standardization, system deployment, a fronthaul delay time, a service requirement, and the like. In the disclosure, various splitting options may be applied, and some functions may be omitted depending on an option to be performed.

Figure 36:
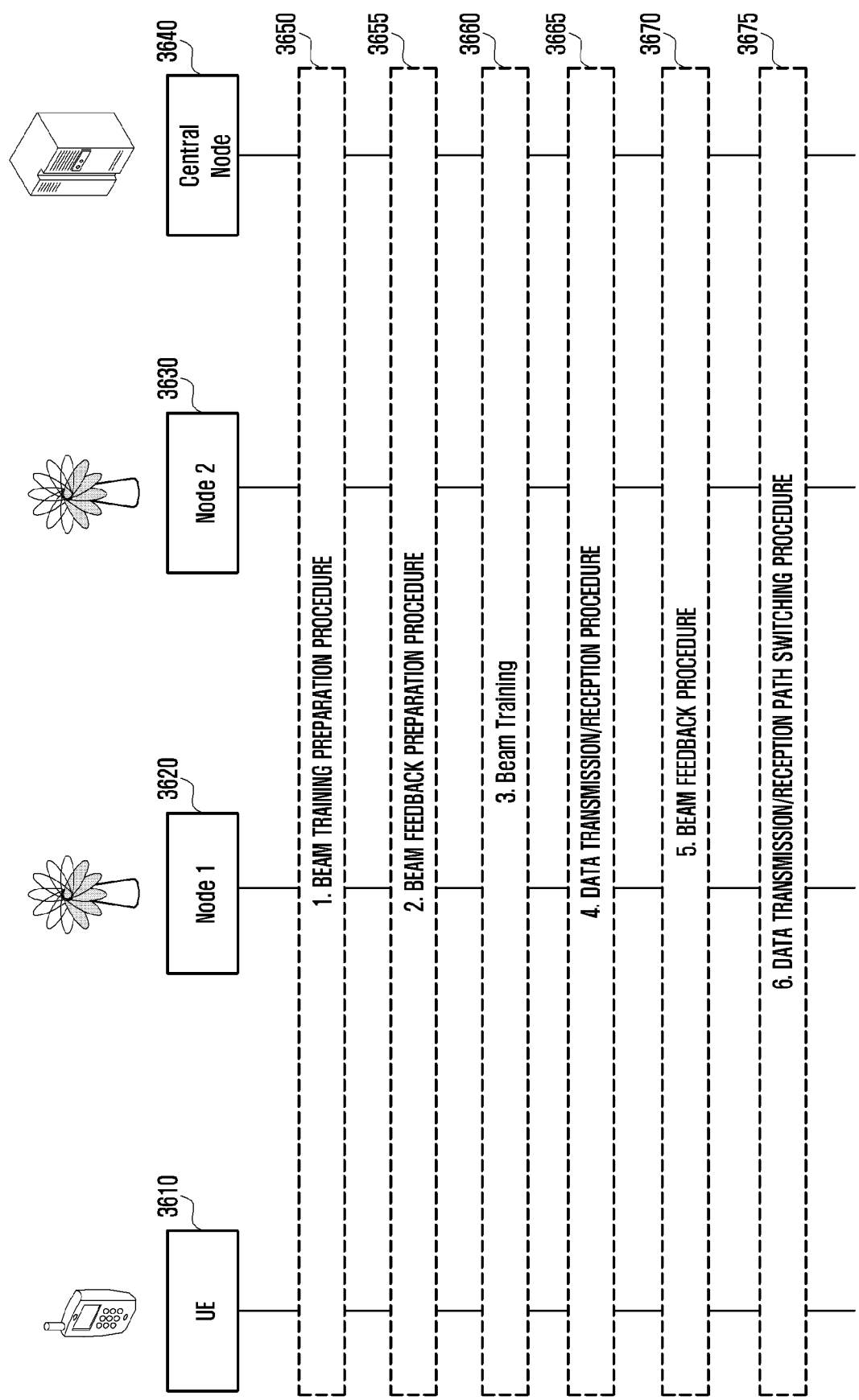
FIG. 36 is a schematic example of a beamforming and node change-related procedure in a communication system according to an embodiment of the disclosure.

FIG. 36 is a schematic example of a beamforming and node change-related procedure in a communication system according to an embodiment of the disclosure.

Referring to FIG. 36, in step 3650, a preparation procedure of beamforming between a terminal 3610 (a user equipment (UE), terminal, etc.), nodes 3620 and 3630, and a central node 3640 is performed. During this procedure, the central node 3640 and the nodes 3620 and 3630 may determine a beam training method so that a terminal 3610 may perform beam training.

In step 3655, a beam feedback preparation procedure of determining a method for feeding back a beam training result is necessary for the central node 3640 and the nodes 3620 and 3630 after performing beam training. For example, a beam feedback condition, a device to receive the beam feedback, and information included in the beam feedback are required to be determined. According to an embodiment, the beam training preparation procedure in step 3650 and the beam feedback preparation procedure in step 3655 may concurrently occur.

After determination of the beam training method and the beam feedback method, the terminal 3610 performs beam training in step 3660. In step 3665, the terminal 3610, the central node 3640, and the nodes 3620 and 3630 may perform data transmission/reception according to a beam used that is determined in beam training. Here, sharing of a terminal context, resources to be used by the terminal 3610, the nodes 3620 and 3630, and the central node 3640 are necessary. When a result of beam training causes beam feedback concurrently with data transmission/reception, beam feedback maybe performed in step 3670. Since the feedback may be used to determine the nodes 3620 and 3630 to perform communication, the feedback may be transmitted to the central node 3640 or a node that determines the nodes 3620 and 3630 to perform communication. Thereafter, in step 3675, the nodes 3620 and 3630 and the central node 3610 may switch a data transmission/reception path.

Depending on embodiments, some parts in each procedure may be omitted in advance, or the sequence of procedures irrelevant to the order of information may be changed.

Figure 37:
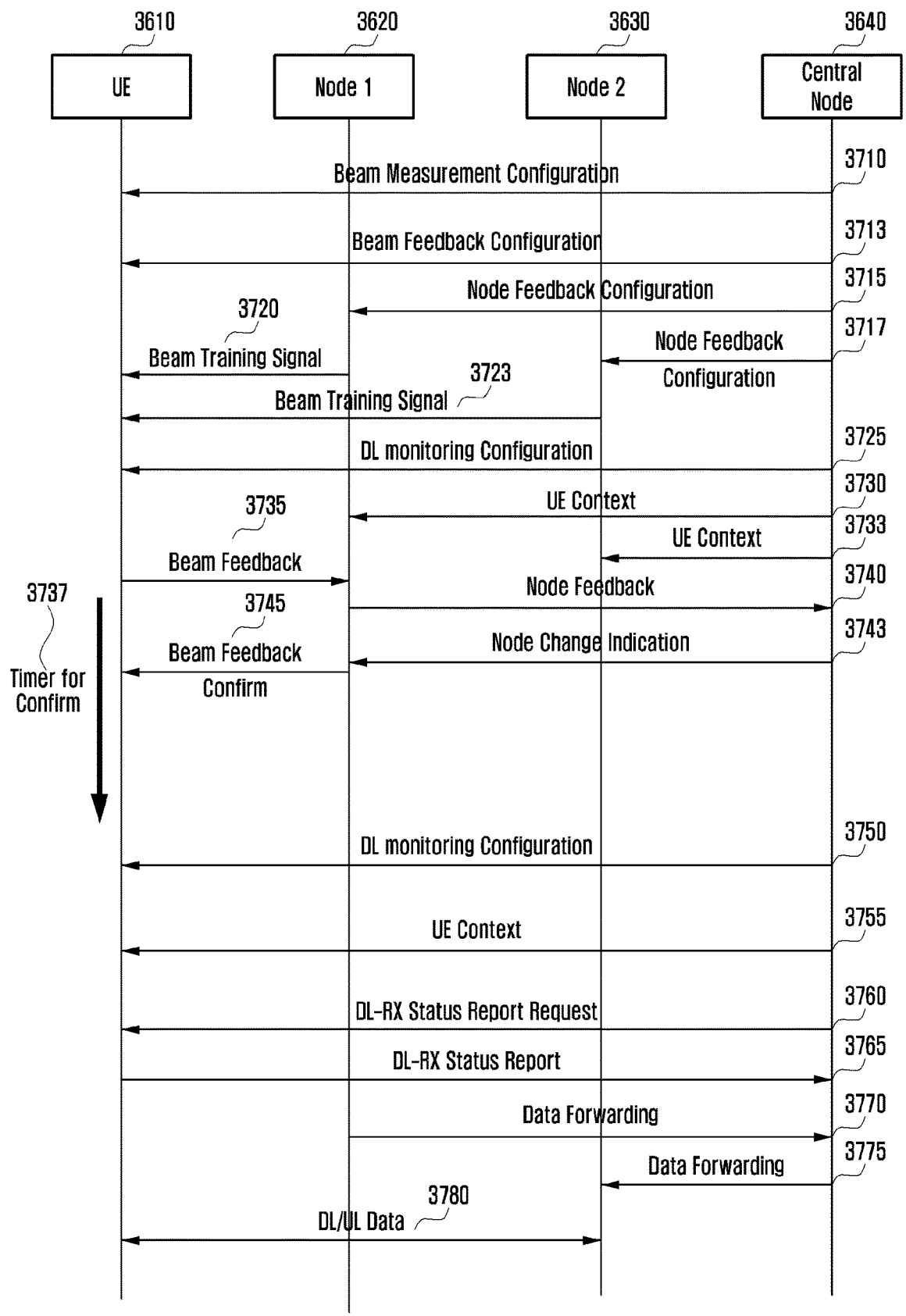
FIG. 37 is a specific example of a beamforming and node change-related procedure in a communication system according to an embodiment of the disclosure.

FIG. 37 is a specific example of a beamforming and node change-related procedure in a communication system according to an embodiment of the disclosure.

FIG. 37 is one embodiment that may be considered in the disclosure. The general flowchart of FIG. 36 and the various specific methods shown in FIG. 38 to FIG. 48 are examples of actual operation. Examples of specific operation procedures or modification will be described with reference to FIG. 48.

In an embodiment of FIG. 37, it is assumed that the terminal 3610 performs communication with node1 3620 at the beginning, and performs an operation for communicating with node2 3630 due to superiority of a beam of node2 3630 shown in the beam feedback.

In step 3710, the central node 3640 may transmit a message (e.g., a beam measurement configuration message) including beam measurement configuration information to the terminal 3610 so as to inform the terminal 3610 of a method of beam training. The terminal 3610 may accurately perform beam training by receiving the beam measurement configuration information at least once. Information that may be included in the message may be at least one among 1) whether the configuration information corresponds to one or more specific terminals or corresponds to all terminals, 2) whether a reference signal to be used in beam training is a uplink/downlink signal, 3) the number of beams to be used by the nodes 3620 and 3630, 4) an operation frequency, 5) a frequency/time resource used for the reference signal, 6) the number of reference signals which the nodes 3620 and 3630 concurrently transmit, 7) a code type used in the reference signal, 8) a terminal ID, and 9) a node ID of a node other than a serving node.

In step 3713, the central node 3640 may transmit a message including beam feedback configuration information to the terminal 3610 (e.g., a beam feedback configuration message). The message including the beam feedback configuration information may include information on how the terminal 3610 performs beam feedback. The information that may be included in the beam feedback configuration information may be at least one among 1) an uplink beam feedback resource (e.g., time/frequency information, a physical uplink control channel (PUCCH) resource, etc.) of a corresponding node 3620 or 3630, 2) a random access preamble ID used when random access is necessary, 3) code information to be used when beam feedback is performed, 4) uplink synchronization information (e.g., timing alignment, etc.) of the node 3620 or 3630 and the terminal 3610, 5) terminal ID information to be used by the terminal 3610 (e.g., a cell radio network temporary identifier (C-RNTI), an S-temporary mobile subscriber identity (S-TMSI), etc.), 6) the number of times of required reattempt by the terminal 3610 when a specific beam feedback method fails (e.g., the number of times of reattempt allowed before applying of random access to the same node or a different node, wherein it may be required to perform the random access when beam feedback fails after attempting the beam feedback using a PUCCH resource), 7) measurements used as measurement amounts when beam feedback is performed (e.g., a reference signal received power (RSRP), a reference signal received quality (RSRQ), a received signal strength indicator (RSSI), etc.), 8) information on whether to apply beam-specific filtering (e.g., L1 and L3 filtering, etc.) at the time of performing measurement, 9) a condition for occurrence of beam feedback (e.g., when it is determined that another beam, which is in the same base station but is not being used, is superior to a beam in use by a predetermined degree or greater, etc.), and 10) information required to be included in beam feedback (e.g., an RSRP, an RSRQ, an RSSI, a channel quality indicator (CQI), a precoding matrix indicator (PMI), rank indication (RI), etc.). According to an embodiment, the beam feedback configuration message may be transmitted as a message, such as the beam measurement configuration message. Alternatively, according to an embodiment, transmission of the bean feedback configuration message or the beam measurement configuration message may be omitted, and the content of the beam feedback configuration message or the beam measurement configuration message may be recognized by both base stations (3620, 3630, and 3640) and the terminal 3610 in advance.

Due to the distributed structure of the central node 3640 and the node 3620 or 3630, in steps 3715 and 3717, the central node 3640 may request the node 3620 or 3630 to transmit beam feedback information of the terminal 3610. The beam feedback information may be necessary for multiple reasons, such as the case of a change of a serving node, etc. A message including information indicating that the central node 3640 requests the node 3620 or 3630 to transmit the beam feedback information of the terminal 3610 may be referred to as a node feedback configuration message. The node feedback configuration message may include at least one among 1) information on whether to perform application to a corresponding specific terminal ID or any terminal, 2) a condition that the node 3620 or 3630 is required to transmit feedback to the central node 3640 (e.g., transmission of feedback at all times, transmission of feedback only when a specific condition is satisfied, etc.), 3) a value required to be included when the node 3620 or 3630 transmits feedback to the central node 3640 (e.g., optimal beam identification information (best beam ID) of the terminal 3610, the number of beams, which is equal to or greater than a threshold value of the terminal 3610, and the threshold value, an intensity of a signal received by a best beam (e.g., RSRP, RSSI, RSRQ, etc.), a signal quality (e.g., CQI, PMI, RI, etc.), an intensity of a signal received by a signal of an nth (n is a natural number) signal intensity, signal intensities of all beams, a signal intensity of a measurable beam, etc.), 4) information on whether beam feedback data is required to be processed by L1 and L3 filtering, etc., so as to be transmitted, or a part of raw data held by the node 3620 or 3630 is required to be transmitted, and 5) information on whether a condition is required to be satisfied for a specific time period and information on the specific time. On the basis of the information, the node 3620 or 3630 may notify the central node 3640 of a beam feedback situation of the terminal 3610. Providing notification of the beam feedback situation of the terminal 3610 to the central node 3640 by the node 3620 or 3630 may be referred to as node feedback. If the node 3620 or 3630 transmits the beam feedback configuration message to the terminal 3610, partial information of a message included in the beam feedback configuration message may be included in the node feedback configuration message.

On the basis of the information, in an embodiment, the terminal 3610 may receive a downlink beam training signal in steps 3720 and 3723. If a condition determined on the basis of the beam feedback configuration information is satisfied, the terminal 3610 may transmit beam feedback to node1 3620 in step 3735. In order for the terminal 3610 to receive data, the central node 3640 may transmit a downlink (DL) monitoring configuration message to the terminal 3610 in step 3640.

In addition, in steps 3730 and 3733, the central node 3640 may exchange user context information (or terminal context (UE context) information) with node1 3620, node2 3630, and the terminal 3610, so as to store the information. The user context information may include at least one among 1) security information (e.g., an AS security key, etc.), 2) terminal capability (e.g., beam information, Tx/Rx information, etc.), 3) QoS information, 4) terminal history information (UE history information) (e.g., tracking area information, etc.), and 5) user information. In addition, a message including the user context information may include information relating to a data flow, such as bearer information of the terminal 3610. For example, at least one among 6) radio bearer information (e.g., a DRB ID/SRB ID being transmitted to node1 3620 or node2 3630, etc.), 7) layer information (e.g., configuration information of PDCP/RLC/RRC/MAC/PHY etc.), 8) bearer related information used in a node being communicating with the terminal 3610, 9) a node ID that shares information on the corresponding terminal 3610, 10) information on a time length corresponding to validity of the corresponding information, and 11) information corresponding to 1) to 10) shared with another node. According to an embodiment, after being generated in the central node 3640, the message including the user context may be shared with the nodes 3620 and 3630. In some embodiments, the node 3620 or 3630 may generate the message and transmit the message to the terminal 3610 and the central node 3640 so as to share the message. When the UE context is transmitted, if one node performs beam feedback from one node to another node, data transmission, transmission resume request, a link restoration request, etc., the corresponding node may perform a corresponding function without additional request for the UE context. If it is not necessary to receive all or a part of the UE context, the terminal 3610 or the node 3620 or 3630 may request and receive the information from the central node 3640 when necessary.

When the terminal 3610 transmits a beam feedback message to node1 3620 in step 3735, the terminal 3610 may receive a beam feedback confirm message and may notice that the beam feedback has been successfully transmitted, in step 3745. According to an embodiment, after transmission of the beam feedback message, the terminal 3610 may operate a timer 3737 until the beam feedback confirm is received. When the beam feedback confirm message is not received until the timer 3737 expires, the terminal 3610 may consider that the beam feedback has not been successfully transmitted and may retransmit the beam feedback.

Further, when the terminal 3610 transmits the beam feedback message to node1 3620, the node1 3620 may transmit a node feedback message to the central node 3640 in step 3740. Information included in the node feedback message may be information specified in node feedback configuration information. When a node is changed after the node feedback, the central node 3640 may transmit a message including node change indication information to the pre-change node 3620, in step 3743. After the node change indication is transmitted to node1 3620, node1 3620 may transmit the beam feedback confirm to the terminal 3610.

When the node is changed, an ARQ operation may be additionally required to be performed. However, the terminal 3610 may not recognize the change of the node, and may recognize the change in the beam only. Accordingly, the central node 3640 may request the terminal 3610 to transmit a downlink status report message (e.g., via a DL-RX status report request message), in step 3760. According to an embodiment, the DL-RX status report request message may be included in another message so as to be transmitted to the terminal 3610. According to an embodiment, the central node 3640 may transmit the UE context to the terminal 3610 in step 3755. On the basis thereof, in step 3765, the terminal 3610 may transmit a downlink state report to the central node 3640 (e.g., via the DL-RX status report request message) so as to transmit messages necessary for ARQ.

Accordingly, in step 3770 and 3775, the terminal 3610 may forward data from currently communicating node1 3620 to node2 3630 that is to be newly communicating with. After completion of the signaling, the terminal 3610 may normally perform communication with node2 3630 in step 3780.

Figure 38:
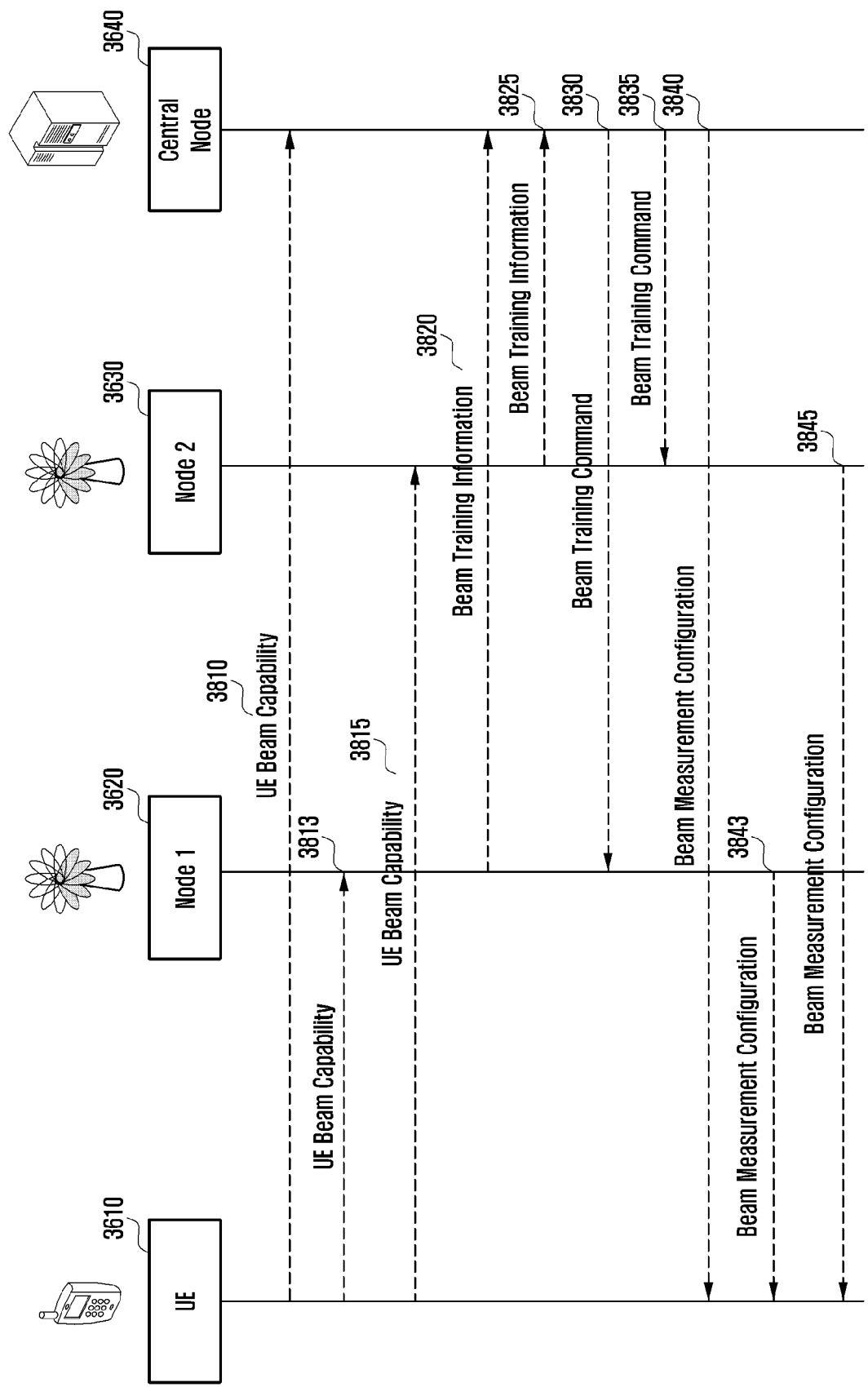
FIG. 38 is an example of a beam training preparation procedure in a communication system according to an embodiment of the disclosure.

FIG. 38 is an example of a beam training preparation procedure in a communication system according to an embodiment of the disclosure.

Referring to FIG. 38, as a detailed embodiment of a preparation procedure of beam training for the node 3620 or 3630, the central node 3640, and the terminal 3610, "a beam training preparation procedure" corresponding to step 3660 in FIG. 36 is illustrated.

When the terminal 3610 performs access in steps 3810, 3813, and 3815, information on beamforming-related capability of the terminal 3610 may be transmitted to at least one of the node 3620 or 3630 and/or the central node 3640. The information on the beamforming-related capability of the terminal 3610 may be transmitted, for example, via a UE beam capability message. The US beam capability message may include at least one among 1) the number of terminal beams, 2) beam gain of the terminal, 3) the number of beams which can be concurrently measured by the terminal, 4) the number of RF chains, 5) a transmission power of the terminal, and 6) whether the terminal has a beam feedback resource having already been allocated by another node. Here, for classification of the terminal 3610, a terminal ID, such as a C-RNTI, an international mobile subscriber identity (IMSI), a globally unique temporary identity (GUTI), and an S-TMSI, may be included in the UE beam capability message and transmitted. In some embodiments, the terminal 3610 may transmit the UE beam capability information to at least one node 3620 or 3630, and the node 3620 or 3630 may modify the received information or add the information in another message and may transmit the same to the central node 3640.

In steps 3820 and 3825, each node 3620 or 3630 may transmit a message including beam training-related information (beam training information) of the node 3620 or 3630 to the central node 3640. It may be possible to allow the central node 3640 to know the beam training capability of the node 3620 or 3630. The beam training information may include at least one among 1) the number of node beams, 2) the number of sectors, 3) a period required to transmit all beam training, 4) beam training frequency/time resource information, 5) the number of RF chains of a node, 6) transmission power of the node, 7) beam gain of the node, 8) the number of concurrently transmittable beam training signals, 9) the range of a beam ID in use, 10) a frequency, and 11) a bandwidth. According to an embodiment, the beam training information may be identified as the ID of node 3620 or 3630.

In some embodiments, the node 3620 or 3630 may transfer, to the central node 3640, information of an uplink/downlink beam training signal assignable to the specific terminal 3610. This may be applied to the case where a beam training signal is assigned to a specific terminal 3610 or assigned to a specific plurality of terminals 3610. 1) a beam training code (sequence) ID that is not in use, 2) the number of beam training codes (sequences) that are not in use, 3) a frequency/time resource position through which the beam training sequence is to be transmitted, 4) an index of the frequency/time resource position through which the beam training sequence is to be transmitted, 5) the number of terminals to which the current beam training signal is allocated, and the like may be included in a message so as to be transmitted to the central node 3640.

The central node 3640 or the node 3620 or 3630 may actually perform beam training on the basis of one or more among the UE beam capability information of the terminal 3610 and beam training information of the node. In an embodiment of FIG. 38, it is described that the central node 3640 determines beam training and indicates the same to the node 3620 or 3630. However, according to an embodiment, the node 3620 or 3630 may determine beam training. In this case, the central node 3640 is required to transfer a beam training method to the terminal 3610 and the node 3620 or 3630 actually performing beam training. In an embodiment of FIG. 38, the message for transferring of the beam training method to the node 3620 or 3630 by the central node 3640 is referred to as a beam training command message in steps 3830 and 3835, and the message for transferring of the beam training method to the terminal 3610 by the central node 3640 or the node 3620 or 3630 is referred to as a beam measurement configuration message in steps 3840, 3843, and 3845.

If the node 3620 or 3630 receives the beam training command message from the central node 3640 in steps 3830 and 3835, the node 3620 or 3630 may perform beam training in accordance with a content included in the message. Information may be included in the beam training command message may be one or more pieces of information among 1) whether corresponding to one or more specific terminals (transmission of a reference signal which is transmitted to a specific terminal via downlink by the node, or transmitted to the node via uplink by a specific terminal, etc.), or corresponding to all terminals (e.g., transmission of a broadcast reference signal, etc.), 2) information on whether a reference signal to be used in beam training is an uplink/downlink signal, 3) the number of beams to be used or beam indexes, 4) an operation frequency, 5) information on a frequency/time resource used for the reference signal, 6) the number of reference signals concurrently transmitted by the node 3620 or 3630, 7) a code type used for the reference signal, 8) a terminal ID, and 9) a node ID of another node other than a serving node. According to an embodiment, the message transmitted from the central node 3640 to the node 3620 or 3630 may be forwarded and transmitted from one node 3620 or 3630 to another node 3620 or 3630. According to an embodiment, a predetermined time may be consumed in application of actual beam training on the basis of the message, and at least one among a specific time or a frame number, to which the beam training information is applied, a subframe number, and an actual time may be accurately inserted in the beam training information, so that it may be notified that beam training information is newly applied after the exact predetermined time. On the basis of the beam training command, the node 3620 or 3630 may transmit a downlink beam training signal or may receive an uplink beam training signal specified in the beam training command.

The central node 3640 or the node 3620 or 3630 may transmit information on the beam training method to the terminal 3610 (beam measurement configuration). The terminal 3610 may accurately perform beam training by receiving the information once. Information that may be included in the message may be one or more pieces of information among 1) information on whether corresponding to one or more specific terminal, or corresponding to all terminals, 2) information on whether a reference signal to be used in beam training is an uplink/downlink signal, 3) the number of beams to be used by the node 3620 or 3630, 4) an operation frequency, 5) a frequency/time resource to be used for the reference signal, 6) the number of reference signals concurrently transmitted by the node 3620 or 3630, 7) a code type used for the reference signal, 8) a terminal ID, and 9) a node ID of another node other than a serving node. According to an embodiment, a predetermined time may be consumed in application of actual beam training on the basis of the message, and at least one among a specific time or a frame number, to which a beam measurement configuration is applied, a subframe number, and an actual time may be accurately inserted in the beam measurement configuration, so that it may be notified that the beam measurement configuration is newly applied after the exact predetermined time.

A radio signal transmitted between the node1 3620, node2 3630, and the terminal 3610 in FIG. 38 may be transmitted or received in a frequency band other than a frequency band for beam training and feedback. For example, the radio signal may be transmitted as an LTE message in an LTE frequency band.

Figure 39:
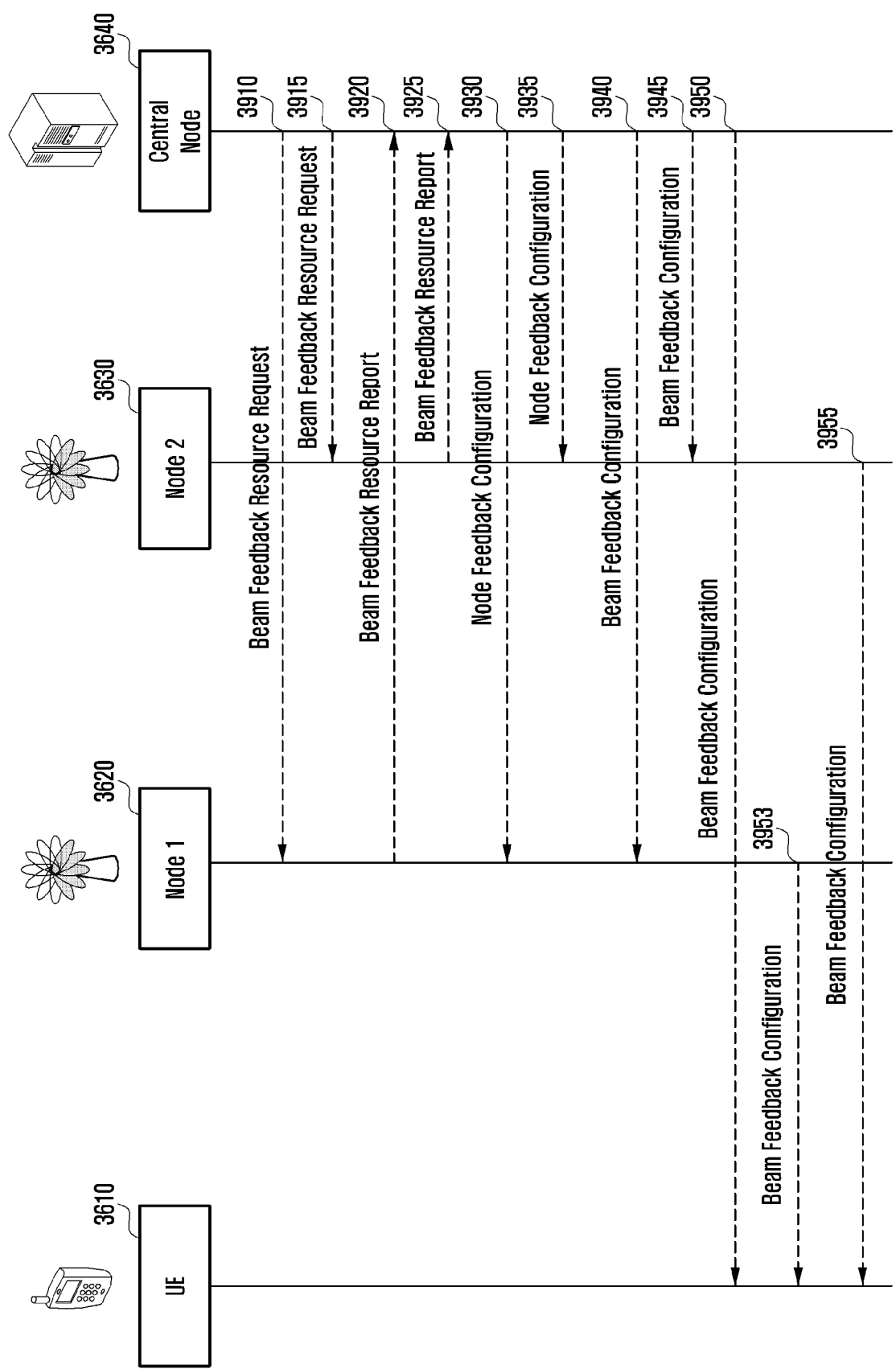
FIG. 39 is an example of a beam feedback and node feedback preparation procedure in a communication system according to an embodiment of the disclosure.

FIG. 39 is an example of a beam feedback and node feedback preparation procedure in a communication system according to an embodiment of the disclosure.

Referring to FIG. 39, described is a procedure of performing a beam feedback-related configuration when beam feedback is necessary in the terminal 3610 or the node 3620 or 3630.

If the central node 3640 is required to know which wireless resource is available for the terminal 3610 to perform beam feedback using a radio link, the central node 3640 may transmit a beam feedback resource request message to the node 3620 or 3630 so as to request information on a beam feedback resource of the node 3620 or 3630, in steps 3910 and 3915. The beam feedback resource request message may include at least one among 1) identification information (ID) of the terminal and 2) a content to be included in a beam feedback resource report. According to an embodiment, transmission of the beam feedback resource request message may be omitted.

When the node 3620 or 3630 is required to notify the central node 3640 of beam feedback resource information of a specific terminal 3610, the node 3620 or 3630 may transmit the beam feedback resource report message to the central node 3640 in steps 3920 and 3925. The beam feedback resource report message may include at least one among 1) identification information (ID) of the terminal, 2) resource information for beam feedback (e.g., PUCCH resource information), 3) a random access preamble ID to be used when beam feedback is performed, and 4) a beam ID of a terminal or a node, which is to be used when beam feedback is performed. In some embodiments, the beam feedback resource report message may include beam feedback resource information available in the corresponding node 3620 or 3630, instead of resource information for a specific terminal. Here, the beam feedback resource report message may include at least one among 1) available beam feedback resource information, 2) resource information (e.g., PUCCH resource information, a frequency, time, a PUCCH index, etc.) available for beam feedback, 3) a random access preamble ID to be used when beam feedback is performed, 4) beam feedback resource information that is currently in use, and 5) PUCCH resource information that is currently in use, and 6) a random access preamble ID that is currently in use.

The node 3620 or 3630 having received beam feedback from the terminal 3610 or having received the beam feedback of the terminal 3610 from another node 3620 or 3630 may be required, when necessary, to transmit all or a part of the received beam feedback information to the central node 3640. In the disclosure, this may be referred to as node feedback.

In steps 3930 and 3935, the central node 3640 may transmit a node feedback configuration message to the node 3620 or 3630. The node feedback configuration message is a message including information on a condition for transferring all of a part of a beam feedback result of the terminal 3610 to the central node 3640 by the node 3620 or 3630. The node feedback configuration message may include at least one piece of information among 1) information on whether to perform application to a corresponding specific terminal ID or any terminal, 2) a condition that the node 3620 or 3630 is required to transmit feedback to the central node 3640 (e.g., transmission of feedback at all times, transmission of feedback only when a specific condition is satisfied, etc.), 3) a value required to be included when the node 3620 or 3630 transmits feedback to the central node 3640 (e.g., a best beam ID of the terminal 3610, the number of beams, which is equal to or greater than a threshold value of the terminal 3610, and the threshold value, an intensity of a signal received by a best beam (e.g., RSRP, RSSI, RSRQ, etc.), a signal quality (e.g., CQI, PMI, RI, etc.), an intensity of a signal received by a signal of an nth (n is a natural number) signal intensity, signal intensities of all beams, a signal intensity of a measurable beam, etc.), 4) information on whether beam feedback data is required to be processed by L1 and L3 filtering, etc., so as to be transmitted, or a part of raw data held by the node 3620 or 3630 is required to be transmitted, and 5) information on whether a condition is required to be satisfied for a specific time period and information on the specific time. On the basis of the information, the node 3620 or 3630 may notify the central node 3640 of a beam feedback situation of the terminal 3610. If the node 3620 or 3630 transmits the beam feedback configuration message to the terminal 3610, partial information of a message included in the beam feedback configuration message may be included in the node feedback configuration message.

Specifically, the condition for transmitting node feedback to the central node 3640 by the node 3620 or 3630 may include at least one of the following examples. The examples may be 1) the case where there is another node beam that is superior to a beam having a highest quality (e.g., a beam having a highest beam RSRP, a beam having a highest multi-input multi-output (MIMO) rank, a beam having a highest predicted transmission rate, a beam having a best available modulation and coding scheme (MCS) index, etc.) among corresponding beams by a predetermined offset (or a threshold value), 2) the case where beam feedback is not received from the specific terminal 3610 for a predetermined time period, 3) the case where beam feedback is received from the specific terminal 3610 for the predetermined time period, 4) when the quality of the beam having the highest quality (e.g., a beam having a highest beam RSRP, a beam having a highest MIMO rank, a beam having a highest predicted transmission rate, a beam having a best available MCS index, etc.) among the corresponding node beams is lower than the quality of a specific threshold value, 5) the case where the number of terminals 3610 having a feedback value equal to or greater than a threshold value with respect to a corresponding beam of the node is equal to or greater than a predetermined number, and 6) when the number of beams having a feedback value equal to or greater than a threshold value (e.g., beam RSRP −85 dBm, etc.) of the specific terminal 3610 is equal to or greater than another threshold value (e.g., the number of beams is three, etc.). The threshold values in the above embodiment may be included in the node feedback configuration message.

According to an embodiment, when one or more conditions among 1) to 6) continue for a predetermined time or longer, the node 3620 or 3630 may transmit node feedback to the central node 3640. Here, the predetermined time may be included in the node feedback configuration message.

In at least one step among steps 3950, 3953, and 3955, at least one of the node 3620 or 3630 and the central node 3640 may transmit, to the terminal 3610, the beam feedback configuration message, i.e., a message including configuration information for a method of beam feedback by the terminal 3610.

According to an embodiment, the central node 3640 may generate the beam feedback configuration message, and may transmit the same to node1 3620 and/or node2 3630 in step 3940 and/or step 3945. Node1 3620 and/or node2 3630 may transmit, to the terminal 3610, the beam feedback configuration message received from the central node 3640, in step 3953 and/or step 3955. The beam feedback configuration message transmitted to the terminal 3610 by the node 3620 or 3630 may include information allowing the terminal 3610 to perform beam measurement using a downlink reference signal, and then take reservation of an uplink resource for beam feedback.

The information that may be included in the beam feedback configuration message may be at least one piece of information among 1) an uplink beam feedback resource (e.g., time/frequency information, information on a PUCCH resource, etc.) of a corresponding node 3620 or 3630, 2) a random access preamble ID to be used when random access is necessary, 3) code information to be used when beam feedback is performed, 4) uplink synchronization information (e.g., timing alignment, etc.) of the node 3620 or 3630 and the terminal 3610, 5) terminal ID information to be used by the terminal 3610 (e.g., a C-RNTI, an S-TMSI, etc.), 6) the number of times of reattempt required to be performed by the terminal 3610 when a specific beam feedback method fails (e.g., the number of times of reattempt allowed before applying of random access to the same node or a different node, wherein it may be required to perform the random access when beam feedback fails after attempting the beam feedback using a PUCCH resource), 7) measurements used as measurement amounts when beam feedback is performed (e.g., an RSRP, an RSRQ, an RSSI etc.), 8) information on whether to apply beam-specific filtering (e.g., L1 and L3 filtering, etc.) at the time of performing measurement, 9) a condition for occurrence of beam feedback (e.g., when it is determined that another beam, which is in the same base station but is not being used, is superior to a beam in use by a predetermined degree or greater, etc.), and 10) information required to be included in beam feedback (e.g., an RSRP, an RSRQ, an RSSI, a channel quality indicator (CQI), a precoding matrix indicator (PMI), rank indication (RI), etc.). This information may be information on a specific node and may be information applied to multiple nodes in the same way. If the information is for a specific node, a different content specific to each node may be included in one beam feedback configuration message. For example, node1 3620 transmits a beam feedback configuration message, but this message may separately include information for beam feedback to node1 3620 by the terminal 3610 and information for beam feedback to node2 3630 by the terminal 3610. According to an embodiment, the beam feedback configuration message may be generated by the central node 3640, and the beam feedback configuration message may be transmitted to the node 3620 or 3630 and then modified by the node 3620 or 3630 so as to be transmitted to the terminal 3610, or may be transmitted without modification. Alternatively, the beam feedback configuration message may be included in any message so as to be transmitted, instead of being transmitted as a separate message.

According to an embodiment, the nodes 3620 and 3630 may share an index of beams recognized by the terminal 3610. For example, sharing may be performed in the manner wherein node1 3620 corresponds to beam index 1-10, and node2 3630 corresponds to beam index 11-20. Here, the terminal 3610 may recognize node1 3620 and node2 3630 as one node operating as beam index 1-20. However, since node1 3620 and node2 3630 may be at physically different locations, it takes time to move from a beam of node1 3620 to a beam of node2 3630. For that reason, the terminal 3610 may need to divide and identify the beam index. The beam index may be grouped without division of the node so as to be operated. For example, beam index group 1 corresponds to 1-10, and beam index group 2 corresponds to 11-20. Operating as the beam index group may also be available within the node, in which grouping may be achieved for the purpose of various methods, such as space reuse or beam-specific traffic distribution. After the grouping is performed, a beam feedback condition may be configured for each group and beam feedback may be received for each group, for beam feedback.

Figure 40:
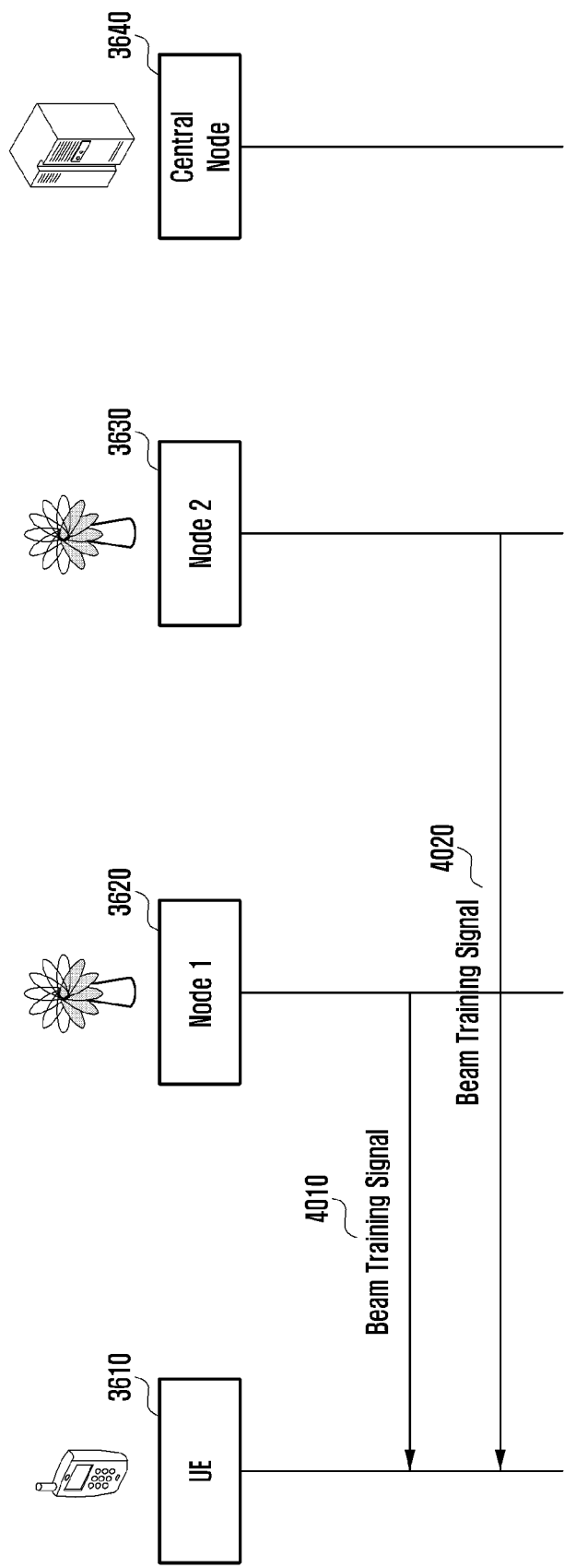
FIG. 40 is an example of transmission or reception of a downlink beam training signal in a communication system according to an embodiment of the disclosure.

FIG. 40 is an example of transmission or reception of a downlink beam training signal in a communication system according to an embodiment of the disclosure.

Referring to FIG. 40, transmission of a downlink beam training signal is illustrated. After "the beam training preparation procedure" which is step 3660 in FIG. 36, in other words, the procedure in FIG. 38, the terminal 3610 may perform beam training illustrated in FIG. 40. For example, in steps 4010 and 4020, the terminal 3610 may receive a downlink beam training signal from the node1 3620 and node2 3630 and may perform beam training.

Figure 41:
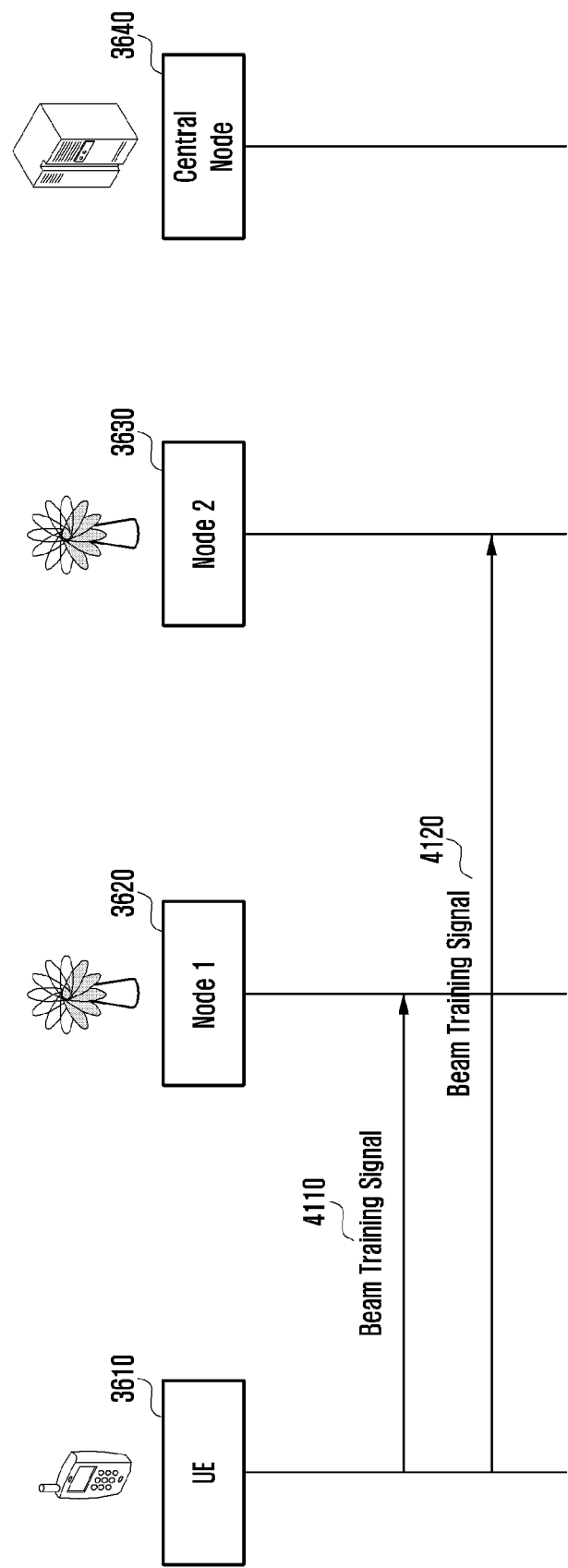
FIG. 41 is an example of transmission or reception of an uplink beam training signal in a communication system according to an embodiment of the disclosure.

FIG. 41 is an example of transmission or reception of an uplink beam training signal in a communication system according to an embodiment of the disclosure.

Referring to FIG. 41, transmission of an uplink beam training signal is illustrated. After "the beam training preparation procedure" which is step 3660 in FIG. 36, in other words, the procedure in FIG. 38, a beam training signal may be transmitted to node1 3620 and node2 3630 in steps 4110 and 4120, as illustrated in FIG. 41. The nodes 3620 and 3630 may perform beam training.

Figure 42:
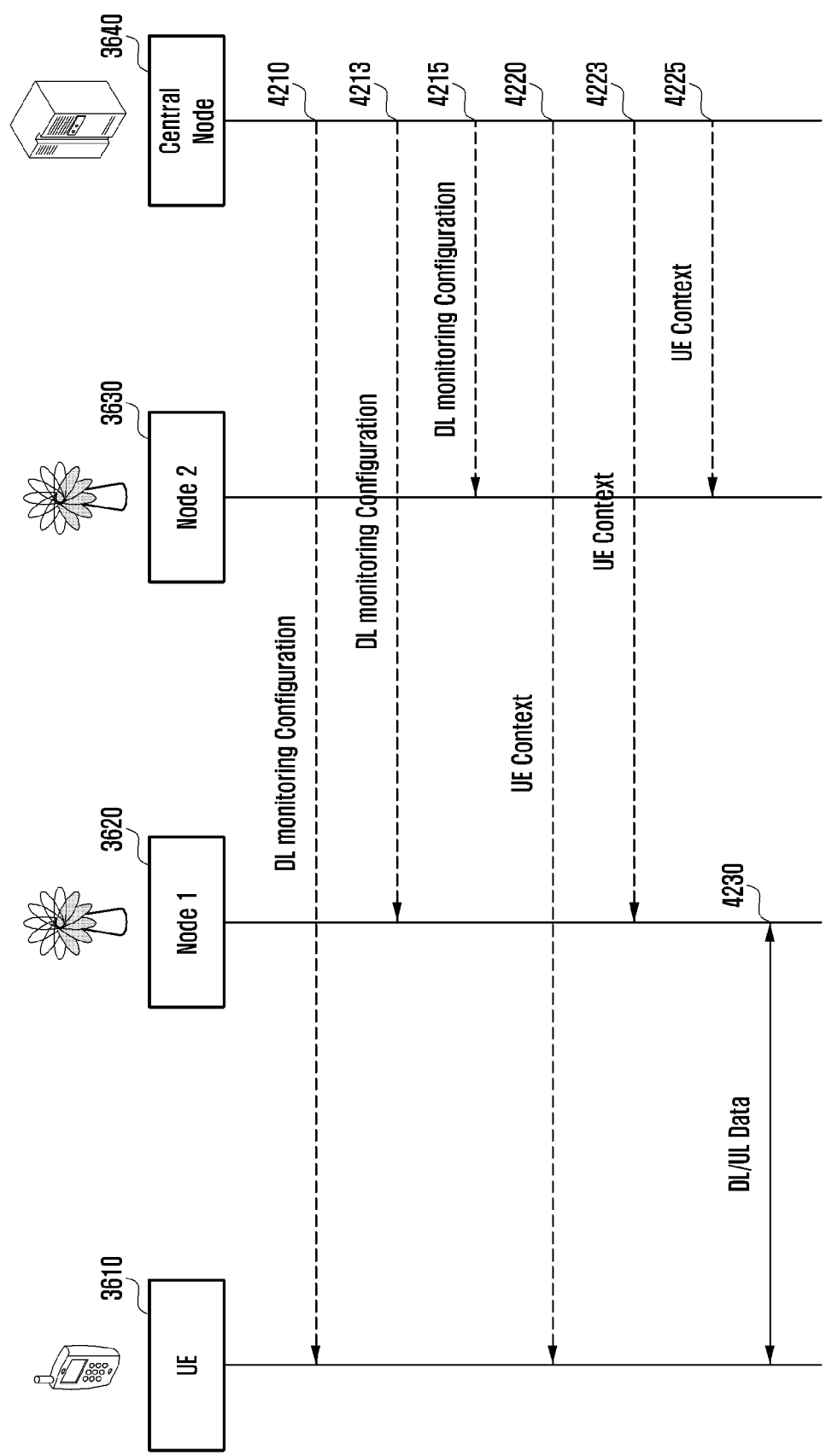
FIG. 42 is an example of a preparation procedure for data transmission/reception in a communication system according to an embodiment of the disclosure.

FIG. 42 is an example of a preparation procedure for data transmission/reception in a communication system according to an embodiment of the disclosure.

Referring to FIG. 42, a procedure of performing data transmission/reception between the node 3620 and the terminal 3610 is illustrated. This procedure typically occurs after a beamforming related configuration is completed. However, according to an embodiment, in the case of an embodiment that is not affected by the beamforming procedure illustrated in FIG. 38 to FIG. 41, the procedure may occur independently of a beamforming procedure.

For data transmission/reception, in step 4210, the central node 3640 is required to transmit a message (e.g., a DL monitoring configuration message) including downlink (DL) monitoring configuration information to the terminal 3610. The downlink monitoring configuration information may include 1) a location required to be monitored (e.g., a frequency, a bandwidth, a resource location, etc.), 2) a monitoring period, and 3) UE-specific information (e.g., a C-RNTI for decoding downlink control information, etc., wherein in the case of the C-RNTI, nodes 3620 and 3630 may have different C-RNTIs, and a C-RNTI may be allocated by the central node 3640 or may be a common C-RNTI created via cooperation between the nodes 3620 and 3630.). When the terminal 3610 receives downlink monitoring configuration information included in the message, resource allocation for uplink/downlink communication may be monitored.

According to an embodiment, the DL monitoring configuration information may be generated by the central node 3640, and then transmitted to at least one node 3620 or 3630, in steps 4123 and 4215. According to an embodiment, the node 3620 or 3630 may generate the DL monitoring configuration information, and transmit the generated DL monitoring configuration information to the terminal 3610 and the central node 3640 so as to be shared.

Accordingly, in at least one step among steps 4220, 4223, and 4225, the central node 3640 may transmit user context information (or UE context information) to at least one among node1 3620, node2 3630, and the terminal 3610, and an entity having received the user context information may store the received information.

The user context information (UE context information) may include at least one among 1) security information (e.g., an AS security key, etc.), 2) terminal capability (e.g., beam information, Tx/Rx information, etc.), 3) QoS information, 4) UE history information (e.g., tracking area info, etc.), and 5) user information. In addition, a message including the user context information may include information relating to a data flow, such as bearer information of the terminal 3610. For example, at least one among 6) radio bearer information (e.g., a DRB ID/SRB ID being transmitted to node1 3620 or node2 3630, etc.), 7) layer information (e.g., configuration information of PDCP/RLC/RRC/MAC/PHY etc.), 8) bearer related information used in a node being communicating with the terminal 3610, 9) a node ID that shares information on the corresponding terminal 3610, 10) information on a time length corresponding to validity of the corresponding information, and 11) information corresponding to 1) to 10) shared with another node.

According to an embodiment, the UE context information is generated by the central node 3640, and then may be transmitted to at least one node 3620 or 3630 in at least one of steps 4223 and 4225. According to an embodiment, the node 3620 or 3630 may generate UE context information, and may transmit the generated UE context information to the terminal 3610 and the central node 3640 so as to be shared. When the UE context is transmitted, if one node transmits beam feedback, data, a transmission resume request, a link restoration request, etc. to another node, the corresponding node may perform a corresponding function without additional request for the UE context. If it is not necessary to receive all or a part of the UE context, the terminal 3610 or the node 3620 or 3630 may request and receive the information from the central node 3640 when necessary.

Thereafter, the terminal 3610 may transmit data to or receive data from, for example, node1 3620.

Figure 43:
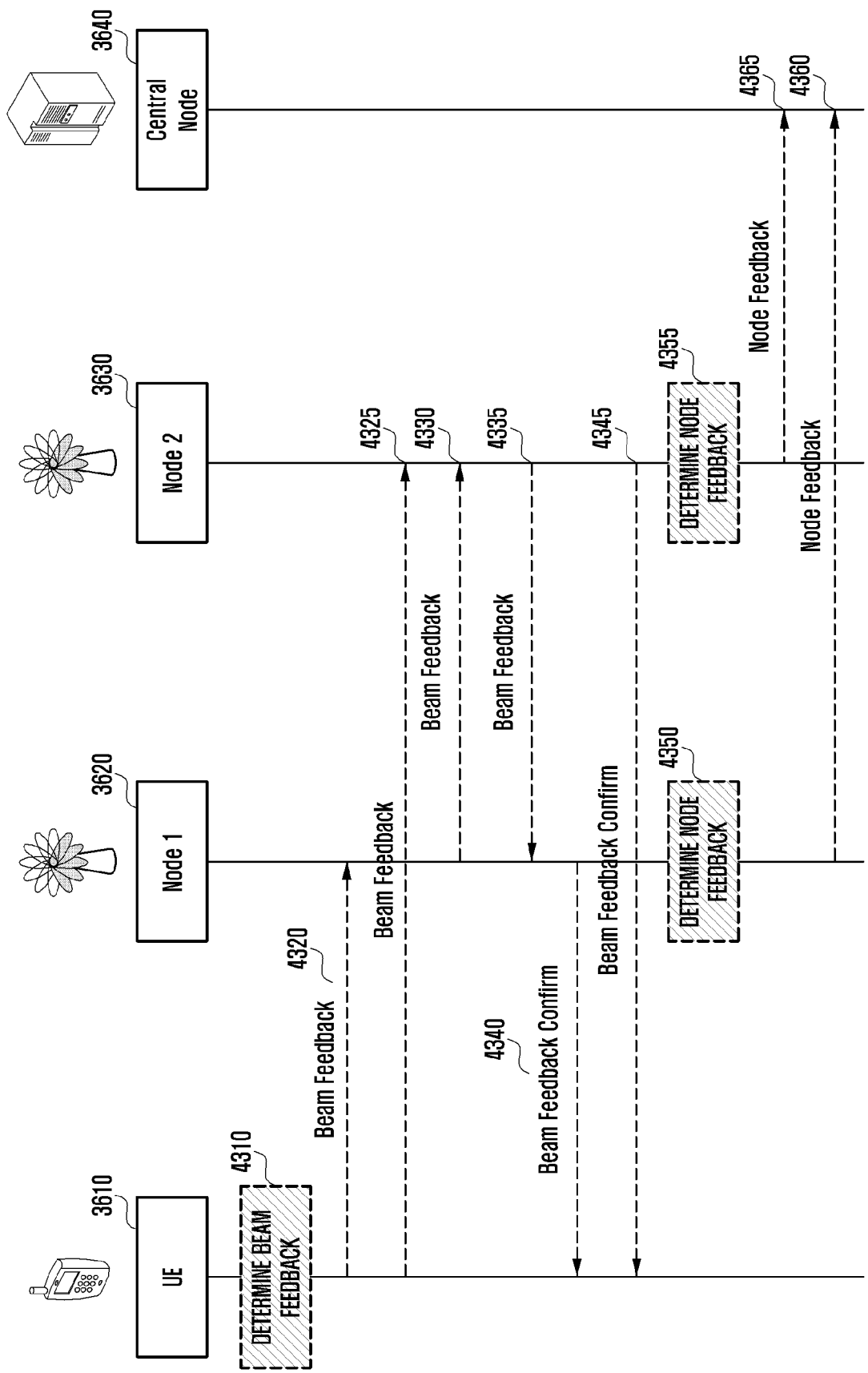
FIG. 43 is an example of beam feedback and node feedback in a communication system according to an embodiment of the disclosure.

FIG. 43 is an example of beam feedback and node feedback in a communication system according to an embodiment of the disclosure.

Referring to FIG. 43, a procedure of beam feedback by the terminal 3610 and a node feedback procedure of feeding back a beam training result of the terminal to the central node 3640 by the node 3620 or 3630 are illustrated.

If the node 3620 or 3630 transmits a downlink beam training signal to the terminal 3610, and a beam feedback condition is satisfied, the terminal 3610 may determine beam feedback in step 4310. Here, the terminal 3610 may transmit beam feedback to at least one node among multiple nodes 3620 and 3630 in step 4320 and/or step 4325. When it is assumed that the terminal 3610 transmits data to or receives data from node1 3620, the terminal 3610 may transmit beam feedback to node1 3620 according to an embodiment. However, when necessary, the terminal 3610 may transmit beam feedback to node2 3630. According to an embodiment, in step 4330 and/or step 4335, when necessary, the node 3620 or 3630 that receives beam feedback may transmit (transfer) the received beam feedback to another node.

On the basis of the beam feedback, the node 3620 or 3630 having received the beam feedback may transmit, to the terminal 3610, a beam feedback confirm message indicating that the beam feedback has been successfully received, in step 4340 and/or step 4335. Time required from beam feedback to beam feedback confirm may be set in advance. Alternatively, according to an embodiment, the time required from transmission of beam feedback to reception of beam feedback confirm may be flexible, so that the time required for waiting for the beam feedback confirm may be set in advance. When reception of a beam feedback confirm message within a preset time has failed, the terminal 3610 may determine that beam feedback has failed. According to an embodiment, when the terminal 3610 has failed to receive the beam feedback confirm within a predetermined time, the terminal 3610 may retransmit the beam feedback to the node 3620 or 3630. According to an embodiment, when beam feedback has failed discontinuously or continuously a specific number of times or more, the terminal 3610 may enter an initial access procedure or may enter a link restoration procedure. The specific number of times that beam feedback fails may be set in advance. Alternatively, when beam feedback has failed the specific number of times or more, the terminal 3610 may change a beam feedback method. For example, when the terminal 3610 transmits beam feedback by using a PUCCH channel and recognizes that the beam feedback has failed the previously set specific number of times, the terminal 3610 may perform beam report via random access or may perform beam feedback in the LTE network.

A beam feedback message may include at least one among 1) a terminal ID, 2) a condition for determining beam feedback transmission, 3) a best beam ID of the terminal 3610, the number of beams, which is equal to or greater than a threshold value of the terminal 3610, and the threshold value, an intensity of a signal received by a best beam (e.g., RSRP, RSSI, RSRQ, etc.), a signal quality (e.g., CQI, PMI, RI, etc.), an intensity of a signal received by a signal of an nth (n is a natural number) signal intensity, signal intensities of all beams, and a signal intensity of a measurable beam, etc.), 4) information on whether beam feedback data is raw data or a value obtained by processing with L1 and L3 filtering, etc.

For this beam feedback method, if there is the content configured on the basis of the beam feedback configuration information in FIG. 39, the terminal 3610 may conform to the content.

If a beam training method is based on the uplink beam training signal in FIG. 41, the beam feedback configuration may be changed to correspond to a result of beam measurement performed by the node 3620 or 3630. The method for beam measurement by the node 3620 or 3630 may correspond to the content included in the beam feedback configuration message transmitted to the node 3620 or 3630 by the central node 3640, as illustrated in FIG. 39.

The node 3620 or 3630 having received beam feedback from the terminal 3610 or having received beam feedback of the terminal 3610 from another node 3620 or 3630 may be required to transmit, when necessary, all or a part of beam feedback information to the central node 3640. In the disclosure, this may be referred to as node feedback. To this end, at least one of the nodes 3620 and 3630 may determine whether to perform node feedback, in step 4350 and/or step 4355. The node 3620 or 3630 may apply a node feedback condition according to the node feedback configuration information in FIG. 39, or when there is no node feedback configuration information or in an exceptional situation, the node 3620 or 3630 may determine the node feedback itself. In some embodiments, when the node 3620 or 3630 receives beam feedback, the node 3620 or 3630 may be required to transmit all or partial information of the beam feedback to the central node 3640 at all times. Regardless of whether beam training is to be based on uplink or downlink, determination of node feedback and the node feedback maybe performed when there is beam feedback or a beam measurement result.

In step 4360 and/or step 4365, the node 3620 or 3630 may transmit node feedback to the central node 3640. The node feedback message may include at least one piece of information among 1) a terminal ID, 2) a condition that the node 3620 or 3630 determines node feedback or a condition that the terminal 3610 determines beam feedback, 3) a best beam ID of the terminal 3610, the number of beams, which is equal to or greater than a threshold value of the terminal 3610, an intensity of a signal received by a best beam (e.g., RSRP, RSSI, RSRQ, etc.), a signal quality (e.g., CQI, PMI, RI, etc.), an intensity of a signal received by a signal of an nth (n is a natural number) signal intensity, signal intensities of all beams, and a signal intensity of a measurable beam, etc.), 4) information on whether node feedback data is raw data or a value obtained by processing with L1 and L3 filtering, etc., and 5) a time point at which beam feedback or node feedback has occurred.

If the beam feedback transmitted by the terminal 3610 is transmitted as node feedback to the central node 3640 from the node 3620 or 3630, and in the situation where the central node 3640 is required to transmit a confirm to the beam feedback, the central node 3640 may be required to transmit the beam feedback confirm to the terminal 3610. In this case, the time required for the terminal 3610 to wait for the beam feedback confirm, which is the time from transmission of beam feedback to reception of the beam feedback confirm, may be set. For the time above, a time (e.g., typically a little longer), which is different from the time required to transmit the beam feedback confirm within the node, may be set.

Figure 44:
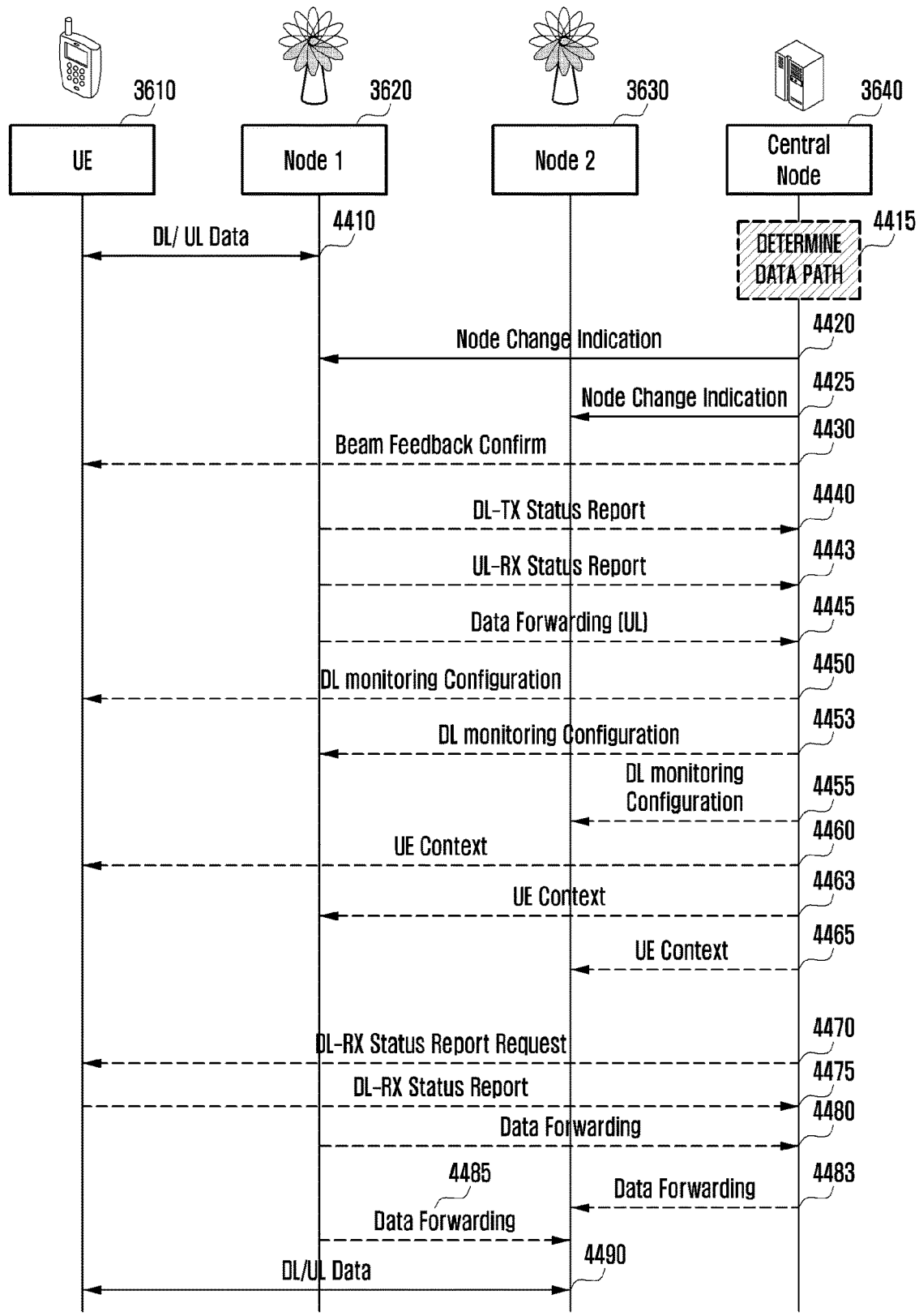
FIG. 44 is an example of a data transmission/reception path switching procedure in a communication system according to an embodiment of the disclosure.

FIG. 44 is an example of a data transmission/reception path switching procedure in a communication system according to an embodiment of the disclosure.

Referring to FIG. 44, a node change procedure of changing, by the central node 3640, a node that performs data transmission and beam training, and its associated procedures are illustrated.

At an initiation time point in FIG. 44, it is assumed that the terminal 3610 is performing data transmission/reception with node1 3620, in step 4410. In FIG. 44, it is assumed that a change is made so that node2 3630 performs data transmission/reception with the terminal 3610. However, it is not necessary for the terminal 3610 to perform data transmission/reception with only one node, and the same procedure may also be applied to the case where the terminal 3610 perform data transmission/reception concurrently with multiple nodes.

In step 4415, the central node 3640 may newly determine a data path according to beam feedback information, node feedback info, or the like. When the central node 3640 determines to change a data path, the central node 3640 may transmit, in steps 4420 and 4425, a message including node change information (node change indication) to node1 3620 having been previously performing data transmission/reception and node2 3630 newly required to perform data transmission/reception. This message may include one or more pieces of information among 1) a terminal ID, 2) a node ID to be changed, 3) TX or RX status report request information, and 4) data forwarding request information. If the terminal 3610 needs to confirm a beam to be used in node2 3630, the central node 3640 may transmit a beam feedback confirm message to the terminal 3610. The beam feedback confirm message may be transmitted via a node accessible by the terminal 3610.

Since it may be necessary to retransmit data and process remaining data due to the node change, node1 3620 may transmit, in step 4440, a TX buffer having been transmitted via downlink and a transmission statue (DL-TX statue) of the downlink data to the central node 3640. In the case of LTE, a value of an RLC sublayer variable, a value of SN having received ACK, or a value of SN having received NACK may be transmitted. In step 4443, node1 3620 may transmit a reception status of data having been received via uplink (UL-RX status) to the central node 3640. In the case of LTE, an RLC Status PDU may be an UL-RX Status Report. In the case of uplink data received from the terminal 3610 by node1 3620, node1 3620 may transmit a successfully received data uplink packet to the central node 3640 (UL data forwarding) in step 4445. When a node to participate in data transmission/reception is changed, UE context information and DL monitoring configuration information to be used may be transmitted to the terminal 3610 and the nodes 3620 and 3630 by the central node 3640 in steps 4450, 4453, 4455, 4460, 4463, and 4465, similar to the example in FIG. 42. The terminal 3610 and the nodes 3620 and 3630 may be configured according to the received DL monitoring configuration information and UE context information.

If the central node 3640 or the node 3620 requires a report of a data transmission/reception status of the terminal 3610 in downlink, the central node 3640 may request the terminal 3610 to report the status (e.g., a downlink reception status report request (DL-RX status report request) message), in step 4470. When the terminal 3610 receives a DL-RX status report request message or is scheduled to report the status, the terminal 3610 may transmit a DL-RX status report to the central node 3640 in step 4475 so as to provide information on downlink data having been received up to the current time and information on downlink data that has not been received. When necessary, in step 4485, node1 3620 may forward, to node2 3630, downlink data for which no ACK has been received up to the current time. According to an embodiment, the downlink data forwarding may be performed to node2 3630 via the central node 3640 in steps 4480 and 4483. If there is an interface between node1 3620 and node2 3630, direct transmission may be performed. Thereafter, in step 4490, node2 3630 may normally perform data transmission/reception with the terminal 3610.

FIG. 45 to FIG. 48 are examples of a beam feedback-related timer operation procedure in a communication system according to an embodiment of the disclosure.

Referring to FIG. 45 to FIG. 48, individual embodiments for operations of beam feedback, node feedback, and beam feedback confirm are illustrated, and variants of the description of FIG. 43 are shown according to the embodiment. In embodiments in FIG. 45 to FIG. 48, nodes to which the terminal 3610 transmits beam feedback are different, and procedures of receiving a beam feedback confirm message are different. Here, the time that the terminal 3610 waits, which is the time required to receive a beam feedback confirm message after the terminal 3610 transmits beam feedback, may be indicated by "timer for confirm". If the terminal 3610 fails to receive a beam feedback confirm message until the timer expires, the terminal 3610 may reattempt beam feedback. Alternatively, when beam feedback has failed discontinuously or continuously a specific number of times or more, the terminal 3610 may change a beam feedback method, may enter a link restoration procedure (e.g., an RLF), or may enter an initial access procedure.

Each embodiment will be described in detail.

Figure 45:
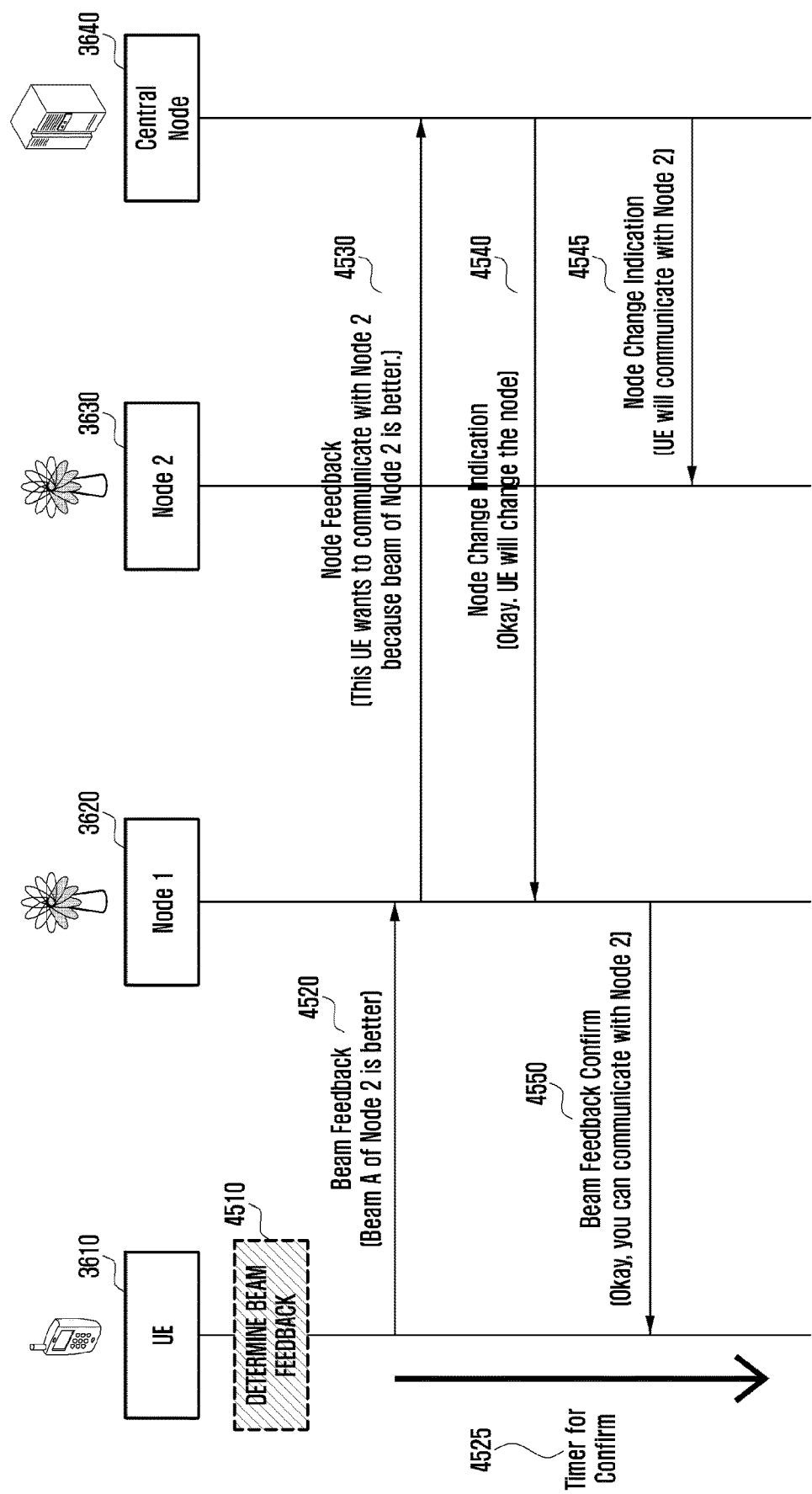
FIG. 45 to FIG. 48 are examples of a beam feedback-related timer operation procedure in a communication system according to an embodiment of the disclosure.

Referring to FIG. 45, the terminal 3610 may determine beam feedback in step 4510, and may transmit beam feedback to node1 3620 that is currently connected, in step 4520. For example, the beam feedback may include information indicating that beam A of node2 3630 is an optimal beam. The terminal 3610 may transmit the beam feedback, and then operate a timer 4525. Here, the timer 4525 may be referred to as "timer for confirm".

In this case, in step 4530, node1 3620 may transmit node feedback to the central node 3640. The node feedback may include information indicating that the terminal 3610 determines the beam of node2 3630 is a better beam so that the terminal 3610 requests to communicate with node2 3630.

In step 4540, the central node 3640 may transmit a node change indication message to node1 3620. The message may include information for approval of the terminal 3610 to communicate with node2 3630. In step 4545, the central node 3640 may also transmit the node change indication message to node2 3630 that the terminal 3610 desires to communicate with.

In step 4550, node1 3620 may transmit the beam feedback confirm message to the terminal 3610. The beam feedback confirm message may include information indicating that the terminal 3610 is approved to communicate with node2 3630. Here, when the terminal 3610 receives the beam feedback confirm message before the timer 4525 expires, the terminal 3610 may determine that beam feedback has been successful. On the other hand, when the terminal 3610 does not receive the beam feedback confirm message before the timer 4525 expires, the terminal 3610 may determine that beam feedback has failed, and may operate accordingly.

Figure 46:
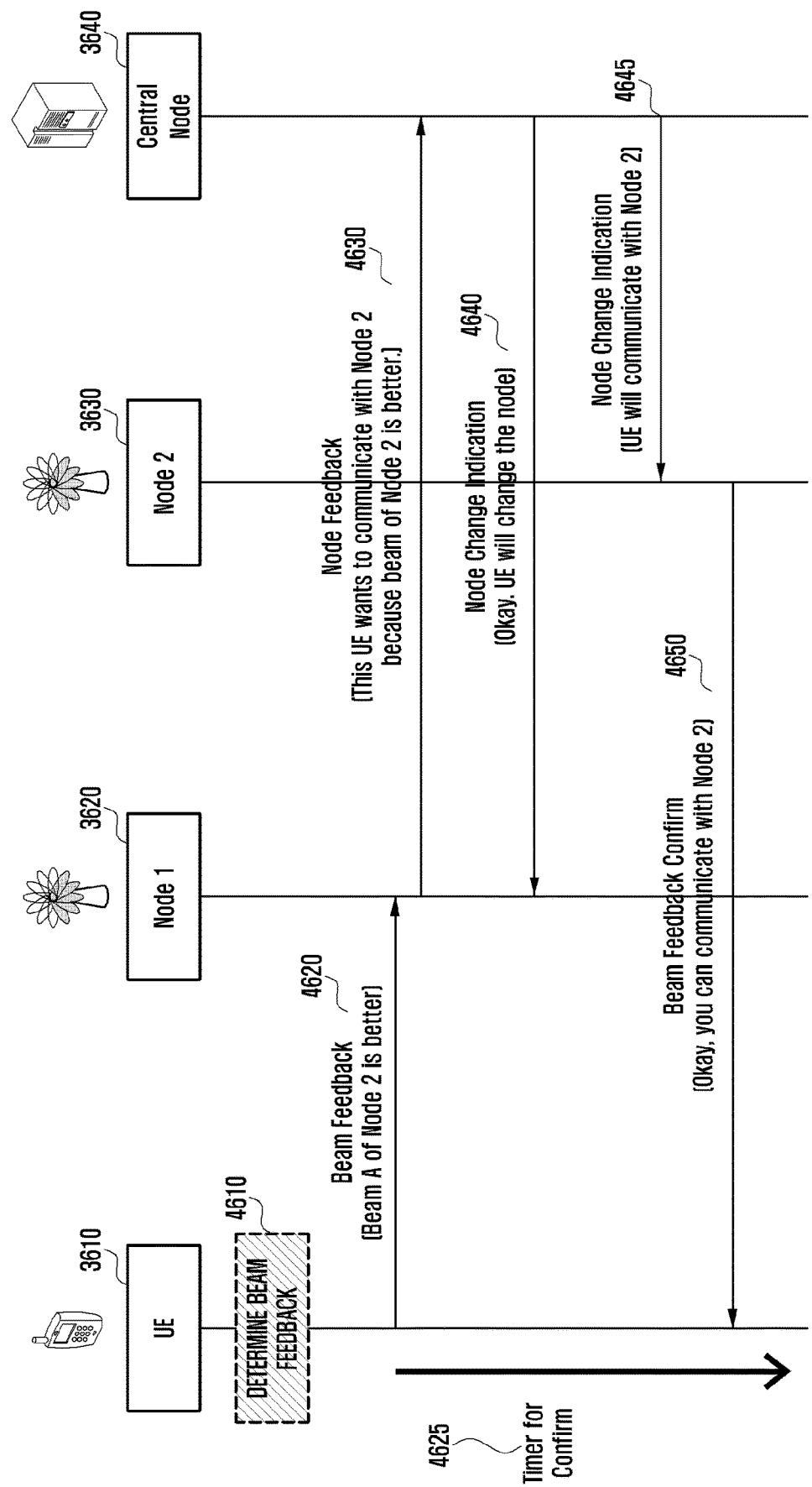

Referring to FIG. 46, the terminal 3610 may determine beam feedback in step 4610, and may transmit beam feedback to node1 3620 that is currently connected, in step 4620. For example, the beam feedback may include information indicating that beam A of node2 3630 is an optimal beam. The terminal 3610 may transmit the beam feedback, and then operate a timer 4625. Here, the timer 4625 may be referred to as "timer for confirm".

In this case, in step 4630, node1 3620 may transmit node feedback to the central node 3640. The node feedback may include information indicating that the terminal 3610 determines the beam of node2 3630 is a better beam so that the terminal 3610 requests to communicate with node2 3630.

In step 4640, the central node 3640 may transmit a node change indication message to node1 3620. The message may include information for approval of the terminal 3610 to communicate with node2 3630. In step 4645, the central node 3640 may also transmit the node change indication message to node2 3630 that the terminal 3610 desires to communicate with.

Node2 3630 may transmit the beam feedback confirm message to the terminal 3610 in step 4650. The beam feedback confirm message may include information indicating that the terminal 3610 is approved to communicate with node2 3630. Here, when the terminal 3610 receives the beam feedback confirm message before the timer 4625 expires, the terminal 3610 may determine that beam feedback has been successful. On the other hand, when the terminal 3610 does not receive the beam feedback confirm message before the timer 4625 expires, the terminal 3610 may determine that beam feedback has failed, and may operate accordingly.

Figure 47:
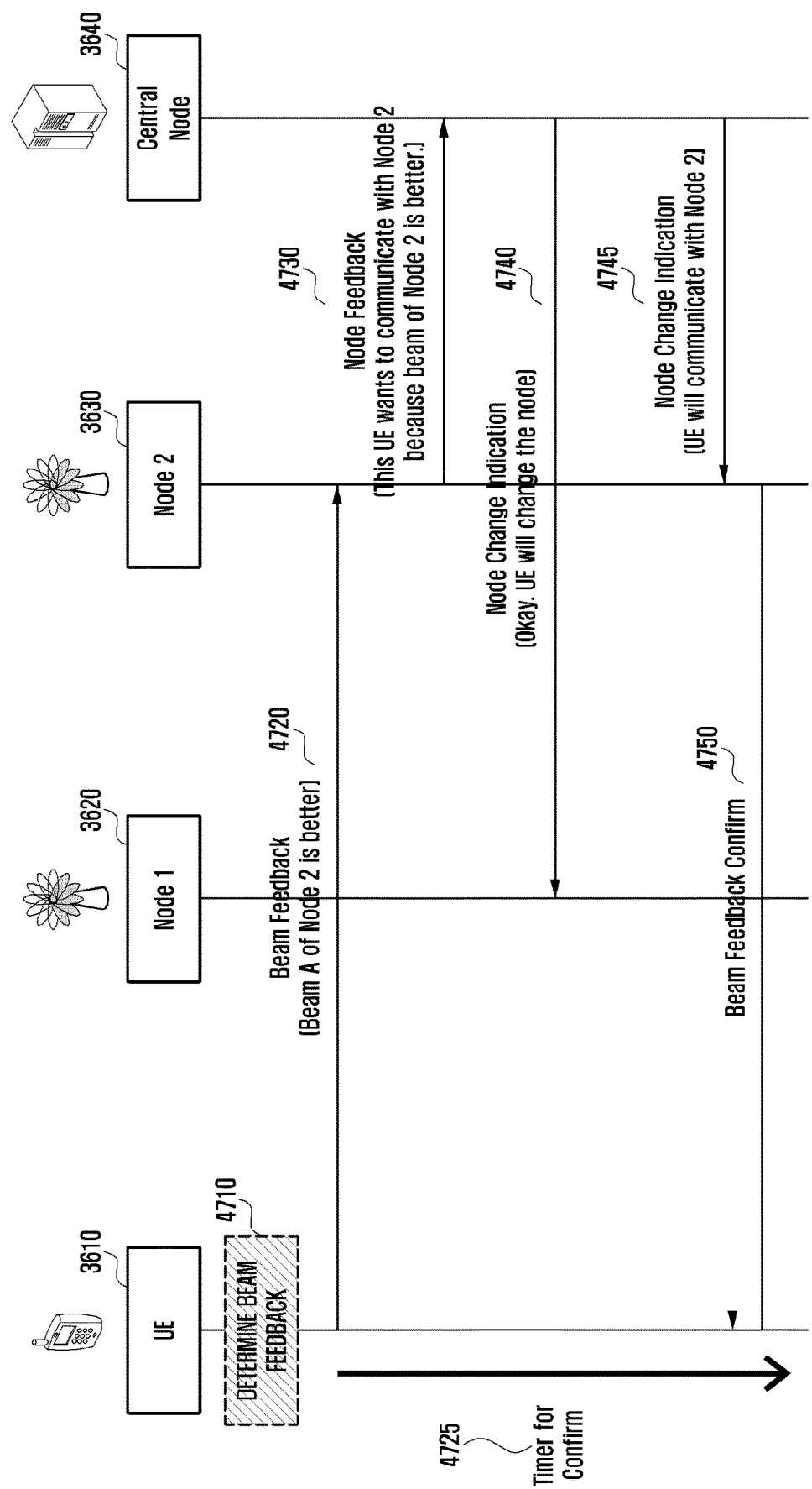

Referring to FIG. 47, the terminal 3610 may determine beam feedback in step 4710. For example, the terminal 3610 may determine beam A of node2 3630 is an optimal beam, and may determine to feed back information thereof. In step 4720, the terminal 3610 may transmit beam feedback to node2 3630 that is determined to include the optimal beam, instead of currently connected node1 3620. For example, the beam feedback may include information indicating that beam A of node2 3630 is an optimal beam. The terminal 3610 may transmit the beam feedback, and then operate a timer 4725. Here, the timer 4725 may be referred to as "timer for confirm".

In this case, in step 4730, node2 3630 may transmit node feedback to the central node 3640. The node feedback may include information indicating that the terminal 3610 determines the beam of node2 3630 is a better beam so that the terminal 3610 requests to communicate with node2 3630.

In step 4740, the central node 3640 may transmit a node change indication message to node1 3620. The message may include information for approval of the terminal 3610 to communicate with node2 3630. In step 4745, the central node 3640 may also transmit the node change indication message to node2 3630 that the terminal 3610 desires to communicate with.

Node2 3630 may transmit the beam feedback confirm message to the terminal 3610 in step 4750. The beam feedback confirm message may include information indicating that the terminal 3610 has been approved to communicate with node2 3630. Here, when the terminal 3610 receives the beam feedback confirm message before the timer 4725 expires, the terminal 3610 may determine that beam feedback has been successful. On the other hand, when the terminal 3610 does not receive the beam feedback confirm message before the timer 4725 expires, the terminal 3610 may determine that beam feedback has failed, and may operate accordingly.

Figure 48:
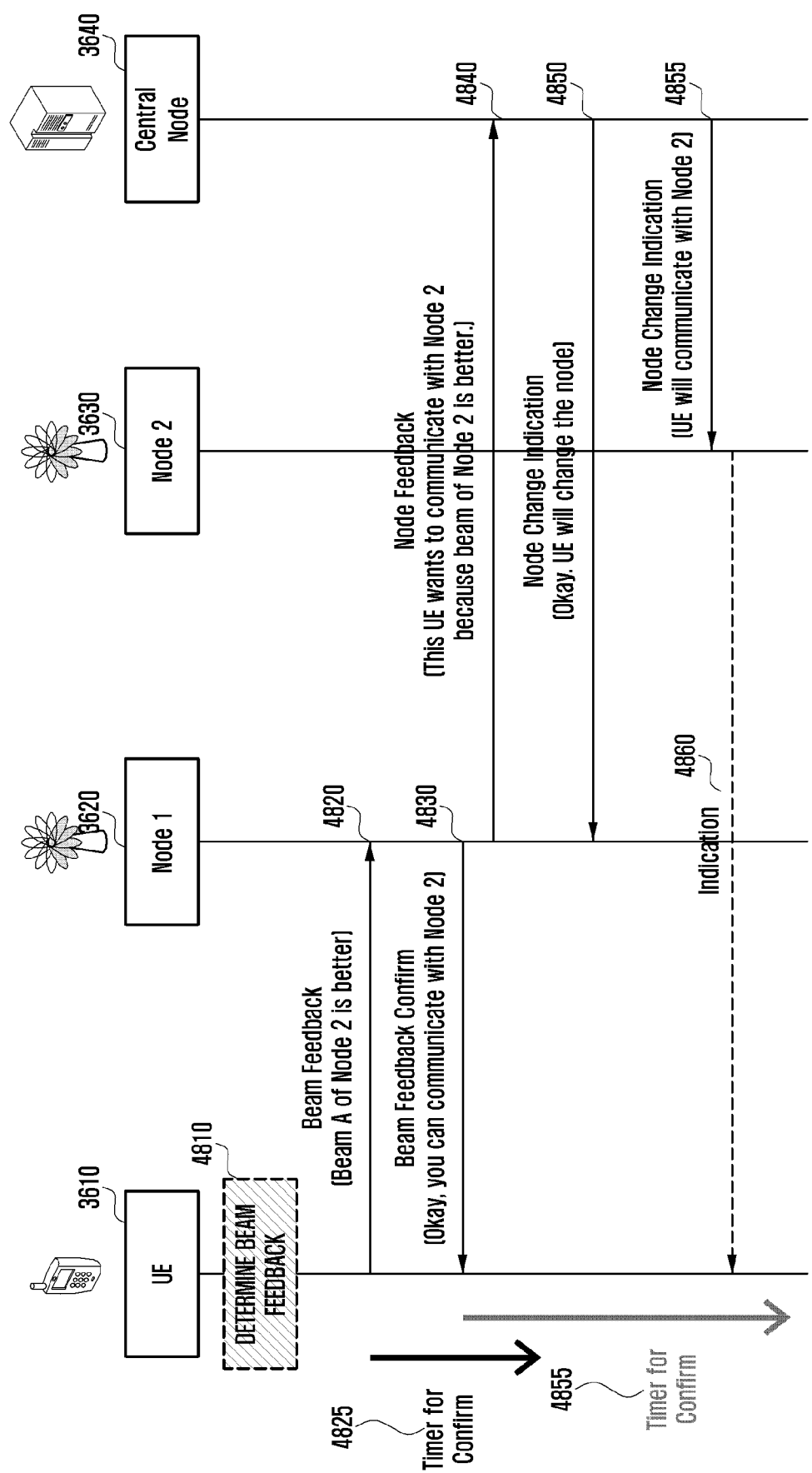

Referring to FIG. 48, the terminal 3610 may determine beam feedback in step 4810. For example, the terminal 3610 may determine beam A of node2 3630 is an optimal beam, and may determine to feed back information thereof. In step 4820, the terminal 3610 may transmit beam feedback to node1 3620 that is the currently connected node. For example, the beam feedback may include information indicating that beam A of node2 3630 is an optimal beam. After transmitting the beam feedback, the terminal 3610 may operate a first timer 4825. The first timer 4825 may be referred to as "timer for confirm".

In step 4830, the terminal 3610 may receive a beam feedback confirm message from node1 3620. The beam feedback confirm message may include information indicating that the terminal 3610 has been approved to communicate with node2 3630. In step 4830, the terminal 3610 receives the beam feedback confirm message from node1 3620 instead of node2 3630 that is a node to which the beam feedback confirm message is to be actually transferred. In this case, the time required until a beam is prepared in node2 3630 may be necessary. Therefore, when the terminal 3610 receives the beam feedback confirm message from node1 3620, the terminal 3610 may operate a second timer 4835. The second timer 4835 used herein may be referred to as a timer for indication. After the second timer 4835 expires, the terminal 3610 may perform a beam-related operation procedure with node2 3630. According to an embodiment, in step 4860, node2 3630 may transmit a message including indication information to the terminal 3610 so as to provide notification of initiation of the beam-related operation, and this message may be omitted.

In step 4840, node1 3620 may transmit node feedback to the central node 3640. The node feedback may include information indicating that the terminal 3610 determines that the beam of node2 3630 is a better beam so that the terminal 3610 requests to communicate with node2 3630.

In step 4850, the central node 3640 may transmit a node change indication message to node1 3620. The message may include information for approval of the terminal 3610 to communicate with node2 3630.

In step 4855, the central node 3640 may also transmit the node change indication message to node2 3630 that the terminal 3610 desires to communicate with. After node2 3630 receives the node change indication message, node2 3630 may be in a state where node2 3630 is capable of performing the beam-related operation procedure.

When the terminal 3610 receives the beam feedback confirm message before the first timer 4825 expires, the terminal 3610 may determine that beam feedback has been successful. On the other hand, when the terminal 3610 fails to receive the beam feedback confirm message before the first timer 4825 expires, the terminal 3610 may determine that beam feedback has failed, and may operate accordingly.

As described above, the terminal 3610 may perform the beam-related operation procedure with node2 3630 after the second timer 4835 expires. Alternatively, according to an embodiment, when the message including indication information is not received from node2 3630 before the second timer 4835 expires, the terminal 3610 may determine that beam feedback has failed, and may operate accordingly.

Figure 49:
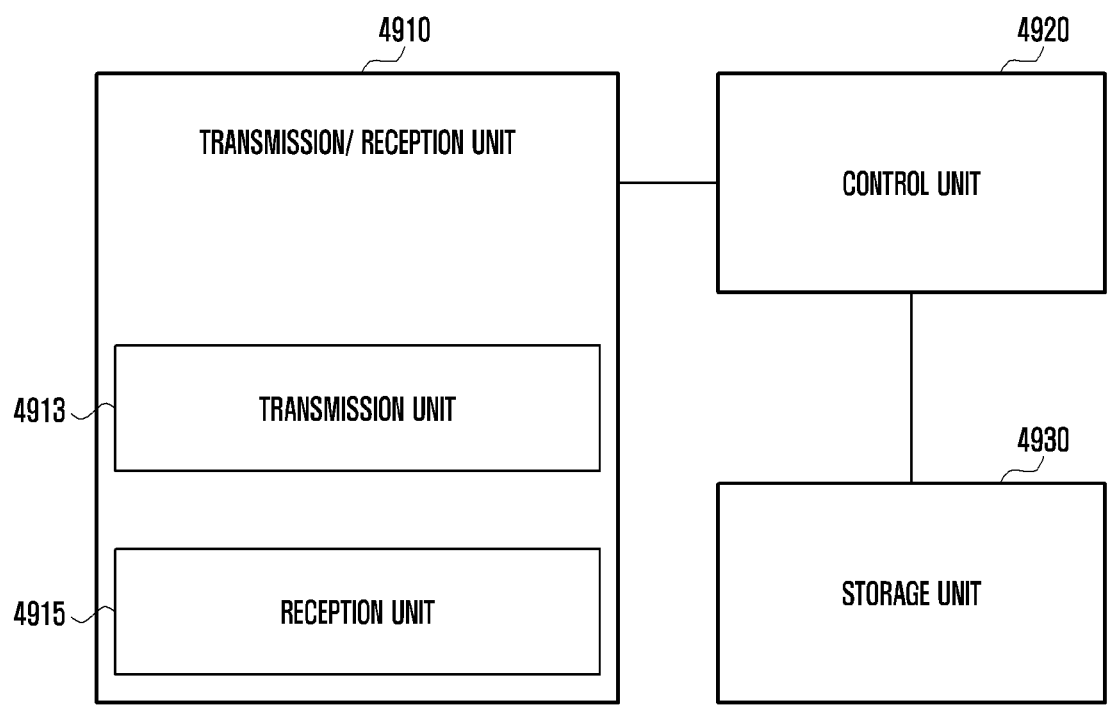
FIG. 49 is a block diagram illustrating a base station according to an embodiment of the disclosure.

FIG. 49 is a block diagram illustrating a base station according to an embodiment of the disclosure.

Referring to FIG. 49, a base station according to an embodiment of the disclosure may include a transmission/reception unit 4910 and a control unit 4920 configured to control overall operation of the base station. The transmission/reception unit 4910 may include a transmission unit 4913 and a reception unit 4915. The base station may further include a storage unit 4930.

The control unit 4920 of the base station controls the base station to perform one operation in the described embodiments. For example, the control unit 4920 of the base station may perform control to: transmit a first broadcast signal including transmission information of a second broadcast signal to a terminal; transmit the second broadcast signal including transmission information of a paging signal to the terminal according to the transmission information of the second broadcast signal; and transmit the paging signal to the terminal according to the transmission information of the paging signal. The control unit 4920 of the base station may receive, from the terminal, a message including at least one of identification information of the terminal or paging identification information, determines whether to transmit the paging signal to the terminal, according to at least one of the identification information of the terminal or the paging identification information, and transmit the paging signal to the terminal. The control unit 4920 of the base station may receive information for allowing the terminal to determine a radio access technology (RAT), according to which the terminal desires to receive the paging signal, from at least one of the terminal and an entity that controls the paging signal of the terminal, and when the base station is included in the RAT, according to which the terminal desires to receive the paging signal, the base station may transmit the paging signal to the terminal.

The transmission/reception unit 4910 of the base station may transmit or receive a signal according to one operation in the described embodiments.

The control unit 4920 and the transmission/reception unit 4910 are not necessarily implemented as separate modules, but may be implemented as a single unit in the form of a single chip. The control unit 4920 and the transmission/reception unit 4910 may be electrically connected.

For example, the control unit 4920 may be a circuit, an application-specific circuit, or at least one processor. Operations of the base station may be implemented by providing a memory device (the storage unit 4930), which stores a corresponding program code, in an element unit within the base station. That is, the control unit 4920 may execute the above-described operations by reading and executing a program code stored in the memory device by using a processor, a central processing unit (CPU), or the like.

Figure 50:
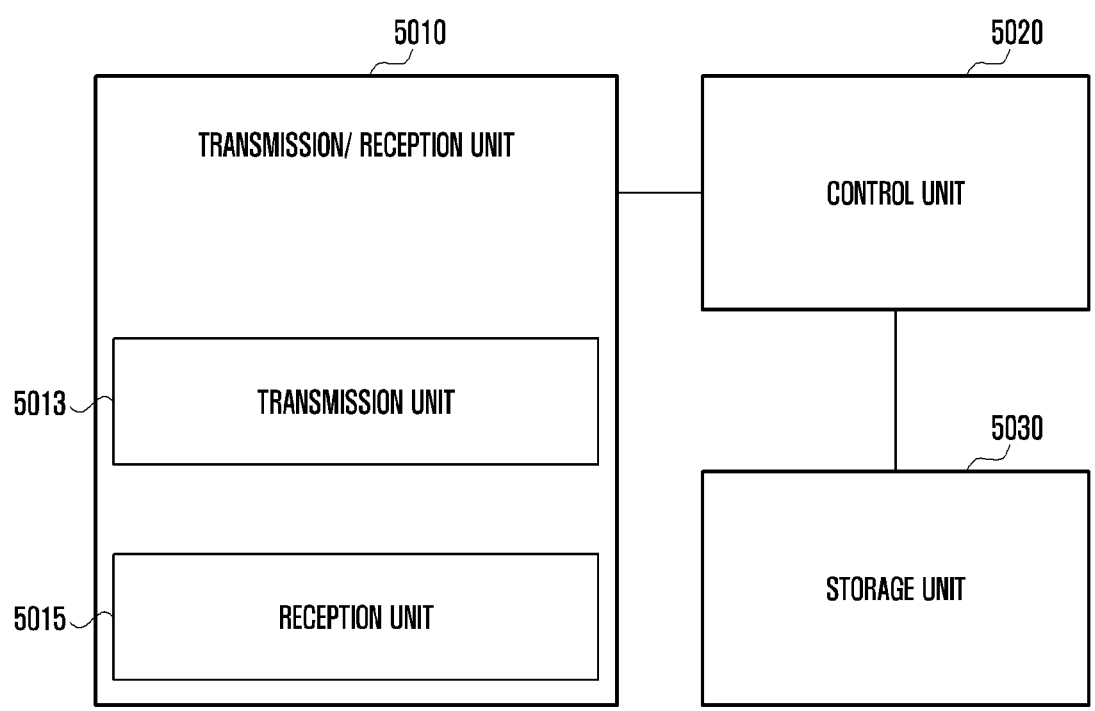
FIG. 50 is a block diagram illustrating a terminal according to an embodiment of the disclosure.

FIG. 50 is a block diagram illustrating a terminal according to an embodiment of the disclosure.

Referring to FIG. 50, a terminal according to an embodiment of the disclosure may include a transmission/reception unit 5010, and a control unit 5020 configured to control overall operation of the terminal. The transmission/reception unit 5010 may include a transmission unit 5013 and a reception unit 5015.

The control unit 5020 controls the terminal to perform one operation in the described embodiments. For example, the control unit 5020 of the terminal may perform control to: receive a first broadcast signal including transmission information of a second broadcast signal from a base station; receive the second broadcast signal including transmission information of a paging signal from the base station according to the transmission information of the second broadcast signal; and receive the paging signal from the base station according to the transmission information of the paging signal. The control unit 5020 of the terminal may transmit a message including at least one of identification information of the terminal or paging identification information, and may receive, from the base station, the paging signal transmitted according to at least one among the identification information of the terminal or the paging identification information. The control unit 5020 of the terminal may determine a radio access technology (RAT), according to which the terminal desires to receive the paging signal, and may receive the paging signal from the base station included in the RAT, according to which the terminal desires to receive the paging signal.

The transmission/reception 5010 of the terminal may transmit or receive a signal according to one operation in the described embodiments.

The control unit 5020 and the transmission/reception unit 5010 are not necessarily implemented as separate modules, but may be implemented as a single unit in the form of a single chip. The control unit 5020 and the transmission/reception unit 5010 may be electrically connected.

For example, the control unit 5020 may be a circuit, an application-specific circuit, or at least one processor. Operations of the terminal may be implemented by providing a memory device (the storage unit 5030), which stores a corresponding program code, in an element unit within the terminal. That is, the control unit 5020 may execute the above-described operations by reading and executing a program code stored in the memory device by using a processor, a central processing unit (CPU), or the like.

Embodiments of the disclosure disclosed in the specification and the drawings are only particular examples to easily describe the technical matters of the disclosure and assist in understanding of the disclosure, and do not limit the scope of the disclosure. It will be apparent to those having ordinary knowledge in the technical field, to which the disclosure pertains, that it is possible to practice other modified embodiments based on the technical idea of the disclosure as well as the embodiments disclosed herein.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

Meanwhile, the embodiments of the disclosure disclosed in the present specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiments of the disclosure may be combined with each other so that a base station and a terminal may be operated.

The invention claimed is:

1. A communication method of a terminal the method comprising:
   receiving, from a base station, master system information, the master system information including first transmission information on additional system information;
   receiving, from the base station, the additional system information based on the first transmission information, the additional system information including second transmission information of a paging signal; and
   receiving, from the base station, the paging signal based on the second transmission information.

2. The method of claim 1, wherein the receiving of the paging signal comprises:
   transmitting, to the base station, a message including at least one of identification information of the terminal or paging identification information; and
   receiving, from the base station, the paging signal transmitted according to at least one of the identification information of the terminal or the paging identification information.

3. The method of claim 1, wherein:
   the additional system information includes information on whether a paging signal for a paging area, to which the terminal belongs, is transmitted; and
   the receiving of the paging signal comprises receiving the paging signal from the base station, in case that the paging signal is transmitted from the paging area to which the terminal belongs.

4. The method of claim 1, further comprising:
   identifying a radio access technology (RAT), according to which the terminal desires to receive the paging signal; and
   receiving the paging signal from a base station included in the RAT, according to which the terminal desires to receive the paging signal.

5. A communication method of a base station the method comprising:
   transmitting, to a terminal, master system information, the master system information including first transmission information on additional system information;
   transmitting, to the terminal, the additional system information based on the first transmission information, the additional system information including second transmission information of a paging signal; and
   transmitting, to the terminal, the paging signal based on the second transmission information.

6. The method of claim 5, wherein the transmitting of the paging signal comprises:
   receiving a message including at least one of identification information of the terminal or paging identification information from the terminal; and
   determining whether to transmit the paging signal to the terminal, according to at least one of the identification information of the terminal or the paging identification information, and transmitting the paging signal to the terminal.

7. The method of claim 5, wherein the transmitting of the paging signal comprises:
   receiving information for determination of a radio access technology (RAT), according to which the terminal desires to receive the paging signal, from at least one among the terminal and an entity that controls the paging signal of the terminal; and
   transmitting the paging signal to the terminal, in case that the base station is included in the RAT to which the terminal desires to receive the paging signal.

8. A terminal, comprising:
   a transceiver; and
   a controller configured to:
      receive, from a base station via the transceiver, master system information, the master system information including first transmission information on additional system information,
      receive, from the base station via the transceiver, the additional system information based on the first transmission information, the additional system information including second transmission information of a paging signal, and
      receive, from the base station via the transceiver, the paging signal based on the second transmission information.

9. The terminal of claim 8, wherein the controller is configured to:
   transmit, to the base station via the transceiver a message including at least one of identification information of the terminal or paging identification information; and
   receive, from the base station via the transceiver the paging signal transmitted according to at least one of the identification information of the terminal or the paging identification information.

10. The terminal of claim 8, wherein: the additional system information includes information on whether a paging signal for a paging area, to which the terminal belongs, is transmitted; and
    the controller is configured to receive, from the base station via the transceiver, the paging signal in case that the paging signal is transmitted from the paging area to which the terminal belongs.

11. The terminal of claim 8, wherein the controller is configured to:
    determine a radio access technology (RAT), according to which the terminal desires to receive the paging signal; and
    receive the paging signal, from a base station via the transceiver, included in the RAT, according to which the terminal desires to receive the paging signal.

12. A base station, comprising:
    a transceiver; and
    a controller configured to:
       transmit, to a terminal via the transceiver, master system information, the master system information including first transmission information on additional system information, transmit, to the terminal via the transceiver, the additional system information based on the first transmission information, the additional system information including second transmission information of a paging signal, and transmit, to the terminal via the transceiver, the paging signal based on the second transmission information.

13. The base station of claim 12, wherein the controller is configured to:

receive, from the terminal via the transceiver, a message including at least one of identification information of the terminal or paging identification information; and determine whether to transmit the paging signal to the terminal, according to at least one of the identification information of the terminal or the paging identification information, and transmit the paging signal to the terminal.

14. The base station of claim 12, wherein the controller is configured to:

receive information for determination of a radio access technology (RAT) via the transceiver according to which the terminal desires to receive the paging signal, from at least one among the terminal and an entity that controls the paging signal of the terminal; and transmit, to the terminal via the transceiver, the paging signal in case that the base station is included in the RAT to which the terminal desires to receive the paging signal.

15. The base station of claim 12, wherein the additional system information includes information on whether a paging signal for a paging area, to which the terminal belongs, is transmitted.

* * * * *